United States Patent
Okazaki et al.

(10) Patent No.: US 8,617,711 B2
(45) Date of Patent: Dec. 31, 2013

(54) SINGLE LAYER FILM AND HYDROPHILIC MATERIAL COMPRISING THE SAME

(75) Inventors: Koju Okazaki, Ichihara (JP); Ryouichi Seki, Ichihara (JP); Takazou Katou, Ashigarakami-gun (JP); Masatoshi Takagi, Yokohama (JP)

(73) Assignee: Mitsui Chemicals, Inc., Tokyo (JP)

(*) Notice: Subject to any disclaimer, the term of this patent is extended or adjusted under 35 U.S.C. 154(b) by 761 days.

(21) Appl. No.: 12/085,832

(22) PCT Filed: Nov. 27, 2006

(86) PCT No.: PCT/JP2006/324131
§ 371 (c)(1),
(2), (4) Date: May 30, 2008

(87) PCT Pub. No.: WO2007/064003
PCT Pub. Date: Jun. 7, 2007

(65) Prior Publication Data
US 2009/0191373 A1  Jul. 30, 2009

(30) Foreign Application Priority Data

Dec. 2, 2005  (JP) ................. 2005-348860

(51) Int. Cl.
| | |
|---|---|
| B32B 7/06 | (2006.01) |
| B32B 7/12 | (2006.01) |
| B32B 27/30 | (2006.01) |
| B32B 33/00 | (2006.01) |
| B05D 3/00 | (2006.01) |
| B05D 5/00 | (2006.01) |
| C08F 20/26 | (2006.01) |
| C08F 20/38 | (2006.01) |
| C09D 133/10 | (2006.01) |
| C09D 133/14 | (2006.01) |
| C09K 3/00 | (2006.01) |
| C09K 3/16 | (2006.01) |
| C09K 3/18 | (2006.01) |
| B05D 3/02 | (2006.01) |
| B05D 3/06 | (2006.01) |

(52) U.S. Cl.
USPC ........... 428/409; 428/40.1; 428/41.8; 428/68; 428/220; 428/334; 428/339; 428/343; 428/500; 106/13; 526/274; 526/287; 526/317.1; 526/318.4

(58) Field of Classification Search
None
See application file for complete search history.

(56) References Cited

U.S. PATENT DOCUMENTS 3,847,846 A    11/1974  Asada et al.
4,163,609 A *   8/1979  Neefe ...................... 351/160 H
(Continued)

FOREIGN PATENT DOCUMENTS

JP    53-10636    4/1978
JP    55-90516    7/1980
(Continued)

OTHER PUBLICATIONS

Translation of JP 63273668 A, 11/988.*
(Continued)

Primary Examiner — Maria Veronica Ewald
Assistant Examiner — Jeff Vonch
(74) Attorney, Agent, or Firm — Foley & Lardner LLP

(57) ABSTRACT

A single layer film containing at least one anionic hydrophilic group selected from a sulfonic acid group, a carboxyl group and a phosphate group, wherein an anion concentration ratio (Sa/Da) of an anion concentration at a surface (Sa) to an anion concentration at a deep part (Da) is 1.1 or more. The single layer film is a copolymer prepared by polymerizing a composition containing a compound (I) represented by the general formula (1) ([X]s[M1]l[M2]m (1)) and a compound (II) having two or more (meth)acryloyl groups in a molecule at a molar ratio of 15:1 to 1:30 and having a water contact angle of 30° or less. Such a single layer film has high hydrophilicity and surface hardness and is excellent in antifogging property, antifouling property and antistatic property, thus is useful as an antifogging material, an antifouling material, an antistatic material and a multilayer body.

16 Claims, 4 Drawing Sheets

(56) References Cited

U.S. PATENT DOCUMENTS

| | | | | |
|---|---|---|---|---|
| 4,274,933 | A | * | 6/1981 | Kamada et al. ............... 522/171 |
| 4,351,881 | A | | 9/1982 | Kamada et al. |
| 5,017,646 | A | | 5/1991 | Muramoto et al. |
| 5,273,812 | A | * | 12/1993 | Oguchi et al. ............... 428/220 |
| 6,792,301 | B2 | | 9/2004 | Munro et al. |
| 2006/0165934 | A1 | * | 7/2006 | Okazaki et al. ............. 428/40.1 |

FOREIGN PATENT DOCUMENTS

| | | | | |
|---|---|---|---|---|
| JP | 61-78807 | | 4/1986 | |
| JP | 62-161808 | | 7/1987 | |
| JP | 63-006064 | | 1/1988 | |
| JP | 63-151901 | | 6/1988 | |
| JP | 63273668 A | * | 11/1988 | ............... C09D 5/00 |
| JP | 64-24809 | | 1/1989 | |
| JP | 64-83579 | | 3/1989 | |
| JP | 2-178359 | | 7/1990 | |
| JP | 5-186534 | | 7/1993 | |
| JP | 8-325524 | | 12/1996 | |
| JP | 10-95951 | | 4/1998 | |
| JP | 10-204118 | | 8/1998 | |
| JP | 11-21512 | | 1/1999 | |
| JP | 11-115305 | | 4/1999 | |
| JP | 2000-26691 | | 1/2000 | |
| JP | 2001-98007 | | 4/2001 | |
| JP | 2002-521140 | | 7/2002 | |
| JP | 2004-307544 | | 11/2004 | |
| WO | WO 2004/058900 A1 | | 7/2004 | |
| WO | WO 2004058900 A1 | * | 7/2004 | ............... C09D 4/02 |

OTHER PUBLICATIONS

Toagosei Annual Report, Trend 1999, Feb., pp. 39-44, with partial translation (14 pgs.).

Kobunshi, vol. 44, No. 5, 1995, p. 307, with full translation (5 pgs.).

Miraizairyo, vol. 2, No. 1, Jan. 2002, pp. 36-41, with partial translation (2 pgs.).

Chen, et al., "Surface Characteristics of Polysulfoalkyl Methacrylates", Journal of Colloid and Interface Science, vol. 110, No. 2, Apr. 1986, pp. 468-476.

Korean Office Action issued Jan. 28, 2010 in the corresponding Korean Application No. 9-5, 2010-003887148 (5 pages).

* cited by examiner

SINGLE LAYER FILM AND HYDROPHILIC MATERIAL COMPRISING THE SAME

TECHNICAL FIELD

The present invention relates to a single layer film which is excellent in antifogging property, antifouling property and antistatic property, and contains an anionic hydrophilic group distributed in a certain concentration ratio. More specifically, it relates to a single layer film, comprising a hydrophilic copolymer obtained by polymerizing a composition comprising a certain compound and a compound containing two or more (meth)acryloyl groups in a molecule, an antifogging material, an antifouling material, an antistatic material, an antifogging coating film, an antifouling coating film and an antistatic coating film all containing the single layer film, a multilayer body having the single layer film and the coating film on a surface of a substrate material, and to a method for manufacturing them.

BACKGROUND ART

In recent years, needs for improving antifogging properties of a plastic and glass surface have been ever-increasing.

As a method for solving the fogging problem, an antifogging coating material that improves hydrophilicity and water-absorbing property of a hardened layer by adding a reactive surface-active agent to an acrylic oligomer has been proposed (Non-Patent Document 1). Also, by improving surface hydrophilicity, antifouling materials having self cleaning property (antifouling property) which can be achieved by floating out and effectively removing the dirt attached to an outer wall and the like (an outer air hydrophobic material and the like) by rain, water spray and the like are drawing attention (Non-Patent Documents 2 and 3).

As a representative hydrophilic resin, there are many known resins that have a number of hydroxyl groups within a molecule such as polyvinyl alcohol. Since these hydrophilic resins have specific properties depending on their chemical structure, product development is carried out in accordance with their specific properties.

Other reported hydrophilic resins include: polymers obtained by using potassium 3-sulfopropylmethacrylate, sodium 2-acrylamide-2-methylpropane-sulfonate and polyethylene glycol diacrylate as described in Patent Document 1; polymers obtained by using sodium 3-sulfopropylmethacrylate and a long-chain urethane diacrylate (trade name NK Oligo UA-W2A, manufactured by Shin-Nakamura Chemical Co., Ltd.) as described in Patent Document 2; polymers obtained by using 2-sulfoethyl acrylate, tetrahydrofurfuryl acrylate, trimethylolpropane acrylate and spiroglycol urethane diacrylate as described in Patent Document 3; polymers obtained by using 2-sulfoethyl methacrylate and/or a (meth) acrylate containing a phosphate group and an epoxy resin as described in Patent Document 4; polymers obtained by using hydroxyethyl methacrylate, sulfoalkylene (C6 to C10) methacrylate and methylenebisacrylamide as described in Non-Patent Document 4, and the like.

Patent Document 1 describes that an obtained transparent gel is used as a bio-adhesive material, Patent Document 2 describes that an obtained polymer is used as a recording material for an ink jet recording with excellent ink-adsorption, high water resistance and no blocking, and Patent Document 3 describes that an obtained polymer is used as an adhesive agent to firmly adhere a metal hub for an optical information disk drive with a resin substrate. Patent Document 4 describes that a polymer obtained by crosslinking of ethylenic unsaturated bonds and concurrent crosslinking of a sulfonic acid group or a phosphate group with an epoxy group by an ionic reaction can be used as an electroconductive hardening film having excellent properties in mechanical performance, solvent resistance, film formation, adhesiveness, transparency and abrasion resistance.

Non-Patent Document 4 describes, among others, that hydrophilic property (the forward contact angle and the backward contact angle) of slightly crosslinked coating film formed on glass changes with the length of alkylene chain (C6 to C10) of the sulfoalkylene methacrylate monomer used and further with the hydration time.

However, the above-described polymers were not suitably qualified to be used as an antifogging material and an antifouling material, since they either have high solubility in water or adsorb water to easily form gels though not soluble in water, or a surface thereof is too soft and susceptible to scratches or are insufficient in hydrophilicity.

Proposed in Patent Document 6, as a method for producing a hydrophilic article, is a double-layered structure having a hydrophilic structure having a hydrophilic monomer on a crosslinked polymer surface, which is formed by a dual-coating method of coating a crosslinkable monomer composition on a surface of a substrate material, irradiating UV light on it in a controlled manner to form an incompletely polymerized crosslinked polymer, then coating it with a hydrophilic monomer and again irradiating UV light to perform block polymerization or graft polymerization of the hydrophilic monomer on a crosslinked polymer surface.

However, the method described above is not preferable because it is apparently complex and costly and the smoothness of surface is easily damaged as compared with, for instance, a general method for forming a single-layered structure by single coating of a composition composed of a hydrophilic monomer and a crosslinkable monomer followed by their polymerization by UV light irradiation and the like.

The present inventors also proposed a polymer using a hydroxyl group-containing (meth)acrylamide compound as a method for addressing the problems mentioned above (Patent Document 5).

Generally, physical properties required of an antifouling resin for coating include high surface hardness and high hydrophilicity. Physical properties required of an antifogging resin for coating include relatively high surface hardness and higher hydrophilicity than that for antifouling use.

Further developments of the method previously proposed by the present inventors were necessary in order to fully satisfy these requirements and to completely address the problems of "fogging" and "fouling".

Patent Document 1: Japanese Unexamined Patent Application Publication No. 2002-521140
Patent Document 2: Japanese Patent Laid-Open Publication No. H11-115305
Patent Document 3: Japanese Patent Laid-Open Publication No. H08-325524
Patent Document 4: Japanese Examined Patent Application Publication No. S53-010636
Patent Document 5: International Laid-Open Publication No. WO 2004/058900
Patent Document 6: Japanese Patent Laid-Open Publication No. 2001-98007
Non-Patent Document 1: Toagosei Annual Report, TREND 1999, February, pp 39-44
Non-Patent Document 2: Kobunshi, 44(5), p 307
Non-Patent Document 3: Miraizairyo, 2(1), pp 36-41
Non-Patent Document 4: Journal of Colloid and Interface Science, vol. 110(2), pp 468-476 (1986)

DISCLOSURE OF THE INVENTION

Problems to be Solved by the Invention

An object of the present invention is to provide a single layer film having excellent antifogging property, antifouling property (self-cleaning property) and antistatic property (dust resistant property), further scratch resistance property, and high hydrophilicity and surface hardness; an antifogging material, an antifouling material and an antistatic material containing the single layer film; a multilayer body having the single layer film at a surface of a substrate material; and a method for manufacturing them.

Means for Solving the Problems

The present inventors investigated further to address the problems mentioned above, and as a result, found that a single layer film having an anionic hydrophilic group distributed at a certain concentration ratio was excellent in antifogging property, antifouling property, antistatic property and scratch resistance property, and thus accomplished the present invention. When the single layer film is a copolymer obtained by polymerizing a composition comprising certain compounds, particularly sulfonylalkyl(meth)acrylate and a salt thereof and a compound containing two or more (meth)acryloyl groups in a molecule, excellent antifogging, antifouling, antistatic and scratch resistance properties are realized as the film has high hydrophilicity and surface hardness.

In other words, the present invention relates to:
(1) A single layer film comprising at least one anionic hydrophilic group selected from a sulfonic acid group, a carboxyl group and a phosphate group, having an anion concentration ratio (Sa/Da) of an anion concentration at a surface (Sa) to an anion concentration at a deep part (Da) of 1.1 or more.
(2) The single layer film according to the above (1), wherein the water-contact angle is 30° or less.
(3) The single layer film according to the above (1), wherein the film thickness is 0.5 to 100 μm.
(4) The single layer film described in the above (1), wherein the film is a copolymer obtained by polymerizing a composition containing a compound (I) represented by the following general formula (1) and a compound (II) having two or more (meth)acryloyl groups in a molecule at a molar ratio of 15:1 to 1:30.

[Formula 1]

$$[X]_s[M1]_l[M2]_m \quad (1)$$

wherein, s represents 1 or 2; l represents 1 or 2; m represents 0 or 1. M1 and M2 may be the same or different, and represent a hydrogen ion, an ammonium ion, an alkali metal ion, or an alkaline earth metal ion. X represents one kind selected from the hydrophilic groups represented by the following general formulae (1-1) to (1-4).

[Formula 2]

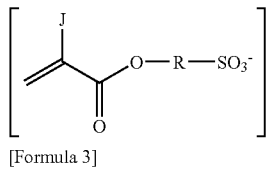
(1-1)

[Formula 3]

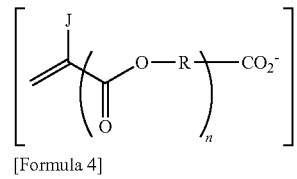
(1-2)

[Formula 4]

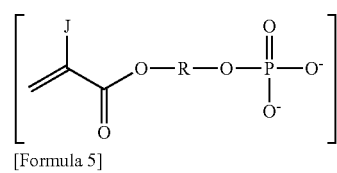
(1-3)

[Formula 5]

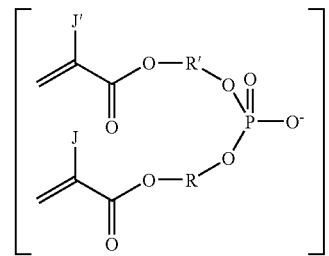
(1-4)

(In the formulae, J and J' may be the same or different and represent H or $CH_3$; n represents 0 or 1; R and R' may be the same or different and represent an aliphatic hydrocarbon group having 1 to 600 carbon atoms, which may contain an aromatic ring, an alicyclic group, an ether group or an ester group.)

(5) The compound (I) described in the above (4) represented by the general formula (1) is represented by the following general formula (1-1-1) or the following general formula (1-1-2).

[Formula 6]

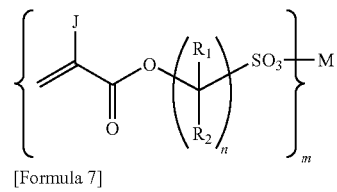
(1-1-1)

[Formula 7]

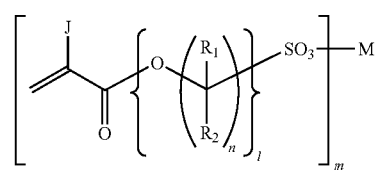
(1-1-2)

(In the formulae, J represents H or $CH_3$; $R_1$ and $R_2$ independently represent H, $CH_3$, and an ethyl group; n represents an integer of 1 to 20; m represents an integer of 1 to 2; l represents an integer of 2 to 10; M represents H, an amine group, an alkali metal, or an alkaline earth metal).

(6) The compound (II) according to the above (4) containing two or more (meth)acryloyl groups in a molecule is represented by the following general formula (2-1) or (2-2).

[Formula 8]
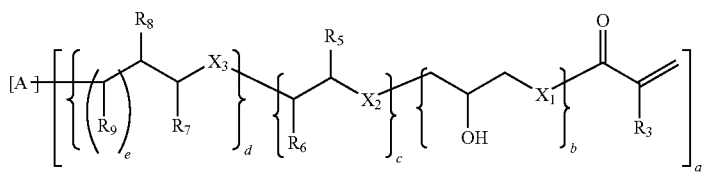
(2-1)
[Formula 9]
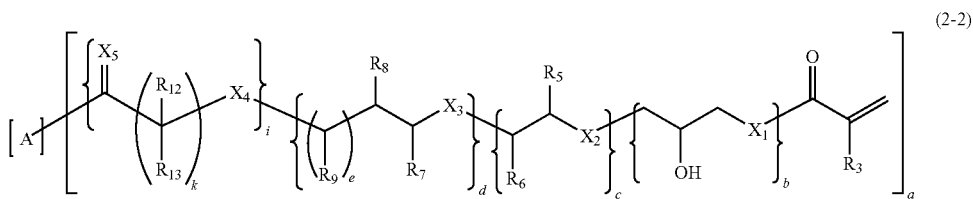
(2-2)
(In the formulae, A represents one kind selected from
[Formula 10]
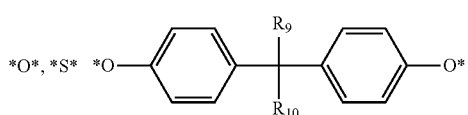
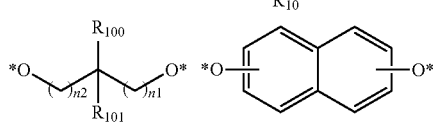
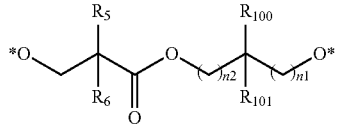
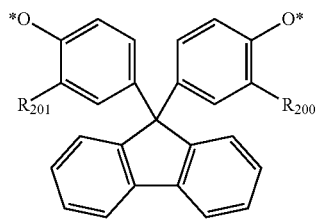
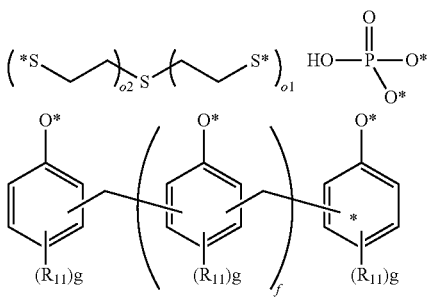
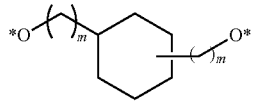
-continued
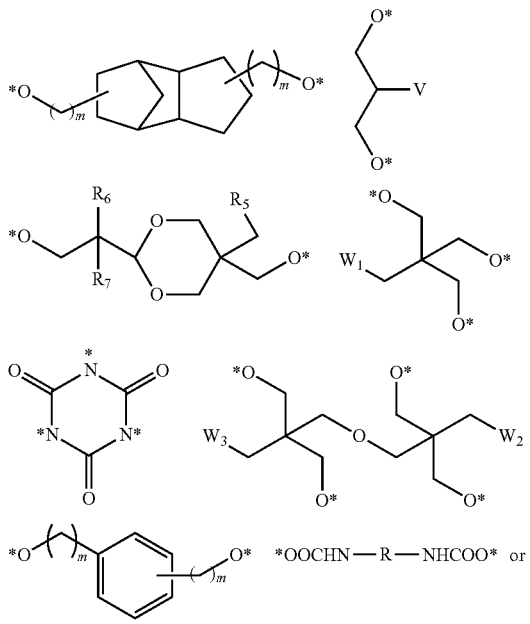
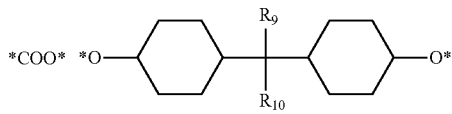
[Formula 11]
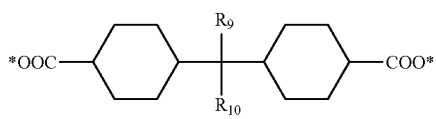
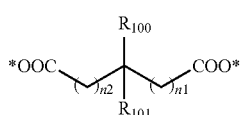
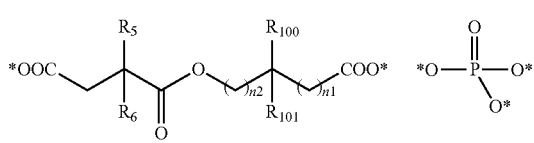

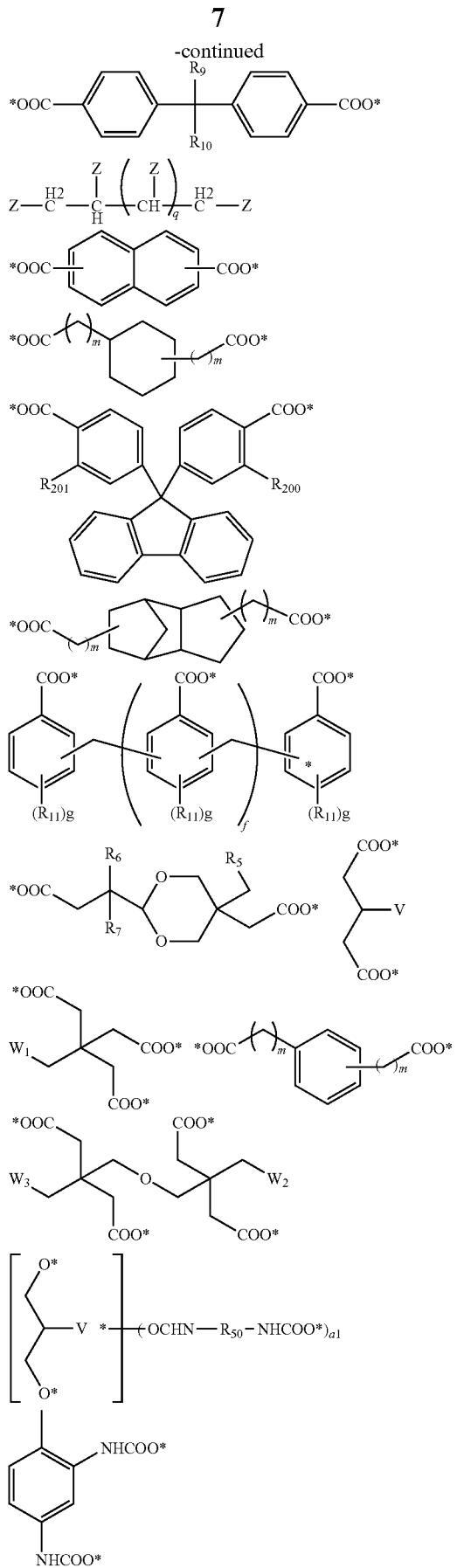
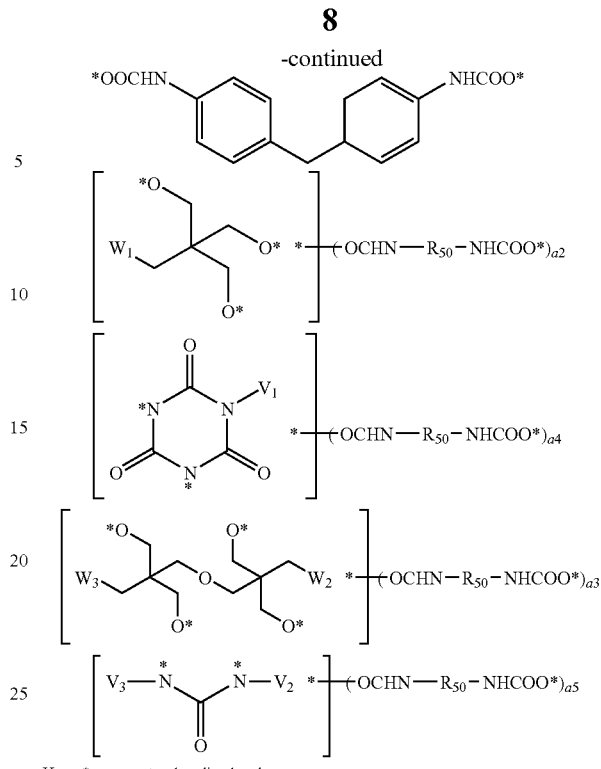

Here, * represents a bonding hand.

R represents hexamethylene, isophorone (1-methylene-3-ethylene-3-methyl-5,5-dimethylcyclohexane), norbornanedimethylene, dicyclohexylenemethane, cyclohexanedimethylene, or xylylene.

$R_3$ and $R_5$ to $R_9$ represent H or $CH_3$.

$X_1$, $X_2$ and $X_3$ represent O or S.

Here, a represents an integer of 2 to 30; b represents an integer of 0 to 2; c represents an integer of 0 to 30; d represents an integer of 0 to 20; e represents an integer of 0 to 2.

$R_{10}$ and $R_{11}$ represent H or $CH_3$; $R_{100}$ and $R_{201}$ represent H or an alkyl group having 1 to 6 carbon atoms; $R_{200}$ and $R_{201}$ represent H, $CH_3$ or a phenyl group; V represents OH or an oxygen atom (O*) bonded to a carbon atom.

$W_1$ to $W_3$ represent H, $CH_3$, OH or an oxygen atom (O*) bonded to a carbon atom.

Here, n1 and n2 represent an integer of 0 to 8; o1 and o2 represent an integer of 1 to 3; m represents 0 or 1; f represents an integer of 1 to 20; g represents an integer of 0 to 3.

$R_{50}$ represents hexamethylene, isophorone (1-methylene-3-ethylene-3-methyl-5,5-dimethylcyclohexane), norbornanedimethylene, dicyclohexylenemethane, cyclohexanedimethylene, toluoylene, diphenylmethane, or xylylene.

$R_{12}$ and $R_{13}$ represent H or $CH_3$.

Here, a1 represents an integer of 2 to 3; a2 represents an integer of 3 to 4; a3 represents an integer of 4 to 6; a4 represents an integer of 2 to 3; a5 represents an integer of 2 to 4; i represents an integer of 1 to 20; k represents an integer of 1 to 10.

$V_1$ to $V_3$ independently represent H or a bonding hand (*).

Z represents OH or an oxygen atom (O*) bonded to a carbon atom, COOH or a carboxyl group (COO*) bonded to a carbon atom.

Here, q represents an integer of 1 to 7).

(7) The compound (II) having two or more (meth)acryloyl groups in a molecule according to the above (4) is at least one kind selected from the compounds represented by the later-mentioned general formulae (3) to (33).

(8) The composition according to the above (4) further contains a polymerizable compound (III) having a different chemical structure from those of a compound (I) represented by the general formula (1) and a compound (II) having two or more (meth)acryloyl groups in a molecule.
(9) An antifogging material comprising the single layer film according to any of the above (1) to (8).
(10) An antifouling material comprising the single layer film according to any of the above (1) to (8).
(11) An antistatic material comprising the single layer film according to any of the above (1) to (8).
(12) A multilayer body comprising the single layer film according to any of the above (1) to (8) and a substrate layer, wherein the single layer film is formed on at least one side of the substrate layer.
(13) The multilayer body according to the above (12), wherein an adhesive layer is formed on the side of the substrate layer on which the single layer film is not formed.
(14) The multilayer body according to the above (13), wherein a releasing film is formed on the surface of the adhesive layer provided on the substrate layer.
(15) A multilayer body according to the above (12), wherein a peelable covering material layer is formed on the surface of the single layer film.
(16) A method for producing a multilayer body by forming a coating layer comprising a composition containing a compound (I) represented by the general formula (1) mentioned above and a compound (II) having two or more (meth)acryloyl groups in a molecule at a molar ratio of 15:1 to 1:30 on at least one side of a substrate layer and then copolymerizing the coating layer, a single layer film of the obtained copolymer comprising at least one anionic hydrophilic group selected from a sulfonic acid group, a carboxyl group and a phosphate group distributed in such a manner that an anion concentration ratio (Sa/Da) of an anion concentration at a surface (Sa) to an anion concentration at a deep part (Da) is 1.1 or more.
(17) A method for producing the multilayer body according to the above (16), wherein the water-contact angle of the single layer film is 30° or less.

Effects of the Invention

According to the present invention, a hydrophilic single layer film, a hydrophilic material containing the same, for example, an antifogging material, an antifouling material and an antistatic material, an antifogging coating film, an antifouling coating film, an antistatic coating film, and a multilayer body formed by laminating them on a substrate material can be provided.

EXPLANATION OF THE SYMBOLS

Figure 1:
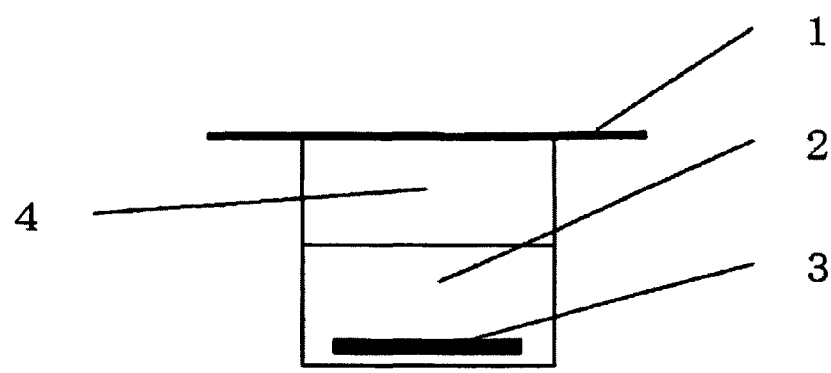
FIG. 1 This figure shows a method of the antifogging test.

1: Test sample
2: Hot water (75° C.)
3: Heater
4: Space

BEST MODE FOR CARRYING OUT THE INVENTION

A single layer film of the present invention is a hydrophilic organic single layer film containing at least one kind of anionic hydrophilic group selected from a sulfonic acid group ($SO_3^-$), a carboxyl group ($CO_2^-$), or a phosphate group ($PO_4^-$), and particularly preferably a sulfonic acid group ($SO_3^-$). An anion concentration ratio (Sa/Da), wherein Sa is the anion concentration at a surface of the single layer film containing these organic copolymers and Da is the anion concentration at a deep part of the film, is 1.1 or more, preferably 1.2 or more, and particularly preferably 1.3 or more. In a single layer film of the present invention the upper limit of the anion concentration ratio may be 20.0. Here, in the present invention, the term "deep part" means a point half as deep as the thickness of the single layer film.

A single layer film of the present invention is a coating film having an anionic hydrophilic group formed on at least one side of a substrate material, wherein the anions of the film are distributed from the deep part of the film on the substrate side to the surface of the film, and particularly most densely on the outermost surface where the film is in contact with outer air (the anion concentration ratio (Sa/Da)>1.1) with a concentration difference.

This is considered to be caused by self-aggregation of hydrophilic anions on the surface to form a film when a composition of the present invention, which will be mentioned later, is copolymerized by heat or radiation ray.

As stated above, a single layer film of the present invention, having highly hydrophilic anions at a high concentration on the surface, is excellent in antifogging property, antifouling or self-cleaning property, antistatic or dust resistant property, and the like.

The above-mentioned anion concentration ratio can be determined by cutting a sample crosswise and then measuring respectively the anion concentrations at the surface and the deep part of the film that is formed on the surface of a substrate material by using a time-of-flight secondary ion mass spectrometry (TOF-SIMS).

The thickness of a single layer film (copolymer) of the present invention formed on at least one side of a substrate material may be determined appropriately depending on uses, and is usually 0.5 to 100 μm, preferably 1 to 20 μm, and more preferably 2 to 10 μm.

The water-contact angle of a single layer film of the present invention is 30° or less, preferably 20° or less, and more preferably 10° or less. A single layer film having a water-contact angle of 30° or less has high hydrophilicity, is compatible with water (good wetting properties) and excellent as a hydrophilic material, and thus is useful as, for example, an antifogging material, an antifogging coating film (hereinafter sometimes referred to as antifogging coat), an antifouling material, an antifouling coating film or a self-cleaning coat, an antistatic material, an antistatic coating film or a dust resistant coat, and the like.

For example, when used as an antifogging coat, a water droplet disperses on the film surface to form a water layer, so that the single layer film shows good antifogging effect. When used as a self-cleaning coat, the single layer film shows good antifouling effect because water penetrates between dirt and the coated surface and floats the dirt out for removal.

Furthermore, a single layer film having an anionic hydrophilic group of the present invention is superior in antistatic property to a conventional coating film having a nonionic hydrophilic group, thus is useful as an antistatic material, an antistatic coating film or a dust resistant coat, and the like.

A single layer film of the present invention is obtained by copolymerizing a composition comprising a compound (I) represented by the following general formula (1) and a compound (II) having two or more (meth)acryloyl groups in a molecule at a molar ratio of 15:1 to 1:30, preferably 2:1 to 1:20, more preferably 1:1 to 1:25 or 1:1 to 1:15, and particularly preferably 1:3 to 1:23. Here, the term "a single layer film" means a coating film obtained by copolymerizing a composition for coating containing at least the compound (I) and the compound (II).

[Formula 12]

[X]s[M1]l[M2]m    (1)

In the general formula (1), s represents 1 or 2, l represents 1 or 2, and m represents 0 or 1.

M1 and M2 may be the same or different, and represent a hydrogen ion, an ammonium ion, an alkali metal ion, or an alkaline earth metal ion. The general formula (1) is charge neutral.

X represents one kind selected from hydrophilic groups represented by the following general formulae (1-1) to (1-4). The molecular weight of X is 50 to 18,000, preferably 100 to 1,000, and more preferably 170 to 500. Further, an oligomer of X (repeating units of 2 to 20) may be used for X, and the molecular weight of the oligomer is 100 to 30,000, preferably 200 to 10,000, and more preferably 300 to 5,000.

[Formula 13]

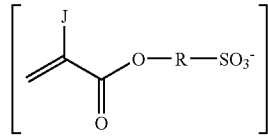
(1-1)

[Formula 14]

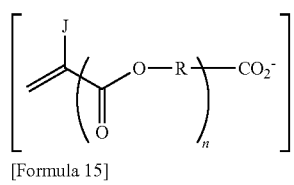
(1-2)

[Formula 15]

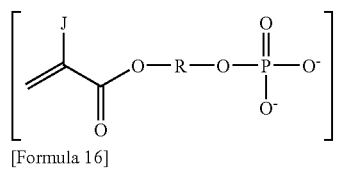
(1-3)

[Formula 16]

-continued

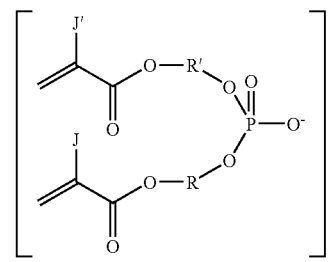
(1-4)

In the above general formulae (1-1) to (1-4), J and J' may be the same or different and represent H or $CH_3$; n represents 0 or 1; R and R' may be the same or different and represent an aliphatic hydrocarbon group having 1 to 600, preferably 2 to 100, and more preferably 2 to 20 carbon atoms, and may also contain an aromatic ring, an alicyclic group, an ether group, or an ester group.

Preferable examples of the compound (I) represented by the above general formula (1) include compounds represented by the following general formulae (1-1-1) and (1-1-2).

[Formula 17]

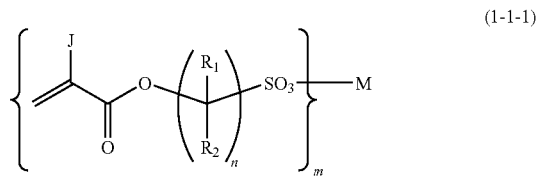
(1-1-1)

[Formula 18]

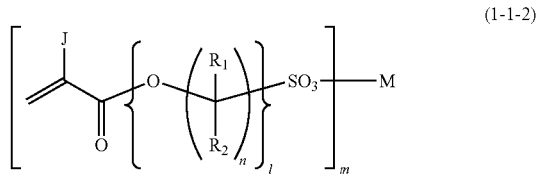
(1-1-2)

In the above general formulae (1-1-1) and (1-1-2), J represents H or $CH_3$.

$R_1$ and $R_2$ independently represent H, $CH_3$, and an ethyl group, and for simplicity of synthesis H is preferable.

Here, n represents an integer of 1 to 20, and similarly in view of easiness in synthesis, preferably 2 to 10, and more preferably 2 to 4;

m represents an integer of 1 to 2;

l represents an integer of 2 to 10, relatively preferably 2 to 6, and more preferably 2 to 4.

M represents H, an amine group, an alkali metal, or an alkaline earth metal.

As an amine group, ammonia, a primary amine, a secondary amine and a tertiary amine may be cited. Among them, ammonia, methylamine, dimethylamine, triethylamine, and the like, are relatively preferred.

As an alkali metal, lithium, sodium, potassium and rubidium may be cited as examples. As an alkaline earth metal, beryllium, magnesium, calcium, strontium, and the like may be cited.

Among H, an amine group, alkali metals, and alkaline earth metals, a monovalent alkali metal is preferable, and sodium, potassium, and rubidium are more preferable.

Among compounds represented by the general formulae (1-1-1) and (1-1-2), 2-sulfonylethyl-(meth)acrylate and an alkali metal salt thereof, and 3-sulfonylpropyl-(meth)acrylate and an alkali metal salt thereof are relatively preferable. The molecular weight of these compounds (I) having a hydrophilic group is 168 to 18,000, preferably 180 to 1,000, and more preferably 200 to 500.

A compound (I) represented by the general formulae (1), (1-1-1) and (1-1-2) may be used singly or in a combination of two or more kinds. Further, an oligomer of these monomer compounds or a mixture of a monomer and an oligomer may be used.

The compound (I) represented by the general formula (1) is a publicly known compound, which can be prepared by the methods described in, for example, Japanese Examined Patent Application Publication No. S49-36214, Japanese Examined Patent Application Publication No. S51-9732, Japanese Patent Laid-Open Publication No. S63-284157 and U.S. Pat. No. 3,024,221. More specifically, a compound represented by the general formula (1-1-1) is synthesized by a method in which (meth)acrylic acid is allowed to react with propane sultone in the presence of an alkali metal carbonate salt, and the compound represented by the general formula (1-1-2) is synthesized by a method in which hydroxyl groups of a polyol compound are partially halogenated with hydrogen halides, then causing the introduced halogens to react with an alkali metal sulfonate to give a hydroxyl group-containing alkali metal sulfonate compound, and finally causing the hydroxyl group to react with a (meth)acryloyl halide or a (meth)acrylic acid, and other methods.

A composition of the present invention contains a compound (II) having two or more (meth)acryloyl groups in a molecule, which is a crosslinking polymerizable compound, other than the above-mentioned compound (I).

In the following, the compound (II) will be explained.

As the (meth)acryloyl group, which is a polymerizable functional group of a compound (II) having two or more (meth)acryloyl groups in a molecule, a (meth)acryloyloxy group, a (meth)acryloylthio group, a (meth)acrylamide group, and the like may be cited. Among them, a (meth)acryloyloxy group or a (meth)acryloylthio group is preferred.

Examples of a more preferable compound among the compounds containing two or more (meth)acryloyl groups in a molecule include a compound having one or more of (a) hydroxyl group(s) and two or more (meth)acryloyl groups in a molecule, a compound having one or more ether bonds or thioether bonds and two or more (meth)acryloyl groups in a molecule, a compound having one or more ester bonds other than a (meth)acrylate group and two or more (meth)acryloyl groups in a molecule, a compound having one or more aliphatic or aromatic ring structures and two or more (meth)acryloyl groups in a molecule, a compound having one or more heterocyclic ring structures and two or more (meth)acryloyl groups in a molecule, and the like.

A compound represented by the following general formulae (2-1) or (2-2), for example, may be selected, as a particularly preferable compound containing two or more (meth)acryloyl groups in a molecule, among those preferable compounds including a compound having one or more hydroxyl groups and two or more (meth)acryloyl groups in a molecule, a compound having one or more ether bonds or thioether bonds and two or more (meth)acryloyl groups in a molecule, a compound having one or more ester groups other than a (meth)acrylate group and two or more (meth)acryloyl groups in a molecule, a compound having one or more aliphatic or aromatic ring structures and two or more (meth)acryloyl groups in a molecule, and a compound having one or more heterocyclic ring structures and two or more (meth)acryloyl groups in a molecule.

[Formula 19]

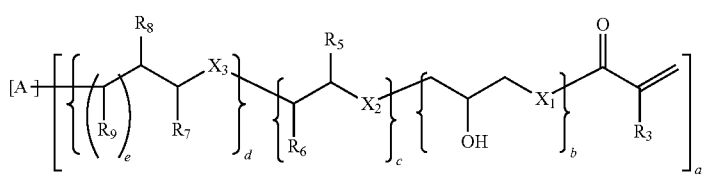

(2-1)

[Formula 20]

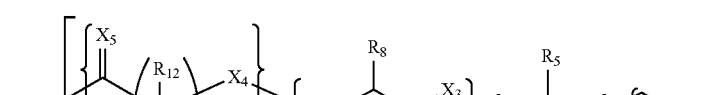

(2-2)

In the above formulae (2-1) and (2-2), A represents one kind selected from

[Formula 21]

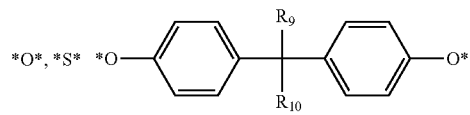

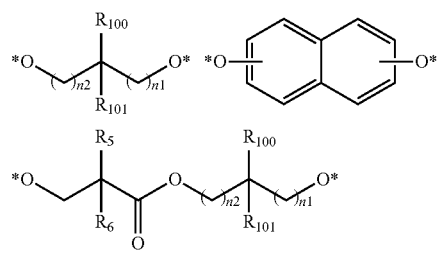

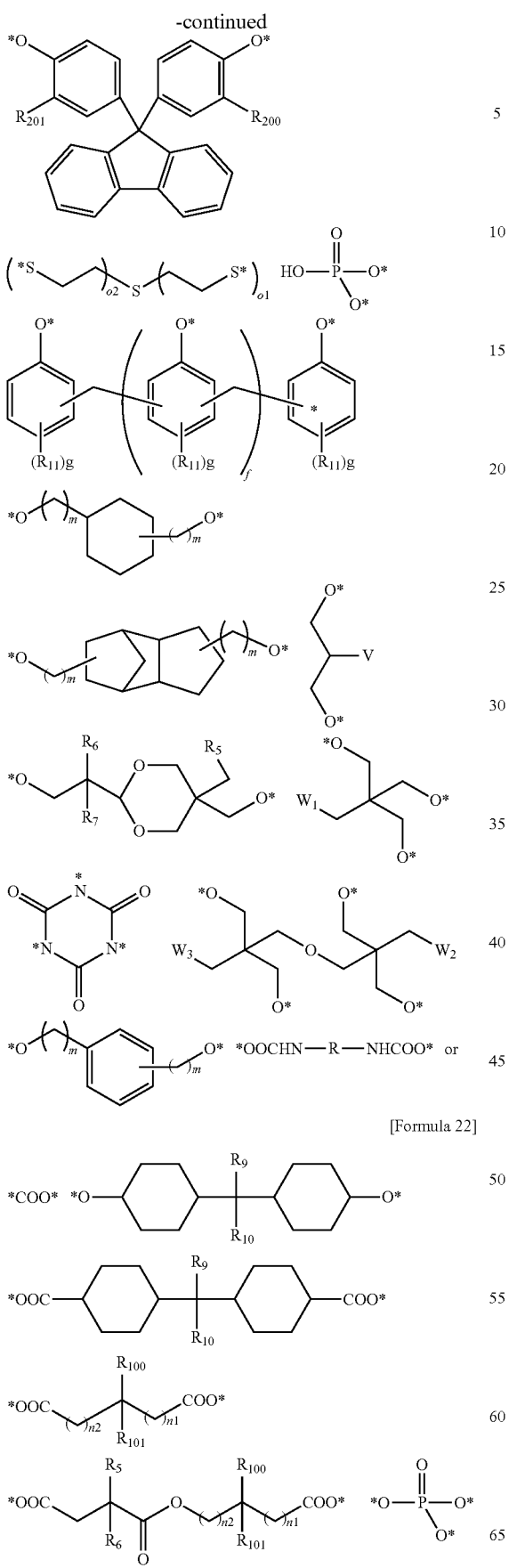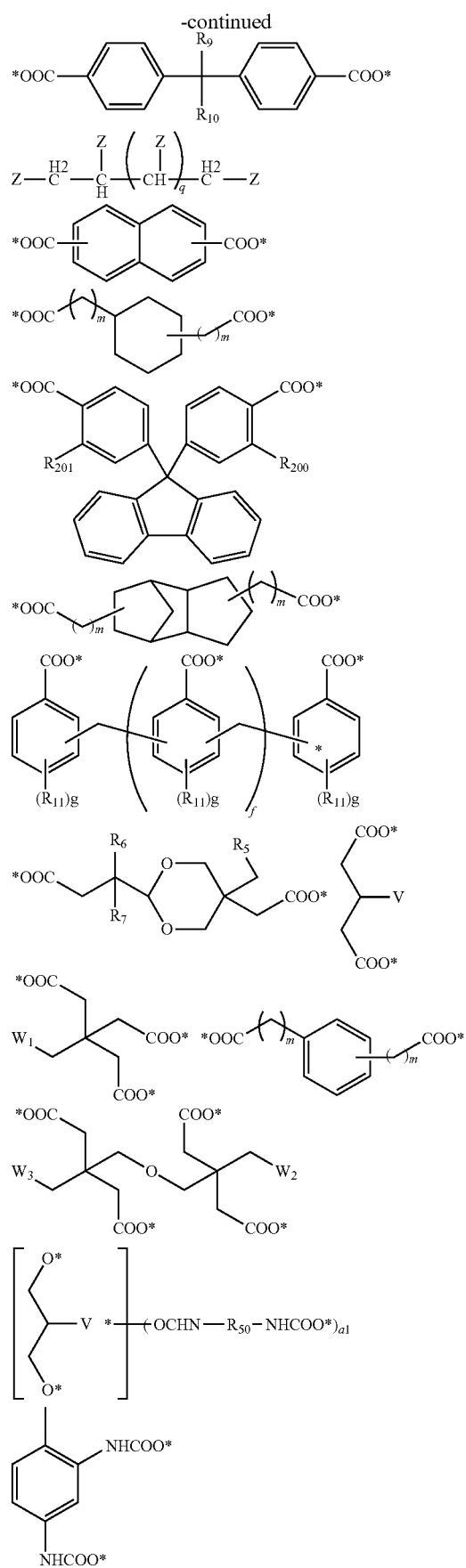

-continued

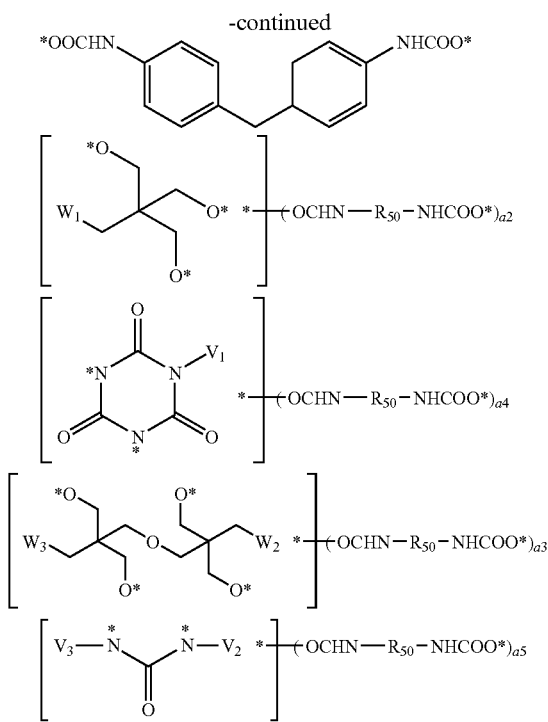

Here, * represents a bonding hand.

R represents hexamethylene, isophorone (1-methylene-3-ethylene-3-methyl-5,5-dimethylcyclohexane), norbornanedimethylene, dicyclohexylenemethane, cyclohexanedimethylene, or xylylene.

$R_3$ and $R_5$ to $R_9$ represent H or $CH_3$.

$X_1$, $X_2$ and $X_3$ represent O or S.

Here, a represents an integer of 2 to 30; b represents an integer of 0 to 2; c represents an integer of 0 to 30; d represents an integer of 0 to 20; e represents an integer of 0 to 2.

$R_{10}$ and $R_{11}$ represent H or $CH_3$; $R_{100}$ and $R_{101}$ represent H or an alkyl group having 1 to 6 carbon atoms; $R_{200}$ and $R_{201}$ represent H, $CH_3$ or a phenyl group.

V represents OH or an oxygen atom (O*) bonded to a carbon atom.

$W_1$ to $W_3$ represent H, $CH_3$, OH or an oxygen atom (O*) bonded to a carbon atom.

Here, n1 and n2 represent an integer of 0 to 8; o1 and o2 represent an integer of 1 to 3; m represents 0 or 1; f represents an integer of 1 to 20; g represents an integer of 0 to 3.

$R_{50}$ represents hexamethylene, isophorone (1-methylene-3-ethylene-3-methyl-5,5-dimethylcyclohexane), norbornanedimethylene, dicyclohexylenemethane, cyclohexanedimethylene, toluoylene, diphenylmethane, or xylylene.

$R_{12}$ and $R_{13}$ represent H or $CH_3$.

Here, a1 represents an integer of 2 to 3, preferably an integer of 3;

a2 represents an integer of 3 to 4, preferably an integer of 3;

a3 represents an integer of 4 to 6, preferably an integer of 5 to 6;

a4 represents an integer of 2 to 3, preferably an integer of 3;

a5 represents an integer of 2 to 4, preferably an integer of 3 to 4;

i represents an integer of 1 to 20, preferably an integer of 1 to 10, more preferably an integer of 1 to 5, and particularly more preferably an integer of 1 to 3;

k represents an integer of 1 to 10, preferably an integer of 2 to 8, and more preferably an integer of 2 to 6.

$V_1$ to $V_3$ independently represent H or a bonding hand (*).

Z represents OH or an oxygen atom (O*) bonded to a carbon atom, COOH, or a carboxyl group (COO*) bonded to a carbon atom.

Here, q represents an integer of 1 to 7, preferably an integer of 1 to 5, and more preferably an integer of 1 to 3.

Further, among compounds represented by the general formulae (2-1) and (2-2), the preferred embodiments include, for example, one represented by the general formula (3),

[Formula 23]

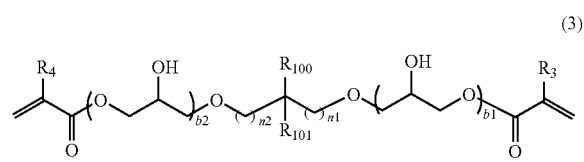

(3)

wherein, $R_3$ and $R_4$ represent H or $CH_3$, $R_{100}$ and $R_{110}$ represent H or an alkyl group having 1 to 6 carbon atoms, b1 and b2 represent an integer of 0 to 2, and n1 and n2 represent an integer of 0 to 8, or the general formula (4),

[Formula 24]

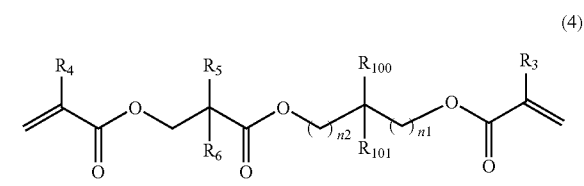

(4)

wherein, $R_3$ to $R_6$ represent H or $CH_3$, $R_{100}$ and $R_{10}$, represent H or an alkyl group having 1 to 6 carbon atoms, and n1 and n2 represent an integer of 0 to 8, or the general formula (5),

[Formula 25]

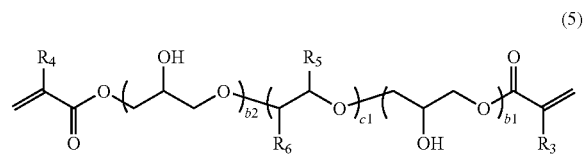

(5)

wherein, $R_3$ to $R_6$ represent H or $CH_3$, b1 and b2 represent an integer of 0 to 2, and c1 represents an integer of 2 to 30, or the general formula (6),

[Formula 26]

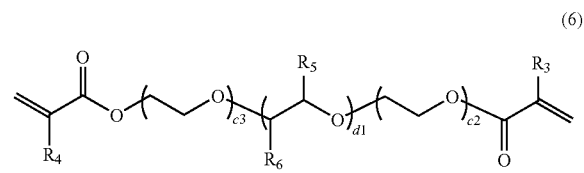

(6)

wherein, $R_3$ to $R_6$ represent H or $CH_3$, c2 and c3 represent an integer of 1 to 5, and d1 represents an integer of 2 to 20, or the general formula (7),

[Formula 27]

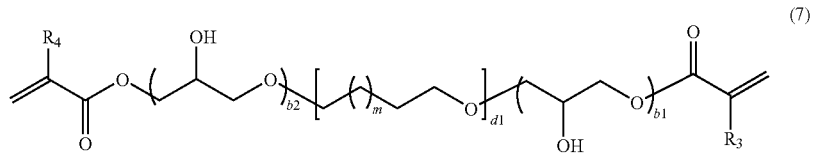

(7)

wherein, $R_3$ and $R_4$ represent H or $CH_3$, b1 and b2 represent an integer of 0 to 2, d1 represents an integer of 2 to 20, and m represents 0 or 1, or the general formula (8),

[Formula 28]

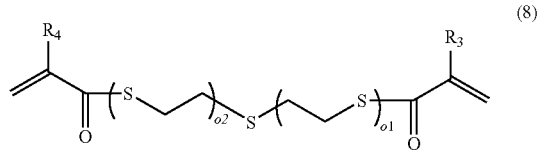

(8)

wherein, $R_3$ and $R_4$ represent H or $CH_3$, and o1 and o2 represent an integer of 1 to 3, or the general formula (9),

[Formula 29]

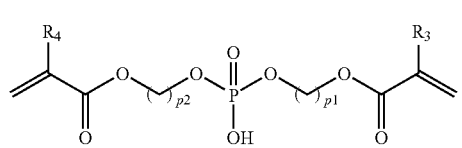

(9)

wherein, $R_3$ and $R_4$ represent H or $CH_3$, and p1 and p2 represent an integer of 1 to 6, or the general formula (10),

[Formula 30]

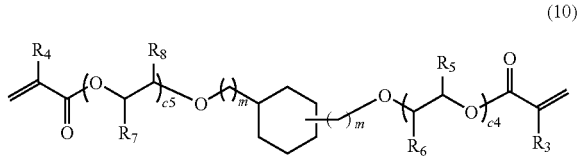

(10)

wherein, $R_3$ to $R_8$ represent H or $CH_3$, c4 and c5 represent an integer of 0 to 5, and m represents 0 or 1, or the general formula (11),

[Formula 31]

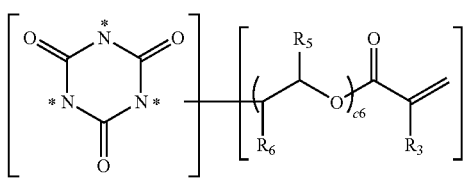

(11)

wherein, $R_3$ and $R_4$ represent H or $CH_3$, and m represents 0 or 1, or the general formula (12),

[Formula 32]

(12)

wherein, $R_3$ to $R_7$ represent H or $CH_3$, or the general formula (13),

[Formula 33]

(13)

wherein, * represents a bonding hand, $R_3$, $R_5$ and $R_6$ represent H or $CH_3$, and c6 represents an integer of 0 to 3, or the general formula (14),

[Formula 34]

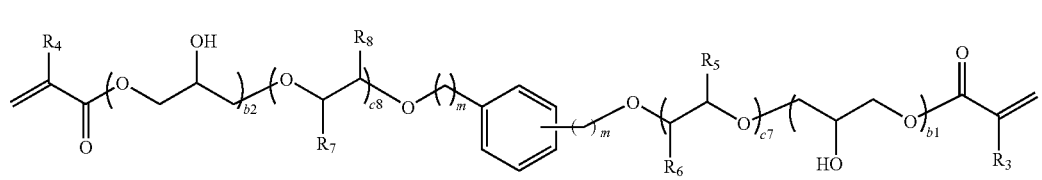

(14)

wherein, $R_3$ to $R_8$ represent H or $CH_3$, b1 and b2 represent an integer of 0 to 2, c7 and c8 represent an integer of 0 to 5, and m represents 0 or 1, or the general formula (15),

[Formula 35]

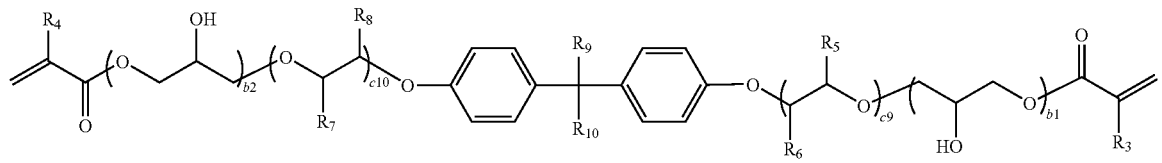

(15)

wherein, $R_3$ to $R_{10}$ represent H or $CH_3$, b1 and b2 represent an integer of 0 to 2, and c9 and c10 represent an integer of 0 to 30, or the general formula (16),

[Formula 35]

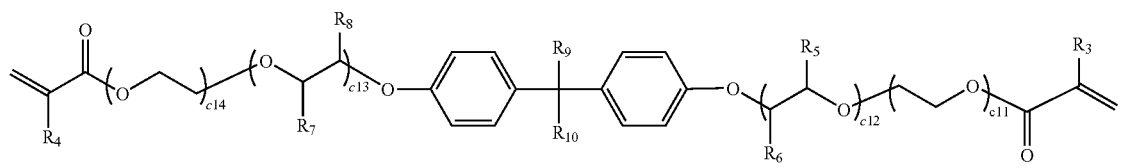

(16)

wherein, $R_3$ to $R_{10}$ represent H or $CH_3$, c11 to c14 represent an integer of 1 or above and satisfy c11+c12+c13+c14=4 to 30, or the general formula (17),

[Formula 37]

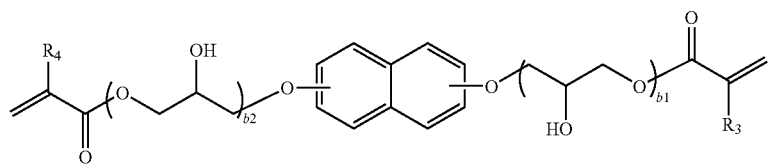

(17)

wherein, $R_3$ and $R_4$ represent H or $CH_3$, and b1 and b2 represent an integer of 0 to 2, or the general formula (18),

[Formula 38]

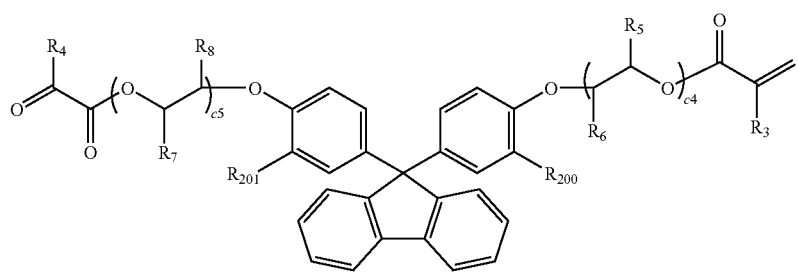

(18)

wherein, $R_3$ to $R_8$ represent H or $CH_3$, $R_{200}$ and $R_{201}$ represent H, $CH_3$, or a phenyl group, and c4 and c5 represent an integer of 0 to 5, or the general formula (19),

[Formula 39]

(19)

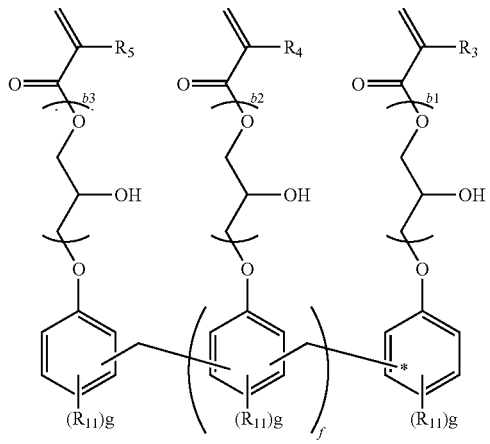

wherein, $R_3$ to $R_5$ and $R_{11}$ represent H or $CH_3$, by to b3 represent an integer of 0 to 2, and f represents an integer of 1 to 20, or the general formula (20),

[Formula 40]

(20)

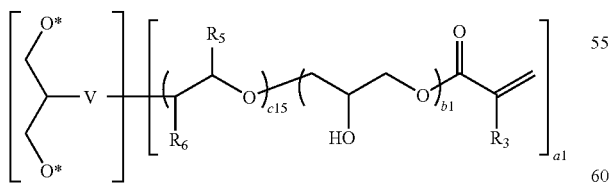

wherein, * represents a bonding hand, V represents OH or an oxygen atom (O*) bonded to a carbon atom, $R_3$, $R_5$ and $R_6$ represent H or $CH_3$, a1 represents 2 or 3, b1 represents an integer of 0 to 2, and c15 represents an integer of 0 to 20, or the general formula (21),

[Formula 41]

(21)

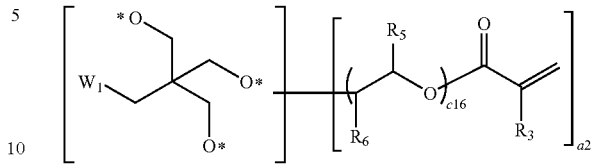

wherein, * represents a bonding hand, $W_1$ represents H, $CH_3$, OH, or an oxygen atom (O*) bonded to a carbon atom, $R_3$, $R_5$ and $R_6$ represent H or $CH_3$, a2 represents 3 or 4, and c16 represents an integer of 0 to 20, or the general formula (22),

[Formula 42]

(22)

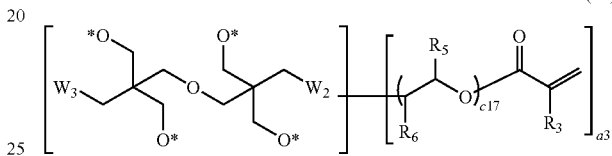

wherein, * represents a bonding hand, $W_2$ and $W_3$ represent H, $CH_3$, OH, or an oxygen atom (O*) bonded to a carbon atom, $R_3$, $R_5$ and $R_6$ represent H or $CH_3$, a3 represents an integer of 4 to 6, and c17 represents an integer of 0 to 3, or the general formula (23),

[Formula 43]

(23)

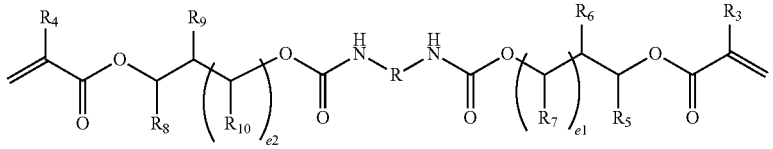

wherein, R represents hexamethylene, isophorone (1-methylene-3-ethylene-3-methyl-5,5-dimethyl-cyclohexane), norbornanedimethylene, dicyclohexylenemethane, cyclohexanedimethylene, or xylylene. $R_3$ to $R_{10}$ represent H or $CH_3$, and e1 and e2 represent an integer of 0 to 2, or the general formula (24),

[Formula 44]

(24)

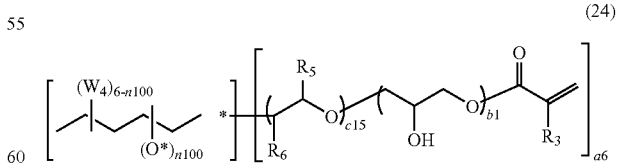

wherein, $R_3$, $R_5$ and $R_6$ independently represent H or $CH_3$, $W_4$ represent H, $CH_3$, OH, or an oxygen atom (O*) bonded to a carbon atom, b1 represents an integer of 0 to 2, c15 represents an integer of 0 to 20, and n100 represents an integer of 1 to 6, or the general formula (25),

[Formula 45]

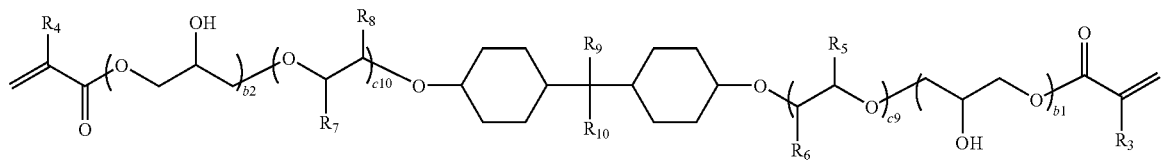
(25)

wherein, $R_3$ to $R_{10}$ represent H or $CH_3$, b1 and b2 represent an integer of 0 to 2, and c9 to c10 represent an integer of 0 to 5, or the general formula (26),

[Formula 46]

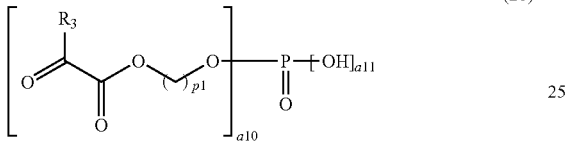
(26)

wherein, $R_3$ represents H or $CH_3$, p1 represents an integer of 1 to 6, a10 represents 1 or 3, and a11 represents an integer of 0 or 2, or the general formula (27),

[Formula 47]

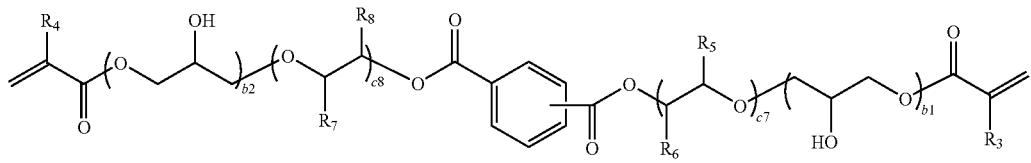
(27)

wherein, $R_3$ to $R_8$ represent H or $CH_3$, b1 and b2 represent an integer of 0 to 2, and c4 to c5 represent an integer of 0 to 5, or the general formula (28),

[Formula 48]

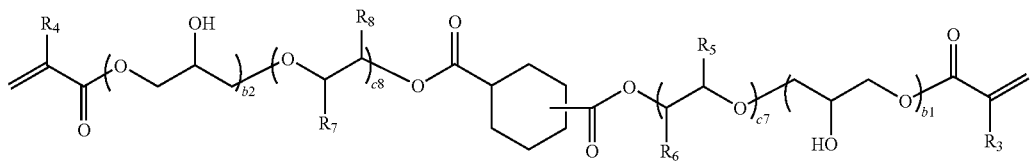
(28)

wherein, $R_3$ to $R_8$ represent H or $CH_3$, b1 and b2 represent an integer of 0 to 2, and c4 to c5 represent an integer of 0 to 5, or the general formula (29),

[Formula 49]

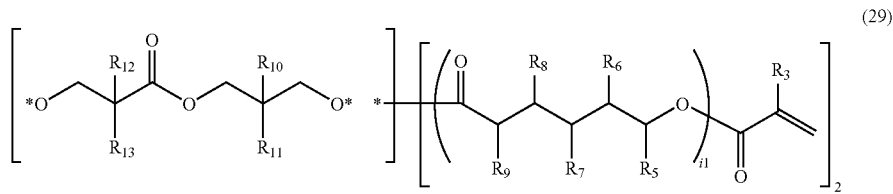

(29)

wherein, $R_3$ and $R_5$ to $R_{13}$ independently represent H or $CH_3$, and i1 represents an integer of 0 to 5, or the general formula (30),

[Formula 50]

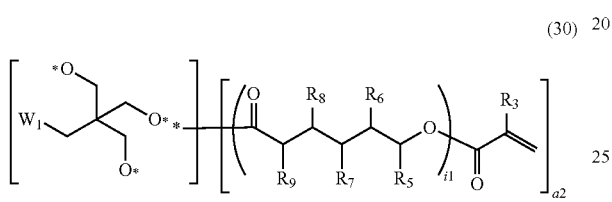

(30)

wherein, $R_3$ and $R_5$ to $R_9$ independently represent H or $CH_3$, $W_1$ represents H, $CH_3$, OH, or an oxygen atom (O*) bonded to a carbon atom, a2 represents 3 or 4, and i1 represents an integer of 0 to 5, or the general formula (31),

[Formula 51]

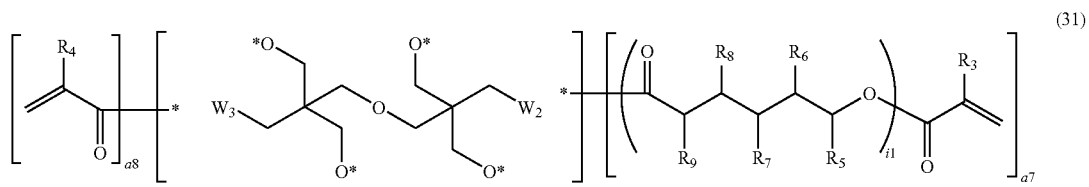

(31)

wherein, $R_3$ to $R_9$ independently represent H or $CH_3$, $W_2$ to $W_3$ independently represent H, $CH_3$, OH, or an oxygen atom (O*) bonded to a carbon atom, a7 represents an integer of 1 to 6, and a8 represents an integer of 0 to 5, and they satisfy a7+a8=2 to 6, or the general formula (32),

[Formula 52]

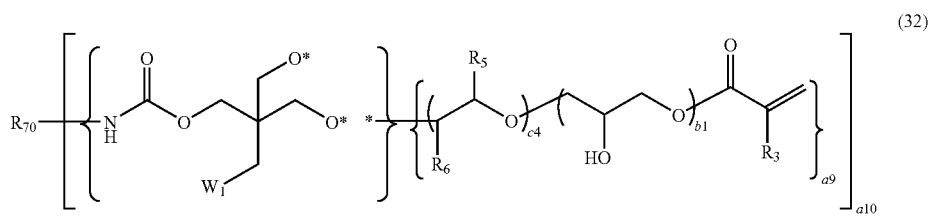

(32)

wherein, $R_{70}$ represents toluoylene, diphenylmethane, hexamethylene, isophorone (1-methylene-3-ethylene-3-methyl-5,5-dimethylcyclohexane), norbornanedimethylene, dicyclohexylenemethane, cyclohexanedimethylene, N,N',N''-tris(hexamethylene)isocyanurate, N,N,N'-tris(hexamethylene)urea, N,N,N',N'-tetrakis(hexamethylene)urea, or xylylene, $R_3$ and $R_5$ to R6 independently represent H or $CH_3$, $W_1$ represents H, $CH_3$, OH, or an oxygen atom (O*) bonded to a carbon atom, a9 represents an integer of 1 to 4, a10 represents an integer of 2 to 4, b1 represents an integer of 0 to 2, and c4 represents an integer of 0 to 5) or the general formula (33),

[Formula 53]

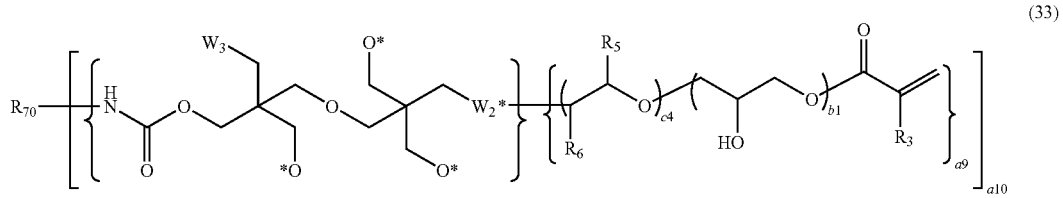

(33)

wherein, $R_{70}$ represents toluoylene, diphenylmethane, hexamethylene, isophorone (1-methylene-3-ethylene-3-methyl-5,5-dimethylcyclohexane), norbornanedimethylene, dicyclohexylenemethane, cyclohexanedimethylene, N,N',N''-tris(hexamethylene)isocyanurate, N,N,N'-tris(hexamethylene)urea, N,N,N',N'-tetrakis(hexamethylene)urea, or xylylene, $R_3$ and $R_5$ to $R_6$ independently represent H or $CH_3$, $W_1$ represents H, $CH_3$, OH, or an oxygen atom (O*) bonded to a carbon atom, a9 represents an integer of 1 to 4, a10 represents an integer of 2 to 4, b1 represents an integer of 0 to 2, and c4 represents an integer of 0 to 5, and the like.

A compound represented by the general formulae (2-1) to (2-2) and the general formulae (3) to (33) may be produced by a publicly known method, and are also available as a commercial product.

Specific examples of the compounds represented by the general formulae (3) to (23) include, for example,
<Compounds Represented by the General Formula (3)>
ethylene glycol di(meth)acrylate, 1,2-propanediol di(meth)acrylate, 1,3-propanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentylglycol di(meth)acrylate, 2-methyl-1,8-octanediol di(meth)acrylate, 2-butyl-2-ethyl-1,3-propanediol di(meth)acrylate, 1,2-bis{3-(meth)acryloyloxy-2-hydroxypropyloxy}ethane, 1,2-bis{3-(meth)acryloyloxy-2-hydroxypropyloxy}propane, 1,3-bis{3-(meth)acryloyloxy-2-hydroxypropyloxy}propane, 1,4-bis{3-(meth)acryloyloxy-2-hydroxypropyloxy}butane and 1,6-bis{3-(meth)acryloyloxy-2-hydroxypropyloxy}hexane,
<A Compound Represented by the General Formula (4)>
Neopentylglycol hydroxypivalic acid di(meth)acrylate,
<Compounds Represented by the General Formula (5)>
polyethylene glycol di(meth)acrylate, 1,2-polypropylene glycol di(meth)acrylate, 1,3-polypropylene glycol di(meth)acrylate, 1,4-polybutylene glycol di(meth)acrylate, polyethylene glycol-bis{3-(meth)acryloyloxy-2-hydroxypropyl}ether and 1,2-polypropylene glycol-bis{3-(meth)acryloyloxy-2-hydroxy-propyl}ether,
<A Compound Represented by the General Formula (6)>
1,2-polypropylene glycol-bis{(meth)acryloyl-poly(oxyethylene)}ether,
<Compounds Represented by the General Formula (7)>
1,3-polypropylene glycol di(meth)acrylate, 1,4-polybutylene glycol di(meth)acrylate and 1,4-polybutylene glycol-bis{3-(meth)acryloyloxy-2-hydroxy-propyl}ether,
<Compounds Represented by the General Formula (8)>
bis{2-(meth)acryloylthioethyl}sulfide and bis{5-(meth)acryloylthio-3-thiapentyl}sulfide,
<Compounds Represented by the General Formula (9)>
bis{2-(meth)acryloyloxyethyl}phosphoric acid, bis{3-(meth)acryloyloxypropyl}phosphoric acid, bis{4-(meth)acryloyloxybutyl}phosphoric acid and bis{6-(meth)acryloyloxyhexyl}phosphoric acid,
<Compounds Represented by the General Formula (10)>
cyclohexanediol di(meth)acrylate, bis{(meth)acryloyloxymethyl}cyclohexane, bis{7-(meth)acryloyloxy-2,5-dioxaheptyl}cyclohexane and bis{(meth)acryloyloxy-poly(ethyleneoxy)methyl}cyclohexane,
<A Compound Represented by the General Formula (11)>
tricyclodecanedimethanol di(meth)acrylate,
<A Compound Represented by the General Formula (12)>2-propenoic acid
{2-(1,1-dimethyl-2-{(1-oxo-2-propenyl)oxy}ethyl)-5-ethyl-1,3-dioxan-5-yl}methyl ester (trade name KAYARAD R-604, manufactured by Nippon Kayaku Co., Ltd.)
<A Compound Represented by the General Formula (13)>
N,N',N''-tris{2-(meth)acryloyloxyethyl}isocyanurate,
<Compounds Represented by the General Formula (14)>
xylylenediol di(meth)acrylate,
bis{7-(meth)acryloyloxy-2,5-dioxaheptyl}benzene and bis{(meth)acryloyloxy-poly(ethyleneoxy)methyl}benzene,
<Compounds Represented by the General Formula (15)>
bisphenol A di(meth)acrylate, bis{(meth)acryloyloxyethyl}bisphenol A, bis{(meth)acryloyloxypropyl}bisphenol A, bis{(meth)acryloyl-poly(oxyethylene)}bisphenol A, bis{(meth)acryloyl-poly(oxy-1,2-propylene)}bisphenol A, bis{3-(meth)acryloyloxy-2-hydroxypropyl}bisphenol A, bis{3-(meth)acryloyloxy-2-hydroxypropyloxyethyl}bisphenol A, bis{3-(meth)acryloyloxy-2-hydroxypropyloxypropyl}bisphenol A, bis{3-(meth)acryloyloxy-2-hydroxypropylpoly(oxyethylene)}bisphenol A and bis{3-(meth)acryloyloxy-2-hydroxypropyl-poly(oxy-1,2-propylene)}bisphenol A,
<Compounds Represented by the General Formula (16)>
bis{(meth)acryloyloxyethyloxypropyl}bisphenol A and bis{(meth)acryloylpoly(oxyethylene)-poly(oxy-1,2-propylene)}bisphenol A,
<Compounds Represented by the General Formula (17)>
naphthalenediol di(meth)acrylate and bis{3-(meth)acryloyloxy-2-hydroxypropyloxy}naphthalene,
<Compounds Represented by the General Formula (18)>
9,9-fluorenediol di(meth)acrylate, 9,9-bis{4-(2-(meth)acryloyloxyethyloxy)}fluorene and 9,9-bis{3-phenyl-4-(meth)acryloyloxy-poly(ethyleneoxy)}fluorene, <A Compound Represented by the General Formula (19)>
phenol novolak type epoxy(meth)acrylate (trade name NK Oligo EA-6320, EA-7120, EA-7420, manufactured by Shin-Nakamura Chemical Co., Ltd.), <Compounds Represented by the General Formula (20)>
glycerin-1,3-di(meth)acrylate, 1-acryloyloxy-2-hydroxy-3-methacryloyloxypropane, 2,6,10-trihydroxy-4,8-dioxaundecane-1,1'-di(meth)acrylate, 1,2,3-tris{3-(meth)acryloyloxy-2-hydroxypropyloxy}propane, 1,2,3-tris{2-(meth)acryloyloxyethyloxy}propane, 1,2,3-tris{2-(meth)acryloyloxypropyloxy}propane, 1,2,3-tris{(meth)acryloyloxy-poly(ethyleneoxy}propane and 1,2,3-tris{(meth)acryloyloxy-poly(1,2-propyleneoxy}propane, <Compounds Represented by the General Formula (21)>
trimethylolpropane tri(meth)acrylate, trimethylolpropane-tris{(meth)acryloyloxyethyloxy}ether, trimethylolpropane-tris{2-(meth)acryloyloxypropyloxy}ether, trimethylolpropane-tris{(meth)acryloyloxy-poly(ethyleneoxy)}ether, trimethylolpropane-tris{(meth)acryloyloxy-poly(1,2-propyleneoxy)}ether, pentaerythritol tri(meth)acrylate, pentaerythritol tetra(meth)acrylate, pentaerythritol-tetrakis{(meth)acryloyloxyethyloxy}ether, pentaerythritol-tetrakis{2-(meth)acryloyloxypropyloxy}ether, pentaerythritol-tetrakis{(meth)acryloyloxy-poly (ethyleneoxy)}ether and pentaerythritol-tetrakis{(meth)acryloyloxy-poly (1,2-propyleneoxy)}ether, <Compounds Represented by the General Formula (22)>
ditrimethylolpropane tetra(meth)acrylate, ditrimethylolpropane-tetrakis{(meth)acryloyloxyethyloxy}ether, ditrimethylolpropane-tetrakis{2-(meth)acryloyloxypropyloxy}ether, ditrimethylolpropane-tetrakis{(meth)acryloyloxy-poly (ethyleneoxy)}ether, itrimethylolpropane-tetrakis{(meth)acryloyloxy-poly (1,2-propyleneoxy)}ether, dipentaerythritol penta(meth)acrylate, dipentaerythritol hexa(meth)acrylate, dipentaerythritol-hexa{(meth)acryloyloxyethyloxy}ether, dipentaerythritol-hexa{2-(meth)acryloyloxypropyloxy}ether, dipentaerythritol-hexa{(meth)acryloyloxy-poly(ethyleneoxy)}ether and dipentaerythritol-hexa{(meth)acryloyloxy-poly(1,2-propyleneoxy)}ether, <Compounds Represented by the General Formula (23)>
urethane compounds obtained by the reactions of 2-hydroxyethyl (meth)acrylate, 2-hydroxypropyl (meth)acrylate, 3-hydroxypropyl (meth)acrylate, or 4-hydroxybutyl (meth)acrylate with hexamethylene diisocyanate, and similarly isophorone diisocyanate, bis(isocyanatomethyl)norbornane, bis(4-isocyanatocyclohexyl)methane, 1,3-bis(isocyanatomethyl)cyclohexane, m-xylylenediisocyanate, and the like.

In a composition of the present invention, a blending ratio between a compound (I), represented by the general formulae (1), (1-1-1) and (1-1-2), and a compound (II) having two or more (meth)acryloyl groups in a molecule may be determined appropriately depending on the characteristics required of a polymer to be obtained.

For example, when a composition formed by blending a compound (I) and a compound (II) is copolymerized at a molar ratio of usually 15:1 to 1:30, preferably 2:1 to 1:20, 1:1 to 1:25, or 1:1 to 1:15, and more preferably 1:3 to 1:23, there is obtained a copolymer having high surface hardness and high hydrophilicity with a water-contact angle of 30° or less and preferably 20° or less, or even high surface harness and super hydrophilicity with a water-contact angle of 10° or less. A single layer film of a copolymer having high hydrophilicity with a water-contact angle of 20° or less is preferably used as an antifogging material, an antifouling material and an antistatic material, and particularly preferably used if a water-contact angle is 10° or less. Further, in a single layer film of the present invention, a lower limit of the water-contact angle may be 0°.

Further, a composition of the present invention containing a compound (I) and a compound (II) may further contain a polymerizable compound (III) having a different chemical structure from that of these compounds. As an example for such a compound, a compound having one polymerizable unsaturated double bond in a molecule having a chemical structure different from those of the compounds represented by the general formulae (1), (1-1-1) and (1-1-2), a compound having an isocyanate group in a molecule, and the like, may be mentioned.

Examples of such compounds include (meth)acrylic acid, hydroxyethyl(meth)acrylate, hydroxypropyl(meth)acrylate, hydroxybutyl(meth)acrylate, methyl(meth)acrylate, ethyl (meth)acrylate, butyl(meth)acrylate, isobornyl(meth)acrylate, N,N-dimethyl-aminoethyl-(meth)acrylate, a quaternary compound of N,N-dimethyl-aminoethyl-(meth)acrylate, 2-(meth)acryloyloxyethyl-phosphoric acid, sodium vinylsulfonate, styrenesulfonic acid, sodium styrenesulfonate, potassium styrenesulfonate, 2-acrylamide-2-methylpropane-sulfonic acid, potassium 2-acrylamide-2-methylpropanesulfonate, allyl (meth)acrylate, diethylene glycol bis(allyl carbonate), diallyl phthalate, divinylbenzene, divinylsulfone, glycidyl (meth)acrylate, 3-isopropenyl-α,α-dimethyl-benzyl isocyanate, (meth)acryloyl isocyanate, (meth)acryloyloxyethyl isocyanate, xylylene diisocyanate, hexamethylene diisocyanate, bis(isocyanatomethyl)norbornane, isophorone diisocyanate, 1,3-bis(isocyanatomethyl)cyclohexane, bis(4-isocyanatocyclohexyl)methane, and the like.

A composition of the present invention may further contain a polymerizable compound (III) having a different chemical structure from those of a compound (I) and compound (II), and when the compound (III) is added, the selection and the amount added thereof may be determined appropriately depending on characteristics required of a polymer to be obtained.

A single layer film of a hydrophilic copolymer having controlled physical properties such as flexibility, tenacity and the like can be obtained by polymerizing, for example, a composition prepared by blending a composition, containing a compound (I) represented by the general formulae (1), (1-1-1) and (1-1-2) and a compound (II) having two or more (meth)acryloyl groups in a molecule at a molar ratio of 15:1 to 1:30, with a polymerizable compound (III) having a different chemical structure from that of the above compounds at 1 to 100 mol %, preferably 1 to 49 mol %, and more preferably 1 to 40 mol % relative to the total weight of compounds (I) and (II).

An antifogging material, an antifouling material, an antistatic material and a multilayer body comprising a single layer film of a hydrophilic copolymer can be obtained by polymerizing a composition containing a compound (I) represented by the general formulae (1), (1-1-1) and (1-1-2) and a compound (II) having two or more (meth)acryloyl groups in a molecule at a molar ratio of 15:1 to 1:30, preferably 2:1 to 1:20, 1:1 to 1:25, or 1:1 to 1:15, and particularly preferably 1:3 to 1:23.

Also, an antifogging material, an antifouling material, an antistatic material and a multilayer body comprising a single layer film of a hydrophilic copolymer can be obtained by polymerizing a composition prepared by blending a composition, containing a compound (I) represented by the general formulae (1), (1-1-1) and (1-1-2) and a compound (II) having two or more (meth)acryloyl groups in a molecule at a molar ratio of 15:1 to 1:30, preferably 2:1 to 1:20, 1:1 to 1:25, or 1:1 to 1:15, and particularly preferably 1:3 to 1:23, with a polymerizable compound (III) having a different chemical structure from that of the above compounds in the range of 1 to 49 mol %, preferably 1 to 30 mol %, and more preferably 3 to 20 mol % relative to the total moles of compounds (I) and (II).

When polymerizing the above-mentioned composition, various kinds of additives such as a polymerization initiator, a catalyst, a polymerization accelerator, a UV light absorber, an infrared beam absorber, a radical scavenger, an internal release agent, an antioxidant, a polymerization inhibitor, HALS, a pigment, a binder, a leveling agent and the like may be added when necessary as far as the antifogging property of the obtained polymer is not impaired.

When copolymerizing these compositions by radiation ray, for example by UV light, publicly known photo-polymerization initiators such as a photo radical polymerization initiator, a photo cationic polymerization initiator, or a photo anionic polymerization initiator and the like, particularly a photo radical polymerization initiator, is preferably used. Further, when appropriate, a photo-polymerization accelerator may be used.

Specific examples of preferably used photo radical polymerization initiators include Irgacure 651 (manufactured by Ciba Specialty Chemicals Inc.), Irgacure 184 (manufactured by Ciba Specialty Chemicals Inc.), Darocure 1173 (manufactured by Ciba Specialty Chemicals Inc.), benzophenone, 4-phenylbenzophenone, Irgacure 500 (manufactured by Ciba Specialty Chemicals Inc.), Irgacure 2959 (manufactured by Ciba Specialty Chemicals Inc.), Irgacure 127 (manufactured by Ciba Specialty Chemicals Inc.), Irgacure 907 (manufactured by Ciba Specialty Chemicals Inc.), Irgacure 369 (manufactured by Ciba Specialty Chemicals Inc.), Irgacure 1300 (manufactured by Ciba Specialty Chemicals Inc.), Irgacure 819 (manufactured by Ciba Specialty Chemicals Inc.), Irgacure 1800 (manufactured by Ciba Specialty Chemicals Inc.), Darocure TPO (manufactured by Ciba Specialty Chemicals Inc.), Darocure 4265 (manufactured by Ciba Specialty Chemicals Inc.), Irgacure OXE01 (manufactured by Ciba Specialty Chemicals Inc.), Irgacure OXE02 (manufactured by Ciba Specialty Chemicals Inc.), Esacure KT55 (manufactured by Lamberti S.P.A.), Esacure KIP150 (manufactured by Lamberti S.P.A.), Esacure KIP100F (manufactured by Lamberti S.P.A.), Esacure KT37 (manufactured by Lamberti S.P.A.), Esacure KT046 (manufactured by Lamberti S.P.A.), Esacure 1001M (manufactured by Lamberti S.P.A.), Esacure KIP/EM (manufactured by Lamberti S.P.A.), Esacure DP250 (manufactured by Lamberti S.P.A.), Esacure KB1 (manufactured by Lamberti S.P.A.), and 2,4-diethylthioxanton. Among them, more preferably used photo radical polymerization initiators include Irgacure 184 (manufactured by Ciba Specialty Chemicals Inc.), Darocure 1173 (manufactured by Ciba Specialty Chemicals Inc.), Irgacure 500 (manufactured by Ciba Specialty Chemicals Inc.), Irgacure 819 (manufactured by Ciba Specialty Chemicals Inc.), Darocure TPO (manufactured by Ciba Specialty Chemicals Inc.), Esacure KIP100F (manufactured by Lamberti S.P.A.), Esacure KT37 (manufactured by Lamberti S.P.A.) and Esacure KT046 (manufactured by Lamberti S.P.A.).

Examples of preferably used photo cationic polymerization initiators include Irgacure 250 (manufactured by Ciba Specialty Chemicals Inc.), Irgacure 784 (manufactured by Ciba Specialty Chemicals Inc.), Esacure 1064 (manufactured by Lamberti S.P.A.), CYRAURE UV16990 (manufactured by Union Carbide Corp. Japan), Adeka Optomer SP-172 (manufactured by Asahi Denka Co., Ltd.), Adeka Optomer SP-170 (manufactured by Asahi Denka Co., Ltd.), Adeka Optomer SP-152 (manufactured by Asahi Denka Co., Ltd.) and Adeka Optomer SP-150 (manufactured by Asahi Denka Co., Ltd.).

Examples of preferably used photo-polymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino)benzophenone, 2-ethylanthraquinone and camphorquinone.

The amount of these photo-polymerization initiators to be used is preferably 0.1 to 20 parts by weight, more preferably 0.5 to 10 parts by weight, and particularly preferably 1 to 5 parts by weight, relative to 100 parts by weight of the total of a compound (I), a compound (II), and optionally a compound (III).

<Treatment for Improving Weather Resistance>

In order for a copolymer of the present invention, when used, for example, as an antifouling material or an antifogging material, not to be deteriorated by exposure for a long period of time, it is preferable to add further a UV light absorber and a hindered amine type light stabilizer to a composition containing the above-mentioned compound (I), compound (II) and optional compound (III).

<A UV Light Absorber>

A UV light absorber to be used is not particularly restricted, and various kinds of UV light absorbers that are generally manufactured or sold as a UV light absorber, including a benzotriazole type, a triazine type, a benzophenone type, a benzoate type, a propanedioic acid ester type, an oxanilide type, and the like, may be used.

Specific examples include benzotriazole type UV light absorbers such as 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-one-4-oxadodecyl)-6-tert-butyl-phenol, 2-{5-chloro(2H)-benzotriazol-2-yl}-4-(3-one-4-oxadodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentylphenol, 2-{5-chloro(2H)-benzotriazol-2-yl}-4,6-di-tert-butyl-phenol, 2-(2H-benzotriazol-2-yl)-4-tert-octylphenol, 2-(2H-benzotriazol-2-yl)-4-methyl-6-n-dodecylphenol, a reaction product between methyl-3-{3-(2H-benzotriazol-2-yl)-5-tert-butyl-4-hydroxyphenyl}propionate and polyethylene glycol 300, and the like; triazine type UV light absorbers such as 2-(4-phenoxy-2-hydroxyphenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-isooctyloxyphenyl)-4,6-di(2,4-dimethyl phenyl)-1,3,5-triazine, Tinuvin 400 (trade name, manufactured by Ciba Specialty Chemicals, Inc.), Tinuvin 405 (trade name, manufactured by Ciba Specialty Chemicals, Inc.), Tinuvin 460 (trade name, manufactured by Ciba Specialty Chemicals, Inc.), Tinuvin 479 (trade name, manufactured by Ciba Specialty Chemicals, Inc.) and the like; benzophenone type UV light absorbers such as 2-hydroxy-4-n-octoxybenzophenone and the like; benzoate type UV light absorbers such as 2,4-di-tert-butylphenyl-3,5-di-tert-butyl-4-hydroxybenzoate and the like; propanedioic acid ester type UV light absorbers such as propanedioic acid {(4-methoxyphenyl)methylene}dimethyl ester, Hostavin PR-25 (trade name, manufactured by Clariant (Japan) K.K.), Hostavin B-CAP (trade name, manufactured by Clariant (Japan) K.K.) and the like; oxanilide type UV light absorbers such as 2-ethyl-2'-ethoxy-oxanilide, Sanduvor VSU (trade name, manufactured by Clariant (Japan)

K.K.) and the like, and others. Among these UV light absorbers, a triazine type UV light absorber tends to be preferable.
<A Hindered Amine Type Light Stabilizer>
Hindered amine light stabilizers (HALS) to be used are compounds having a 2,2,6,6-tetramethylpiperidine skeleton, which are generally abbreviated and generically named as HALS, and they are roughly classified depending on their molecular weight into a low molecular weight HALS, a medium molecular weight HALS and a high molecular weight HALS, and into a reactive type HALS.

Specific examples of these HALS include, for example, Tinuvin 111FDL (trade name, manufactured by Ciba Specialty Chemicals, Inc.), bis(1-octyloxy-2,2,6,6-tetramethyl-4-piperidyl)sebacate (trade name Tinuvin 123, manufactured by Ciba Specialty Chemicals, Inc.)), Tinuvin 144 (trade name, manufactured by Ciba Specialty Chemicals, Inc.), Tinuvin 292 (trade name, manufactured by Ciba Specialty Chemicals, Inc.), Tinuvin 765 (trade name, manufactured by Ciba Specialty Chemicals, Inc.), Tinuvin 770 (trade name, manufactured by Ciba Specialty Chemicals, Inc.), N,N'-bis (3-aminopropyl)ethylenediamine-2,4-bis[N-butyl-N-(1,2,2,6,6-pentamethyl-4-piperidyl)amino]-6-chloro-1,3,5-triazine condensate (trade name CHIMASSORB 119FL, manufactured by Ciba Specialty Chemicals, Inc.), CHIMASSORB 2020FDL (trade name, manufactured by Ciba Specialty Chemicals, Inc.), dimethyl succinate-1-(2-hydroxyethyl)-4-hydroxy-2,2,6,6-tetramethylpiperidine polycondensate (trade name CHIMASSORB 622LD, manufactured by Ciba Specialty Chemicals, Inc.), poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}] (trade name CHIMASSORB 944FD, manufactured by Ciba Specialty Chemicals, Inc.), Sanduvor 3050 Liq. (trade name, manufactured by Clariant (Japan) K.K.), Sanduvor 3052 Liq. (trade name, manufactured by Clariant (Japan) K.K.), Sanduvor 3058 Liq. (trade name, manufactured by Clariant (Japan) K.K.), Sanduvor 3051 Powder (trade name, manufactured by Clariant (Japan) K.K.), Sanduvor 3070 Powder (trade name, manufactured by Clariant (Japan) K.K.), VP Sanduvor PR-31 (trade name, manufactured by Clariant (Japan) K.K.), Hostavin N20 (trade name, manufactured by Clariant (Japan) K.K.), Hostavin N24 (trade name, manufactured by Clariant (Japan) K.K.), Hostavin N30 (trade name, manufactured by Clariant (Japan) K.K.), Hostavin N321 (trade name, manufactured by Clariant (Japan) K.K.), Hostavin PR-31 (trade name, manufactured by Clariant (Japan) K.K.), Hostavin 845 (trade name, manufactured by Clariant (Japan) K.K.), Nyrostab S-EED (trade name, manufactured by Clariant (Japan) K.K.), and the like.

The amounts of a UV light absorber and HALS to be added are not particularly restricted, and usually the amount of a UV light absorber is 0.1 to 20 parts by weight and preferably 0.5 to 10 parts by weight, and that of HALS is 0.1 to 10 parts by weight, preferably 0.5 to 5 parts by weight, and more preferably 1 to 3 parts by weight, relative to 100 parts by weight of the total weight of polymerizable monomers of the above-mentioned compounds (I), (II), and optionally (III), and the like.

Concerning the composition containing a UV light absorber or a HALS in the above-mentioned range, there is a great improvement in weather resistance of an obtained copolymer and polymerization is sufficiently performed. However, a composition containing a UV light absorber or a HALS at an amount of less than 0.1 parts by weight tends to show a reduced improvement in weather resistance of an obtained copolymer. On the other hand, a composition containing more than 20 parts by weight of a UV light absorber or more than 10 parts by weight of a HALS results in insufficient polymerization in some cases.

Further, when polymerizing the above-mentioned composition, a solvent may be added when necessary. Examples of preferable solvents include polar solvents such as water, methanol, ethanol, isopropanol (IPA), n-butanol, N,N'-dimethylformamide (DMF), alkoxyethanol, alkoxypropanol, alkylene glycol, alkylene glycol methyl ether, an alcohol such as glycerin, a mixture of water and an alcohol, and the like.

The amount of a solvent to be used is not particularly restricted and may be determined appropriately from the economic standpoint and the like.

Further, the polymerization method of the above-mentioned composition is not restricted, and a publicly known method may be used. Usually, the polymerization is carried out by heat or radiation ray, but both may be used simultaneously.

The polymerization reaction of the above-mentioned composition can be carried out under air, but it is preferable to carry out the reaction under an inert gas such as nitrogen and the like in view of shortening the polymerization time.

When heat is used, heating is usually carried out at room temperature to 300° C. or less in the presence of a radical generating agent such as an organic peroxide and the like to the composition.

When radiation ray is used, an energy beam with a wavelength in the range of 0.0001 to 800 nm, which is classified into, for example, α-ray, β-ray, γ-ray, X-ray, electron beam, UV light, visible light, and the like, may be cited. They can be selected appropriately in accordance with the above-mentioned composition.

Among them, UV light is preferably in the wavelength range of 200 to 450 nm, more preferably 370 to 445 nm, and further more preferably 370 to 430 nm. Particularly when UV light having an output peak in the range of 370 to 400 nm is used, there are few problems of yellowing, thermal distortion and the like during polymerization, and polymerization can be accomplished in a relatively short time even when a UV light absorber is added, thus it is particularly preferable.

When radiation ray is used for polymerization to obtain a single layer film (copolymer) of the present invention after addition of a UV light absorber and a hindered amine type light stabilizer to the composition, use of radiation ray (UV light) having an output peak in the range of 370 to 430 nm is preferable.

The use of an electron beam in the range of 0.01 to 0.002 nm is also preferable because polymerization is completed within a short time although the equipment is expensive.

An antifogging material, an antifouling material, an antistatic material and a multilayer body comprising a single layer film of a hydrophilic copolymer can be obtained, for example, by polymerizing a composition prepared by blending a composition, containing a compound (I) represented by the general formulae (1), (1-1-1) and (1-1-2) and a compound (II) having two or more (meth)acryloyl groups in a molecule at a molar ratio of 15:1 to 1:30, preferably 2:1 to 1:20, 1:1 to 1:25, or 1:1 to 1:15, and particularly preferably 1:3 to 1:23, with a polymerizable compound (III) having a different chemical structure from those of the above compounds in the range of 1 to 49 mol %, preferably 1 to 30 mol %, and more preferably 3 to 20 mol % relative to the total moles of compounds (I) and (II).

A multilayer body of the present invention comprises the above-mentioned single layer film and a substrate layer mentioned below, in which the single layer film is formed on at least one side of the substrate layer.

A method for producing a multilayer body of the present invention is putting a single layer film on a substrate layer. In other words, a coating layer of a composition containing a compound (I) represented by the afore-mentioned general formulae (1), (1-1-1) and (1-1-2) and a compound (II) having two or more (meth)acryloyl groups in a molecule at a molar ratio of 15:1 to 1:30 is formed on at least one side of a substrate layer and then the coating layer is copolymerized to distribute at least one kind of anionic hydrophilic group selected from a sulfonic acid group, a carboxyl group and a phosphate group in the single layer film of the obtained copolymer in such a way that the anion concentration ratio (Sa/Da) of the anion concentration at a surface (Sa) to the anion concentration at a deep part (Da) of the layer on the substrate material is 1.1 or more. A water-contact angle of the single layer film of thus produced multilayer body is 30° or less, advantageously 20° or less, and more advantageously 10° or less.

Further, methods for producing an antifogging coating film, an antifouling coating film and an antistatic coating film are not restricted, and there may be cited as an example, a method in which the above-mentioned composition is coated on a surface of a substrate material, then cured by polymerization to form an antifogging coating film, an antifouling coating film and an antistatic coating film on the substrate surface.

Examples of the substrate material include inorganic materials such as glass, silica, a metal, a metal oxide and the like, organic materials such as polymethyl methacrylate, polycarbonate, polyethylene terephthalate, polyethylene, polypropylene, polystyrene, a polyurethane resin, an epoxy resin, a vinyl chloride resin, a silicone resin, paper, pulp and the like, and a hardened coating material coated on a surface of these inorganic/organic materials and the like.

The surface of these substrate materials may be treated chemically or physically, if necessary, by such treatments as corona treatment and the like, and also a primer may be applied. By covering the surface of the above-mentioned substrate material with the above-mentioned single layer film, antifogging coating film, antifouling coating film and antistatic coating film, a multilayer body covered with an antifogging coating film, an antifouling coating film and an antistatic coating film can be obtained.

The primer treatment may be performed, in order to improve adhesiveness (adherence) to a substrate material, by a corona treatment, a flame treatment, a plasma treatment, an undercoat treatment and the like for a surface activation treatment of the surface. For example, surface activation treatments such as a corona treatment, an ozone treatment, a low-temperature plasma treatment using an oxygen gas, or a nitrogen gas and the like, a glow discharge treatment, an oxidation treatment using a chemical agent and the like, or in place of these treatments, a surface activation treatment using a primer coating agent, an undercoating material, an anchor coating material, and the like is preferable.

As these coating materials, a resin composition containing, for example, a polyester resin, a polyamide resin, a polyurethane resin, an epoxy resin, a phenol resin, a (meth)acryl resin, a poly(vinyl acetate) resin, polyolefin resins such as polyethylene, polypropylene and the like or copolymers thereof or modified resins thereof, a cellulose resin, and the like as a main component of a vehicle may be used.

As these coating materials, both a solvent type and an aqueous type may be used, and a modified polyolefin type, an ethylvinylalcohol type, a polyethyleneimine type, a polybutadiene type, a polyurethane type, a polyester type polyurethane emulsion, a poly(vinyl chloride) emulsion, a urethane acrylic emulsion, a silicone acrylic emulsion, a vinyl acetate acrylic emulsion, an acrylic emulsion, a styrene-butadiene copolymer latex, an acrylonitrile-butadiene copolymer latex, a methyl methacrylate-butadiene copolymer latex, a chloroprene latex, a rubber type latex of polybutadiene latex, a polyacrylate ester latex, a polyvinylidene chloride latex, a polybutadiene latex, or products of latex thereof modified by a carboxyl acid or dispersion thereof are preferable. As a coating method for these coating materials, for example, a gravure coating, a reverse roll coating, a knife coating, a kiss coating, and the like may be used. The amount of a coating material is usually 0.05 g/m² to 5 g/m² on dry basis. Among these coating materials, a coating material of a polyurethane type is preferable.

The coating material of polyurethane type is not particularly restricted as far as the coating material has a urethane bond at a main chain or a side chain, and for example, there is a compound having a urethane bond at a main chain or a side chain and also as another example, a compound having a urethane bond formed by reacting a polyol such as polyester polyol, polyether polyol, acrylic polyol and the like with an isocyanate compound having an isocyanate group. Among them, a polyurethane type coating material obtained by mixing a polyester polyol such as a condensed polyester polyol, a lactone type polyester polyol and the like with an isocyanate compound such as tolylene diisocyanate, hexamethylene diisocyanate, xylene diisocyanate and the like is preferable in view of excellent adhesiveness.

The method for mixing a polyol compound and an isocyanate compound is not particularly restricted. The blending ratio is not particularly restricted either, but it is preferable that the equivalence ratio of OH groups of a polyol compound and NCO groups of an isocyanate compound is 2/1 to 1/40 since curing is sometimes insufficient when the amount of an isocyanate compound is too small.

The substrate layer of the present invention may include a substrate whose surface is activated as mentioned above.

Further, when the substrate material is in the form of film, for example, an adhesive layer mentioned below may be formed on the side where a composition of the present invention is not laminated (coated), and further a releasing film may be provided on the surface of the adhesive layer. When an adhesive layer is formed on the other side of the substrate film, the multilayer film can be easily adhered as an antifogging film and an antifouling film on glass, a mirror in a bathroom and the like, a display, a surface of display material of a television set and the like, a signboard such as a trade sign, an advertising display, a guide board and the like, a guiding sign of railroad, road and the like, an outer wall of buildings, a windowpane, and the like.

The adhesive material to be used for an adhesive layer is not particularly restricted and any publicly known adhesive material can be used. Examples of adhesive materials include an acrylic type, a rubber type, a vinyl ether polymer type, a silicone type, and the like. The thickness of the adhesive layer is usually 2 to 50 μm and preferably 5 to 30 μm.

Further, for the purpose of avoiding polymerization inhibition by oxygen, a composition of the present invention may be coated on a substrate material and dried if necessary, followed by covering thus obtained coated layer with a coating material (such as a film) and polymerizing by irradiation of radiation ray. When covering the coat layer with a coating material, it is preferable to firmly bring the coat layer into contact with the covering material so that no air (oxygen) is entrapped in between. By shutting out oxygen, the amounts of, for example, a (photo) polymerization initiator and irradiation of radiation ray may be reduced in some cases.

Further, a single layer film and a multilayer body formed by laminating the single layer film of the present invention can be formed by putting the coating material used in the above on the single layer film and the multilayer body formed by laminating the single layer film. When the covering material is laminated, damaging or fouling of the single layer film can be prevented during transportation, storage, display and the like of the single layer film and the multilayer body formed by laminating the single layer film.

As the coating material, any material and form may be used as far as oxygen is shut out, but from the viewpoint of workability, a form of film, above all a transparent film that enables easy radiation polymerization, is preferable. The thickness of the film is usually 3 to 200 μm, preferably 5 to 100 μm, and more preferably 10 to 50 μm.

The film material to be used preferably as the coating material includes, for example, vinyl alcohol polymers such as polyvinylalcohol (PVA), ethylene-vinyl alcohol copolymer and the like, polyacrylamide, polyisopropylacrylamide, polyacrylonitrile, polycarbonate (PC), poly(methyl methacrylate) (PMMA), polyethylene terephthalate (PET), polystyrene (PS), and biaxially oriented polypropylene (OPP).

<Drying Method>

In the case where a single layer film of the present invention is formed by polymerizing a composition containing a solvent, it is preferable to fully dry the solvent before the polymerization. Insufficient drying of the solvent is not preferable because the structure of an obtained single layer film is incomplete, thereby often decreasing hydrophilicity. Also adhesiveness to a substrate material tends to decrease. Therefore, the amount of the residual solvent just before the curing is preferably 10% or less, more preferably 5% or less, and particularly preferably 1% or less.

The drying temperature can be determined appropriately, and usually the range of room temperature to 200° C., preferably 30 to 150° C., and more preferably 40 to 100° C. may be mentioned.

Similarly, the drying time can be determined appropriately, and a shorter time tends to be preferable in view of productivity. For example, the drying time of 5 minutes or less, preferably 3 minutes or less, and more preferably 2 minutes or less may be mentioned.

The atmosphere is not particularly restricted and may be air or an inert gas such as nitrogen and the like, and there is a tendency that low humidity is preferable. Specifically, the humidity is preferably at 70% or less, more preferably at 60% or less, and particularly preferably at 55% or less.

The pressure at the time of drying is not particularly restricted and normal pressure or reduced pressure is relatively preferable. A slightly pressurized condition is acceptable.

The preferable solvent as a polar solvent is the one that has a solubility parameter σ, calculated by the following formula, of 9.5 or more. It is not preferable to form a coat layer using a large amount of a solvent having a σ of 9.4 or less, because the structure of an obtained single layer film of the present invention tends to be incomplete, thereby decreasing hydrophilicity.

Examples of solvents having the solubility parameter a of 9.5 or more include methanol, ethanol, IPA (isopropanol), n-butanol, methoxyethanol, DMF (N,N'-dimethylformamide) and the like.

Calculation formula of the solubility parameter σ
(1) Latent heat of evaporation per mol; $Hb=21 \times (273+Tb)$ (unit:cal/mol), Tb: boiling point (° C.)
(2) Latent heat of evaporation per mol at 25° C.; $H25=Hb \times [1+0.175 \times (Tb-25)/100]$ (unit: cal/mol), Tb: boiling point (° C.)
(3) Bond energy between molecules; $E=H25-596$ (unit: cal/mol)
(4) Bond energy between molecules per ml ($cm^3$) solvent; $E1=E \times D/MW$ (unit: cal/$cm^3$), D: density (g/$cm^3$), MW: molecular weight
(5) Solubility parameter; $\sigma=(E1)^{1/2}$ (unit: cal/$cm^3$)

Further, when preparing a copolymer of the present invention, various kinds of additives other than those mentioned above, for example, silica, titanium oxide, other metals and metal oxides and the like can be added for the purpose of improving mechanical and thermal strength and providing photo sensitivity, bactericidal properties and the like. A polymerizable compound containing a sulfur atom can be added as a copolymerization component for improving refractive index of the resin, and also silver, metal salts of lithium and the like, iodine and iodonium salts, and the like can be added to the above-mentioned composition in order to impart bactericidal and antibacterial properties.

Amounts of the various additives differ depending on the circumstances and cannot be specified, but the range of usually 0.01 to 200 wt %, and preferably 0.1 to 100 wt % relative to the total amount of polymerizable compounds (compounds (I)+(II) or (I)+(II)+(III)) may be mentioned.

Further, by polymerizing the above-mentioned composition in a mold of various shapes, a molded article having various shapes can be produced.

In the present invention, a single layer film, an antifogging material, an antifouling material, an antistatic material and a multilayer body containing a hydrophilic copolymer can, by coating, impart hydrophilicity, antifogging property and antifouling property to such materials as a vehicle and a vehicle material, a ship and a ship material, an aircraft and an aircraft material, a building and a building material, a window of a vehicle, ship, aircraft, building and the like, a mirror, an outer wall, an exterior, a body, a wheel, an interior wall, an interior decoration, a floor, furniture and a furniture material, clothing, a cloth, a fiber, a material for a bathroom and kitchen, a ventilation fan, a pipe, an electric code, a home electric appliance and a material thereof, a display and a material thereof, optics articles such as an optical film, an optical disk, glasses, a contact lens, goggles and the like, a lighting fixture such as a lamp, a light and the like and a material thereof, a cooling fan of a heat exchanger and the like, a printing recording material such as a photoresist, an inkjet recording plate and the like, a cosmetic container and a material thereof, a reflection material such as a reflection film, a reflection board and the like, a sound insulation board on expressway and the like, a display material, a primer for printing and typing, other primers, a transparent material such as a flat panel, a touch panel, a sheet, a film, a tape, a transparent resin, glass and the like. Further, it can also impart anticondensation property and antistatic property.

EXAMPLES

In the following, the present invention will be explained in more detail with reference to Examples, but the present invention is not restricted to these Examples. It should be noted that physical properties of coated materials were evaluated in the following way.

<Measurement of a Water-Contact Angle>

A water-contact angle was measured by using a CA-V type instrument manufactured by Kyowa Interface Science Co. Ltd. at room temperature (25° C.) for one after film formation, one after washing by running tap water and then drying, and one after washing by scrubbing with Kimwipe (Wiper S-200, manufactured by Crecia Co., Ltd.) under running tap water and then drying, at three points for each to record an average value.

<Test of Antifouling (Self-Cleaning) Property>

As a simulation material for an outside air hydrophobic substance, a mixture composed of 80.0 g of a motor oil (API SL 10W-30, manufactured by Nippon Oil Corp.) and 10.0 g of powdered activated carbon (special reagent grade, manufactured by Wako Pure Chemical Industries, Ltd.) (hereinafter simply referred to as pollutant substance). About 2 ml of this pollutant substance was put on a surface of a testing body dropwise, then the substance was dispersed on a surface of the test specimen, and a water shower (ejection pressure of 1.2 kgf/cm$^2$) was applied at the rate of 160 ml/sec for 10 seconds, and then the fouling state was evaluated by visual observation as follows.

attached pollutant substance almost removed from the test sheet surface: good slightly remaining: fair clearly remaining: poor <Test of Antifogging Property>

As shown in FIG. 1, a test sample (1) is placed on a hot water bath controlled at 85° C. by a heater (3) via space (4) with the coated layer facing downward, and presence or absence of fogging was observed by visual observation. Evaluations were made as follows.

no fogging observed for 3 minutes or more: good fogging observed in less than 3 minutes: poor Example 1

A composition was prepared by adding 5.3 g (3.0 wt %) of Irgacure 500 (manufactured by Ciba Specialty Chemicals, Inc.) as a polymerization initiator and 0.9 g (0.5 wt %) of Irgacure 819 (manufactured by Ciba Specialty Chemicals, Inc.) as a sensitizer that were dissolved in 184 g of methanol (solid content of 50 wt %) as a solvent to a mixture of 11.6 g (0.05 mol) of potassium 3-sulfonylpropylacrylate (hereinafter abbreviated as SPA-K) as a compound represented by the general formula (1), 87.09 g (0.25 mol) of 2,6,10-trihydroxy-4,8-dioxaundecane-1,1'-diacrylate (hereinafter abbreviated as 80-MFA) as a compound containing two or more (meth)acryloyl groups and 78.7 g (0.15 mol) of dipentaerythritol pentaacrylate (hereinafter abbreviated as A-9530).

The above-mentioned composition was applied with a bar coater on a surface of a polycarbonate sheet 2 mm in thickness (hereinafter abbreviated as PC-sheet, a water-contact angle of 870), dried with a dryer, and then cured by irradiating UV light having an intensity of 6600 mW/cm$^2$ (electrodeless discharge lamp/D bulb, 320 to 390 nm, manufactured by Fusion UV Systems Japan K.K.) to form a coated resin layer 2 μm in thickness on the PC sheet.

The obtained layer was transparent with surface hardness of HB and the water-contact angle of 5°, and showed firm adhesion with no peel by a cross-cut peel test (100/100). Further, there was no fogging for 3 minutes or more in the antifogging test (good), and almost no attachment of a pollutant substance in the antifouling test (good). The results are shown in Table 1.

Example 2 to 5, and Comparative Reference Example 1

The tests were performed in a similar manner to that of Example 1 by changing the blending ratio. The results are shown in Table 1.

TABLE 1

| | A<br>Compound of general<br>formula (1) | | B<br>Compound containing<br>two or more<br>(meth)acryloyl<br>groups | | A/B<br>Molar | Water-contact<br>angle | Pencil | Cross-cut | Antifouling | Antifogging |
|---|---|---|---|---|---|---|---|---|---|---|
| | Code | mol | Code | mol | ratio | (average) | hardness | peel test | property | property |
| Example 1 | SPA-K | 0.050 | 80-MFA<br>A-9530 | 0.250<br>0.150 | 1/8 | 5 | H | Good<br>(100/100) | Good | Good |
| Example 2 | " | " | " | 0.350<br>0.250 | 1/12 | 5 | HB | Good<br>(100/100) | Good | Good |
| Example 3 | " | " | " | 0.400<br>0.350 | 1/15 | 5 | HB | Good<br>(100/100) | Good | Good |
| Example 4 | " | " | " | 0.500<br>0.400 | 1/18 | 6 | HB | Good<br>(100/100) | Good | Good |
| Example 5 | " | " | " | 0.500<br>0.500 | 1/20 | 5 | HB | Good<br>(100/100) | Good | Good |
| Comparative<br>Reference<br>Example 1 | " | " | " | 0.900<br>0.900 | 1/36 | 62 | B | Good<br>(100/100) | Poor | Poor |

[Formula 54]

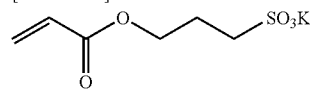

SPA-K = 232.30

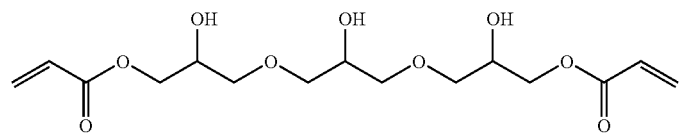

80-MFA = 348.35

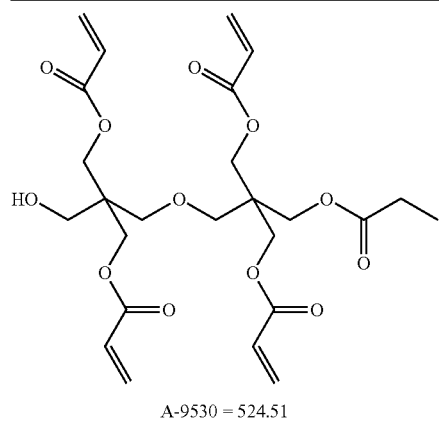

A-9530 = 524.51

Examples 7 to 8

The tests were performed in a similar manner to that of Example 1 by changing the compounds containing two or more (meth)acryloyl groups and the blending ratio. The results are shown in Table 2.

containing two or more (meth)acryloyl groups. The composition was then coated and irradiated in a similar manner to that of Example 1. A multilayer body obtained by forming a coated resin film on the PC sheet was subjected to heat treatment at 120° C. for 2 hours.

The results are shown in Table 3.

TABLE 2

| | A Compound of general formula (1) | | B Compound containing two or more (meth)acryloyl groups | | A/B Molar ratio | Water-contact angle (average) | Pencil hardness | Cross-cut peel test | Antifouling property | Antifogging property |
|---|---|---|---|---|---|---|---|---|---|---|
| | Code | mol | Code | mol | | | | | | |
| Example 7 | SPA-K | 0.050 | EA-5721 A-9530 | 0.300 0.300 | 1/12 | 7 | HB | Good (100/100) | Good | Good |
| Example 8 | " | " | " | 0.350 0.250 | 1/12 | 13 | HB | Good (100/100) | Good | Good |

[Formula 55]
(Compounds of Examples 7 to 8)

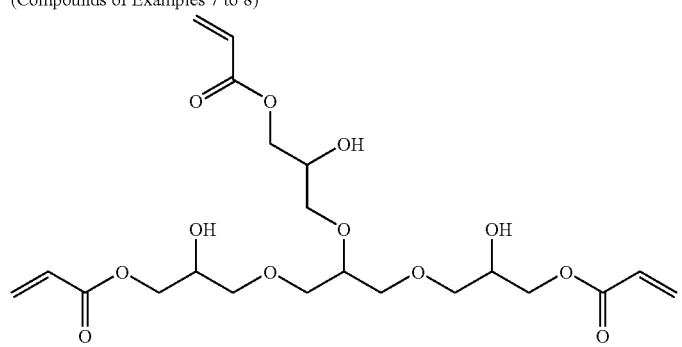

EA-5721 = 476.47

Example 9

A composition was obtained by adding 1.9 g (3 wt %) of Esacure KTO/46 (manufactured by Lamberti S.P.A.) as a polymerization initiator and 0.3 g (0.5 wt %) of Irgacure, 819 (manufactured by Ciba Specialty Chemicals, Inc.) as a sensitizer that were dissolved in 363 g of methoxyethanol (solid content of 15 wt %) as a solvent to a mixture of 10.1 g (0.05 mol) of sodium 2-sulfonylethyl-acrylate (hereinafter abbreviated as SEA-Na) as a compound represented by the general formula (1) and 52.3 g (0.15 mol) of 80-MFA as a compound

Examples 10 to 13

The tests were performed in a similar manner to that of Example 9 by changing SEA-Na. The results are shown in Table 3.

Comparative Example 1

The tests were performed in a similar manner to that of Example 9 without using SEA-Na. The results are shown in Table 3.

TABLE 3

| Example/ Comparative Example | A Compound of general formula (1) | | B Compound containing two or more (meth)acryloyl groups | | A/B Molar ratio | Water-contact angle (average) | Pencil hardness | Cross-cut peel test | Antifouling property | Antifogging property |
|---|---|---|---|---|---|---|---|---|---|---|
| | Code | mol | Code | mol | | | | | | |
| Example 9 | SEA-Na | 0.05 | 80-MFA | 0.15 | 1/3 | 20° | 2H | Good (100/100) | Good | Poor |
| Example 10 | SPA-Na | 0.05 | 80-MFA | 0.15 | 1/3 | 18° | H | Good (100/100) | Good | Poor |
| Example 11 | SPA-K | 0.05 | 80-MFA | 0.15 | 1/3 | 12° | H | Good (100/100) | Good | Good |
| Example 12 | SPMA-K | 0.05 | 80-MFA | 0.15 | 1/3 | 14° | H | Good (100/100) | Good | Good |
| Example 13 | SPA-Rb | 0.05 | 80-MFA | 0.15 | 1/3 | 18° | H | Good (100/100) | Good | Poor |
| Comparative Example 1 | — | — | 80-MFA | 0.15 | 0/3 | 59° | HB | Good (100/100) | Poor | Poor |

[Formula 56]

(Compound of Example 9)

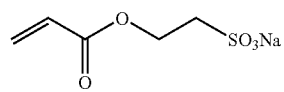

SEA-Na = 202.16

(Compound of Example 10)

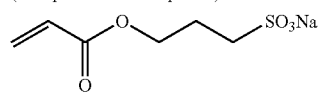

SPA-Na = 216.19

(Compound of Example 11)

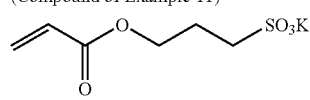

SPA-K = 232.30

(Compound of Example 12)

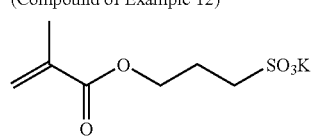

SPMA-K = 246.32

(Compound of Example 13)

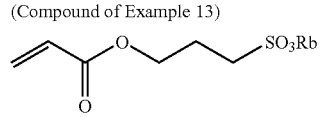

SPA-Rb = 278.67

Example 14

In a similar manner to that of Example 9, a composition was prepared and tested by using a mixture of 11.6 g (0.05 mol) of SPA-K as a compound represented by the general formula (1), 17.4 g (0.05 mol) of 80MFA as a compound containing two or more (meth)acryloyl groups, and 14.9 g (0.05 mol) of pentaerythritol triacrylate (hereinafter abbreviated as PE-3A). The results are shown in Table 4.

Examples 15 to 26, Comparative Examples 2 to 11

In a similar manner to that of Example 14, the tests were performed by changing the blending ratio of SPK-K and the compound containing two or more (meth)acryloyl groups, and changing SPA-K to another compound. The results are shown in Table 4.

TABLE 4

| Example/Comparative Example | A Compound of general formula (1) Code | mol | B Compound containing two or more (meth)acryloyl groups Code | mol | A/B Molar ratio | Water-contact angle (average) | Pencil hardness | Cross-cut peel test | Antifouling property | Antifogging property |
|---|---|---|---|---|---|---|---|---|---|---|
| Example 14 | SPA-K | 0.050 | 80-MFA | 0.050 | 1/2 | 5° | 2 H | Good (100/100) | Good | Good |
|  |  |  | PE-3A | 0.050 |  |  |  |  |  |  |
| Example 15 | " | " | 80-MFA | 0.050 | 1/3 | 4° | 2 H | Good (100/100) | Good | Good |
|  |  |  | PE-3A | 0.010 |  |  |  |  |  |  |
| Example 16 | " | " | 80-MFA | 0.150 | 1/5 | 4° | H | Good (100/100) | Good | Good |
|  |  |  | PE-3A | 0.100 |  |  |  |  |  |  |
| Example 17 | " | " | 80-MFA | 0.250 | 1/8 | 5° | HB | Good (100/100) | Good | Good |
|  |  |  | PE-3A | 0.150 |  |  |  |  |  |  |
| Example 18 | " | " | 80-MFA | 0.150 | 1/10 | 7° | HB | Good (100/100) | Good | Good |
|  |  |  | PE-3A | 0.350 |  |  |  |  |  |  |
| Example 19 | " | " | 80-MFA | 0.150 | 1/13 | 9° | HB | Good (100/100) | Good | Good |
|  |  |  | PE-3A | 0.500 |  |  |  |  |  |  |
| Example 20 | SEA-Na | 0.050 | 80-MFA | 0.150 | 1/5 | 6° | HB | Good (100/100) | Good | Good |
|  |  |  | PE-3A | 0.100 |  |  |  |  |  |  |
| Example 21 | SPA-Na | 0.050 | 80-MFA | 0.150 | " | 5° | HB | Good (100/100) | Good | Good |
|  |  |  | PE-3A | 0.100 |  |  |  |  |  |  |
| Example 22 | SPMA-Na | 0.050 | 80-MFA | 0.150 | " | 11° | HB | Good (100/100) | Good | Good |
|  |  |  | PE-3A | 0.100 |  |  |  |  |  |  |
| Example 23 | SPMA-K | 0.050 | 80-MFA | 0.150 | " | 5° | HB | Good (100/100) | Good | Good |
|  |  |  | PE-3A | 0.100 |  |  |  |  |  |  |
| Example 24 | SPA-Rb | 0.050 | 80-MFA | 0.150 | " | 4° | H | Good (100/100) | Good | Good |
|  |  |  | PE-3A | 0.100 |  |  |  |  |  |  |
| Example 25 | SPA-1/2Ca | 0.050 | 80-MFA | 0.150 | " | 18° | H | Good (100/100) | Good | Poor |
|  |  |  | PE-3A | 0.100 |  |  |  |  |  |  |
| Example 26 | SPA-1/2Mg | 0.050 | 80-MFA | 0.150 | " | 16° | H | Good (100/100) | Good | Poor |
|  |  |  | PE-3A | 0.100 |  |  |  |  |  |  |
| Comparative Example 2 | Sodium vinyl sulfonate | 0.050 | 80-MFA | 0.150 | " | 56° | H |  | Poor | Poor |
|  |  |  | PE-3A | 0.100 |  |  |  |  |  |  |
| Comparative Example 3 | Sodium 4-styrene-sulfonate | 0.050 | 80-MFA | 0.150 | " | 30° | 2 H |  | Fair | Poor |
|  |  |  | PE-3A | 0.100 |  |  |  |  |  |  |
| Comparative Example 4 | AMPS | 0.050 | 80-MFA | 0.150 | " | 59° | HB |  | Poor | Poor |
|  |  |  | PE-3A | 0.100 |  |  |  |  |  |  |
| Comparative Example 5 | AMPS-K | 0.050 | 80-MFA | 0.150 | " | 47° | HB |  | Poor | Poor |
|  |  |  | PE-3A | 0.100 |  |  |  |  |  |  |
| Comparative Example 6 | DM-HCl | 0.050 | 80-MFA | 0.150 | " | 58° | HB |  | Poor | Poor |
|  |  |  | PE-3A | 0.100 |  |  |  |  |  |  |
| Comparative Example 7 | Acrylic acid | 0.050 | 80-MFA | 0.150 | " | 52° | B |  | Poor | Poor |
|  |  |  | PE-3A | 0.100 |  |  |  |  |  |  |
| Comparative Example 8 | Potassium acrylate | 0.050 | 80-MFA | 0.150 | " | 44° | H |  | Poor | Poor |
|  |  |  | PE-3A | 0.100 |  |  |  |  |  |  |
| Comparative Example 9 | Potassium methacrylate | 0.050 | 80-MFA | 0.150 | " | 53° | H |  | Poor | Poor |
|  |  |  | PE-3A | 0.100 |  |  |  |  |  |  |
| Comparative Example 10 | HEA | 0.050 | 80-MFA | 0.150 | " | 58° | HB |  | Poor | Poor |
|  |  |  | PE-3A | 0.100 |  |  |  |  |  |  |
| Comparative Example 11 | DHPM | 0.050 | 80-MFA | 0.150 | " | 57° | HB |  | Poor | Poor |
|  |  |  | PE-3A | 0.100 |  |  |  |  |  |  |
| Comparative Example 12 | — | — | 80-MFA | 0.150 | 0/5 | 59° | H | Good (100/100) | Poor | Poor |
|  |  |  | PE-3A | 0.100 |  |  |  |  |  |  |

[Formula 57]
(Compounds of Examples 14 to 24)

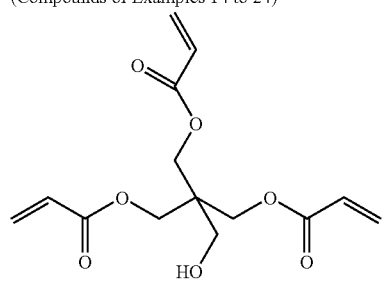

PE-3A = 298.29

(Compound of Example 25)

TABLE 4-continued

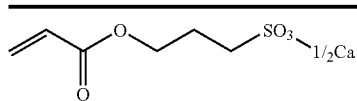

SPA-1/2Ca = 213.06
(Compound of Example 26)

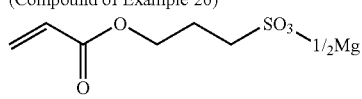

SPA-1/2Mg = 205.17
[Formula 58]
(Compound of Comp. Ex. 2)

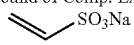

Sodium vinylsulfonate = 130.10
(Compound of Comp. Ex. 3)

Sodium 4-styrenesulfonate = 206.19
(Compound of Comp. Ex. 4)

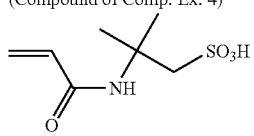

AMPS =: 207.25
(Compound of Comp. Ex. 5)

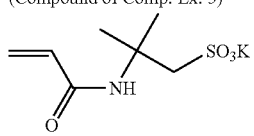

AMPS-K = 245.34
(Compound of Comp. Ex. 6)

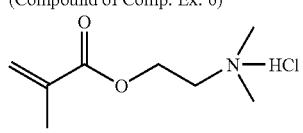

DM-HCl = 207.70
(Compound of Comp. Ex. 7)

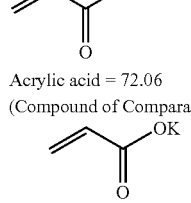

Acrylic acid = 72.06
(Compound of Comparative Example 8)

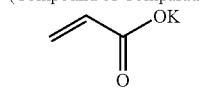

Potassium acrylate = 110.15
(Compound of Comparative Example 9)

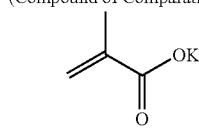

Potassium methacrylate = 124.18
(Compound of Comp. Ex. 10)

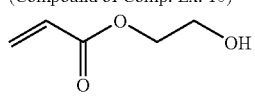

HEA = 116.12
(Compound of Comp. Ex. 11)

TABLE 4-continued

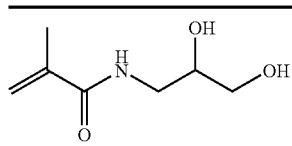

DHPM = 159.18

Example 27

In a similar manner to that of Example 9, a composition was prepared and tested by using a mixture of 11.6 g (0.05 mol) of SPA-K as a compound represented by the general formula (1) and 80.4 g (0.15 mol) of nonaethylene glycol dimethacrylate (hereinafter abbreviated as 9G) as a compound containing two or more (meth)acryloyl groups. The results are shown in Table 5.

Examples 28 to 45

In a similar manner to that of Example 27, the tests were performed by changing the compound containing two or more (meth)acryloyl groups. The results are shown in Table 5.

TABLE 5

| Example/Comparative Example | A Compound of general formula (1) | | B Compound containing two or more (meth)acryloyl groups | | A/B Molar ratio | Water-contact angle (average) | Pencil hardness | Cross-cut peel test | Antifouling property | Antifogging property |
|---|---|---|---|---|---|---|---|---|---|---|
| | Code | mol | Code | mol | | | | | | |
| Example 27 | SPA-K | 0.050 | 9G | 0.150 | 1/3 | 20° | H | Good (100/100) | Good | Poor |
| Example 28 | SPA-K | 0.050 | A-600 | 0.050 | 1/3 | 18° | HB | Good (100/100) | Good | Poor |
| Example 29 | SPA-K | 0.050 | 701A | 0.150 | 1/3 | 5° | HB | Good (100/100) | Good | Good |
| Example 30 | SPA-K | 0.050 | 80-MFA | 0.050 | 1/1 | 10° | H | Good (100/100) | Good | Good |
| Example 31 | SPA-K | 0.050 | " | 0.100 | 1/2 | 10° | H | Good (100/100) | Good | Good |
| Example 32 | SPA-K | 0.050 | " | 0.200 | 1/4 | 14° | H | Good (100/100) | Good | Good |
| Example 33 | SPA-K | 0.050 | R-604 | 0.150 | 1/3 | 20° | HB | Good (100/100) | Good | Poor |
| Example 34 | SPA-K | 0.050 | MES-A | 0.150 | 1/3 | 16° | HB | Good (100/100) | Good | Poor |
| Example 35 | SPA-K | 0.050 | A-BPE-4 | 0.150 | 1/3 | 17° | HB | Good (100/100) | Good | Poor |
| Example 36 | SPA-K | 0.050 | A-BPEF | 0.150 | 1/3 | 8° | HB | Good (100/100) | Good | Good |
| Example 37 | SPA-K | 0.050 | A-GLY-3E | 0.150 | 1/3 | 7° | HB | Good (100/100) | Good | Good |
| Example 38 | SPA-K | 0.050 | PE-3A | 0.150 | 1/3 | 5° | H | Good (100/100) | Good | Good |
| Example 39 | SPA-K | 0.150 | EA-5721 | 0.150 | 1/3 | 16° | H | Good (100/100) | Good | Poor |
| Example 40 | SPA-K | 0.050 | A-9300 | 0.150 | 1/3 | 5° | B | Good (100/100) | Good | Good |
| Example 41 | SPA-K | 0.050 | DPE-6A | 0.150 | 1/3 | 6° | B | Good (100/100) | Good | Good |
| Example 42 | SPA-K | 0.050 | A-9530 | 0.150 | 1/3 | 5° | 2H | Good (100/100) | Good | Good |
| Example 43 | SPA-K | 0.050 | EA-7420 | 0.0033 | 15/1 | 10° | H | Good (100/100) | Good | Good |
| Example 44 | SPA-K | " | " | 0.0071 | 7/1 | 7° | H | Good (100/100) | Good | Good |
| Example 45 | SPA-K | " | " | 0.025 | 2/1 | 7° | HB | Good (100/100) | Good | Good |

[Formula 59]
(Compound of Example 27)

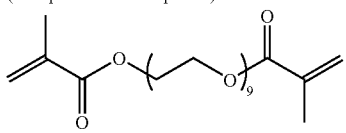

9G = 536

TABLE 5-continued
(Compound of Example 28)
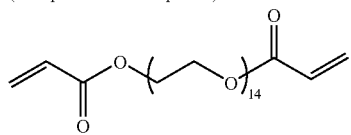
A-600 = 708
(Compound of Example 29)
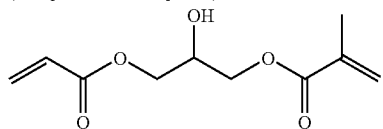
701A = 214.22
(Compound of Example 33)
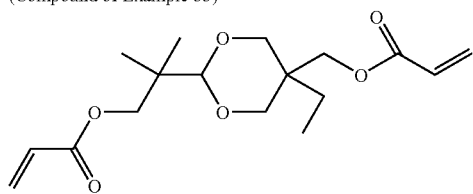
R-604 = 326.38
(Compound of Example 34)
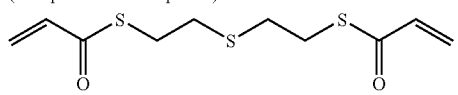
MES-A = 262.41
(Compound of Example 35)
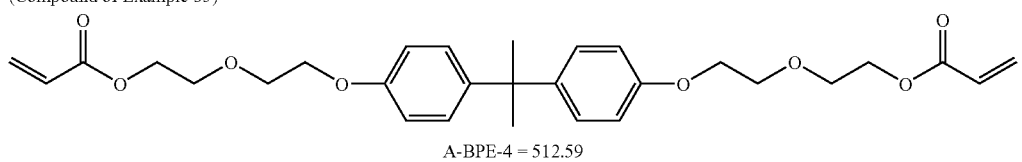
A-BPE-4 = 512.59
(Compound of Example 36)
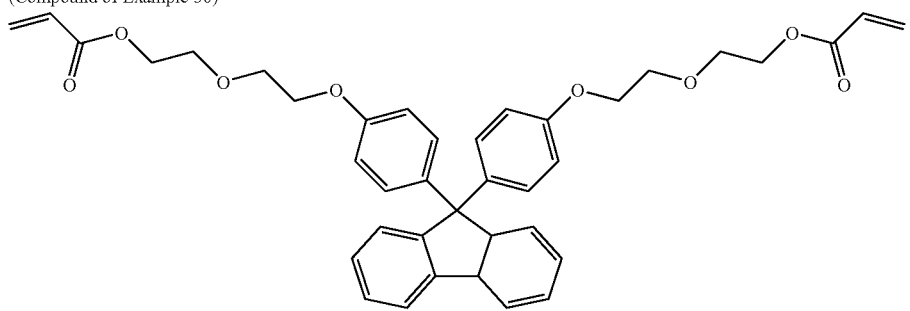
A-BPEF = 636.73
(Compound of Example 37)
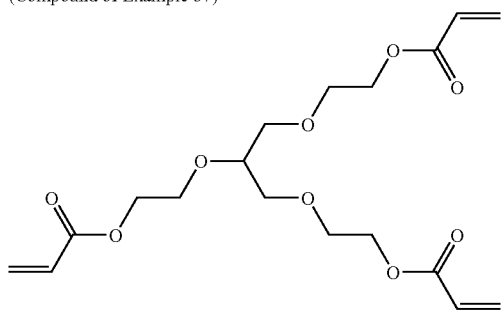
A-GLY-3E = 386.39

TABLE 5-continued
[Formula 60]
(Compound of Example 38)
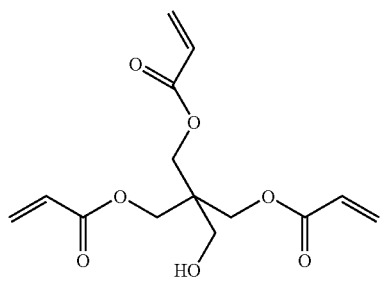
PE-3A = 298.29
(Compound of Example 39)
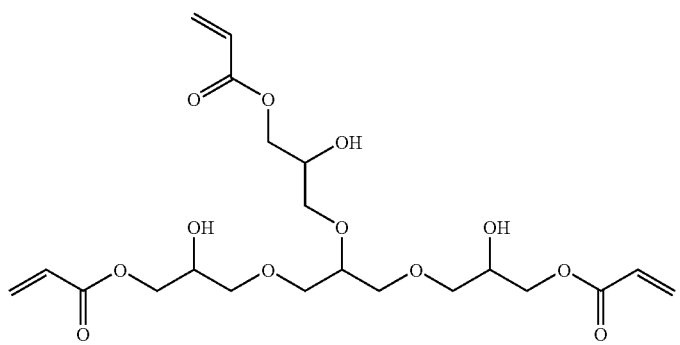
EA-5721 = 476.47
(Compound of Example 40)
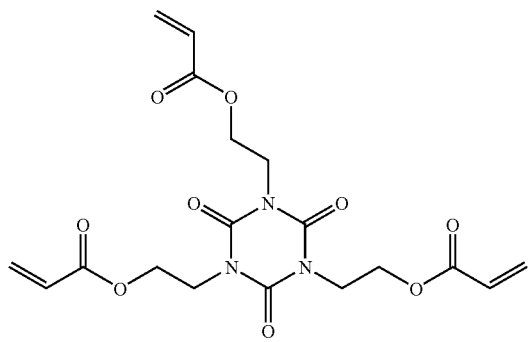
A-9300 = 423.37
(Compound of Example 41)
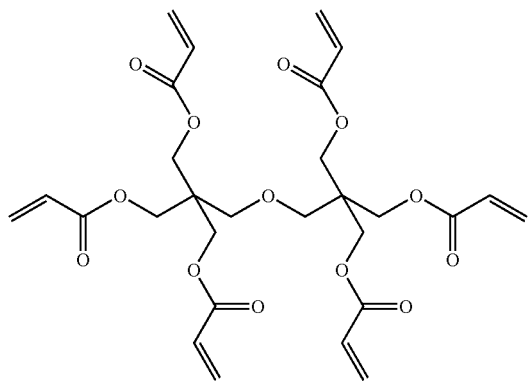
DPE-6A = 578.56

TABLE 5-continued (Compound of Example 42)

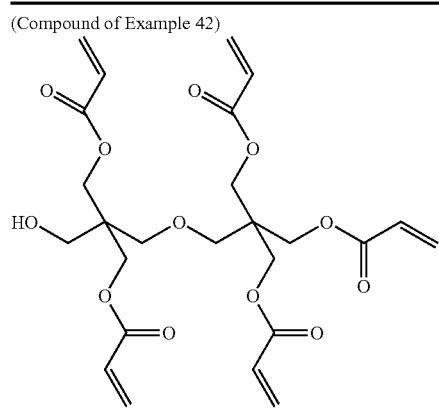

A-9530 = 524.51

(Compounds of Examples 43 to 45)

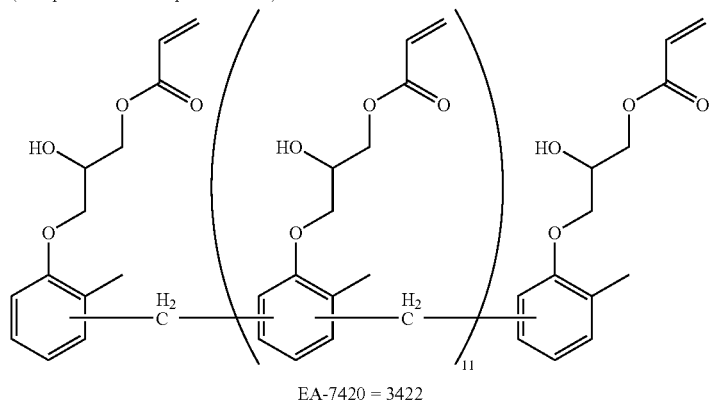

EA-7420 = 3422

Examples 46 to 66

By using two kinds of compounds containing two or more (meth)acryloyl groups, tests were performed in a similar manner to that of Example 27. The results are shown in Table 6.

TABLE 6

| Example/ Comparative Example | A Compound of general formula (1) Code | mol | B Compound containing two or more (meth) acryloyl groups Code | mol | A/B Molar ratio | Water-contact angle (average) | Pencil hardness | Cross-cut peel test | Antifouling property | Antifogging property |
|---|---|---|---|---|---|---|---|---|---|---|
| Example 46 | SPA-K | 0.05 | PE-3A<br>EA-7420 | 0.15<br>0.025 | 1/3.5 | 4° | B | Good (100/100) | Good | Good |
| Example 47 | SPA-K | 0.05 | A-GLY-3E<br>EA-7420 | 0.15<br>0.025 | 1/3.5 | 5° | B | Good (100/100) | Good | Good |
| Example 48 | SPA-K | 0.05 | A-9300<br>EA-7420 | 0.15<br>0.025 | 1/3.5 | 5° | B | Good (100/100) | Good | Good |
| Example 49 | SPA-K | 0.05 | 80-MFA<br>701A | 0.15<br>0.15 | 1/6 | 4° | HB | Good (100/100) | Good | Good |
| Example 50 | SPA-K | 0.05 | PE-3A<br>701A | 0.15<br>0.15 | 1/6 | 6° | HB | Good (100/100) | Good | Good |
| Example 51 | SPA-K | 0.05 | 80-MFA<br>A-GLY-3E | 0.15<br>0.15 | 1/6 | 5° | HB | Good (100/100) | Good | Good |
| Example 52 | SPA-K | 0.05 | 80-MFA<br>A-9300 | 0.15<br>0.15 | 1/6 | 6° | H | Good (100/100) | Good | Good |
| Example 53 | SPA-K | 0.05 | 80-MFA<br>A-9530 | 0.20<br>0.10 | 1/6 | 5° | 2H | Good (100/100) | Good | Good |
| Example 54 | SPA-K | 0.05 | EA-5721<br>A-9530 | 0.15<br>0.15 | 1/6 | 13° | 2H | Good (100/100) | Good | Good |

TABLE 6-continued

| Example/ Comparative Example | A Compound of general formula (1) Code | mol | B Compound containing two or more (meth) acryloyl groups Code | mol | A/B Molar ratio | Water-contact angle (average) | Pencil hardness | Cross-cut peel test | Antifouling property | Antifogging property |
|---|---|---|---|---|---|---|---|---|---|---|
| Example 55 | SPA-K | 0.05 | EA-5721 | 0.15 | 1/6 | 8° | HB | Good (100/100) | Good | Good |
|  |  |  | A-GLY-3E | 0.15 |  |  |  |  |  |  |
| Example 56 | SPA-K | 0.05 | EA-5721 | 0.15 | 1/6 | 6° | HB | Good (100/100) | Good | Good |
|  |  |  | A-9300 | 0.15 |  |  |  |  |  |  |
| Example 57 | SPA-K | 0.05 | A-9530 | 0.15 | 1/6 | 5° | H | Good (100/100) | Good | Good |
|  |  |  | 701A | 0.15 |  |  |  |  |  |  |
| Example 58 | SPA-K | 0.05 | 701A | 0.15 | 1/6 | 5° | H | Good (100/100) | Good | Good |
|  |  |  | A-GLY-3E | 0.15 |  |  |  |  |  |  |
| Example 59 | SPA-K | 0.05 | 701A | 0.15 | 1/6 | 5° | H | Good (100/100) | Good | Good |
|  |  |  | A-9300 | 0.15 |  |  |  |  |  |  |
| Example 60 | SPA-K | 0.05 | 80-MFA | 0.15 | 1/5.1 | 4° | H | Good (100/100) | Good | Good |
|  |  |  | PE-3A | 0.10 |  |  |  |  |  |  |
|  |  |  | EA-7420 | 0.004 |  |  |  |  |  |  |
| Example 61 | SPA-K | 0.05 | 80-MFA | 0.15 | 1/7 | 4° | HB | Good (100/100) | Good | Good |
|  |  |  | PE-3A | 0.05 |  |  |  |  |  |  |
|  |  |  | 701A | 0.15 |  |  |  |  |  |  |
| Example 62 | Ditto | Ditto | Ditto | 0.15 | 1/8 | 4° | HB | Good (100/100) | Good | Good |
|  |  |  |  | 0.05 |  |  |  |  |  |  |
|  |  |  |  | 0.20 |  |  |  |  |  |  |
| Example 63 | Ditto | Ditto | Ditto | 0.15 | 1/8 | 5° | HB | Good (100/100) | Good | Good |
|  |  |  |  | 0.10 |  |  |  |  |  |  |
|  |  |  |  | 0.15 |  |  |  |  |  |  |
| Example 64 | Ditto | Ditto | Ditto | 0.15 | 1/9 | 4° | HB | Good (100/100) | Good | Good |
|  |  |  |  | 0.10 |  |  |  |  |  |  |
|  |  |  |  | 0.20 |  |  |  |  |  |  |
| Example 65 | Ditto | Ditto | Ditto | 0.15 | 1/9 | 4° | HB | Good (100/100) | Good | Good |
|  |  |  |  | 0.15 |  |  |  |  |  |  |
|  |  |  |  | 0.15 |  |  |  |  |  |  |
| Example 66 | Ditto | Ditto | Ditto | 0.15 | 1/10 | 4° | HB | Good (100/100) | Good | Good |
|  |  |  |  | 0.15 |  |  |  |  |  |  |
|  |  |  |  | 0.20 |  |  |  |  |  |  |

[Formula 61]

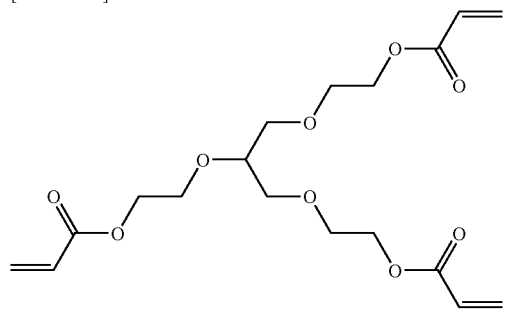

A-GLY-3E = 386.39

(Compound of Example 47)

Example 67

In a similar manner to that of Example 9, a composition was prepared and tested by using 11.6 g (0.05 mol) of SPA-K as a compound represented by the general formula (1), 29.8 g (0.10 mol) of PE-3A as a compound containing two or more (meth)acryloyl groups, and 5.8 g (0.05 mol) of hydroxyethyl acrylate (hereinafter abbreviated as HEA) as a polymerizable compound having a different chemical structure from those of a compound represented by the general formula (1) and a compound containing two or more (meth)acryloyl groups. The results are shown in Table 7.

Examples 68 to 71

In a similar manner to that of Example 67, the tests were performed by changing the polymerizable compound having a different chemical structure from those of a compound represented by the general formula (1) and a compound containing two or more (meth)acryloyl groups. The results are shown in Table 7.

TABLE 7

| Example/ Comparative Example | A Compound of general formula (1) | | B Compound containing two or more (meth)acryloyl groups | | C Polymerizable compound other than A and B, or additive | | Blending ratio of C | | Molar ratio | Water-contact angle (average) | Pencil Hardness | Cross-cut peel test | Anti-fouling | Anti-fogging |
|---|---|---|---|---|---|---|---|---|---|---|---|---|---|---|
| | Code | mol | Code | mol | Code | mol | mol % | % by mass | A/B/C | | | | | |
| Example 67 | SPA-K | 0.050 | PE-3A | 0.100 | HEA | 0.050 | 25 | 12 | 1/2/1 | 8° | HB | Good (100/100) | Good | Good |
| Example 68 | SPA-K | 0.050 | 80-MFA A-9530 | 0.250 0.150 | Ditto | 0.160 | 25 | 9.5 | 1/8/3.2 | 5° | HB | Good (100/100) | Good | Good |
| Example 69 | SPA-K | 0.050 | 80-MFA A-9530 | 0.250 0.150 | TG | 0.170 | 27 | 9.4 | 1/5/3.4 | 9° | HB | Good (100/100) | Good | Good |
| Example 70 | SPA-K | 0.060 | 701A | 0.180 | HDI | 0.030 | 11 | 9.1 | 1/3/0.5 | 9° | H | Good (100/100) | Good | Good |
| Example 71 | SPA-K | 0.060 | 701A | 0.180 | GM | 0.030 | 11 | 7.8 | 1/3/0.5 | 7° | H | Good (100/100) | Good | Good |

[Formula 62]

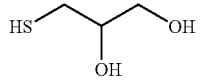

TG = 108.16

(Compound of Example 69)

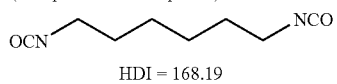

HDI = 168.19

(Compound of Example 70)

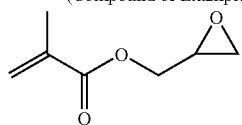

GM = 142.15

(Compound of Example 71)

Examples 72 to 76

Test by a Cover Film Method

A composition was prepared by adding 1.9 g (3 wt %) of Irgacure 500 (manufactured by Ciba Specialty Chemicals, Inc.) as a polymerization initiator, 3.2 g (5 wt %) of N,N-dimethylaminoethylmethacrylate as a polymerization accelerator, and 0.3 g (0.5 wt %) of Irgacure 819 (manufactured by Ciba Specialty Chemicals, Inc.) as a sensitizer that were dissolved in 277.2 g (solid content of 20 wt %) of methanol as a solvent to a mixture of 11.6 g (0.05 mol) of SPA-K as a compound represented by the general formula (1) and 52.3 g (0.15 mol) of 80-MFA as a compound containing two or more (meth)acryloyl groups.

The above-mentioned composition was applied with a bar coater directly on a surface of a PC sheet 2 mm in thickness (water-contact angle of 87°, surface pencil hardness of B), and then dried with a dryer.

A covering film shown in Table 9 was adhered on the obtained coated layer in such a way that no air was entrapped between the covering film and the coated layer, and then UV light having an intensity of 6600 mW/cm² (electrodeless discharge lamp/D bulb, 320 to 390 nm, manufactured by Fusion UV Systems Japan K.K.) was irradiated from the adhered film side to form a coated resin layer on the PC sheet. Then the PC sheet was subjected to the heat treatment at 120° C. for 2 hours after the laminate film was peeled off.

The results are shown in Table 8.

TABLE 8

| Example/ Comparative Example | A Compound of general formula (1) | | B Compound containing two or more (meth)acryloyl groups | | Molar ratio | Laminate film | | Water-contact angle of coating film | Pencil |
|---|---|---|---|---|---|---|---|---|---|
| | Code | mol | Code | mol | A/B | Kind | *Water-contact angle | (average) | hardness |
| Example 72 | SPA-K | 0.050 | 80-MFA | 0.150 | 1/3 | No | — | 12° | H |
| Example 73 | " | " | " | " | " | [1)]A-OP BH | 21° | 31° | H |
| Example 74 | " | " | " | " | " | [2)]PVA | 39° | 32° | H |

TABLE 8-continued

| Example/ Comparative Example | A Compound of general formula (1) | | B Compound containing two or more (meth)acryloyl groups | | Molar ratio A/B | Laminate film | | Water-contact angle of coating film (average) | Pencil hardness |
|---|---|---|---|---|---|---|---|---|---|
| | Code | mol | Code | mol | | Kind | *Water-contact angle | | |
| Example 75 | " | " | " | " | " | [3)]PET | 64° | 23° | H |
| Example 76 | " | " | " | " | " | [4)]OPP | 104° | 81° | H |

*Water-contact angles were measured at 3 points of a covering surface and the average value was recorded.
[1)]Biaxially oriented polypropylene film laminated with polyvinyl alcohol (trade name A-OP BH, manufactured by Tohcello Co., Ltd.)
[2)]Polyvinyl alcohol film
[3)]Polyethylene terephthalate film
[4)]Biaxially oriented polypropylene film Examples 77 to 80

A composition was obtained by adding 2.8 g (3 wt %) of Esacure KTO/46 (manufactured by Lamberti S.P.A.) as a polymerization initiator that was dissolved in 237.2 g (solid content of 30 wt %) of methoxyethanol as a solvent to a mixture of 11.6 g (0.05 mol) of SPA-K as a compound represented by the general formula (1), 52.3 g (0.15 mol) of 80-MFA as a compound containing two or more (meth)acryloyl groups, and 29.8 g (0.10 mol) of PE-3A. The obtained composition was coated on a substrate surface listed in Table 9 and then tested in a similar manner to that of Example 9.

The results are shown in Table 9.

Example 81

Coating on Glass

Glass was treated with a silane coupling agent and tested in a similar manner to that of Example 77. The results are shown in Table 9.

Comparative Example 13

(Reference: Japanese Patent Laid-Open Publication No. H11-120305)

In a similar manner to that of Example 9, a composition was prepared and tested by using a mixture of 30.0 g (0.15 mol) of sodium sulfoethylacrylate (abbreviated as SEA-Na) as a compound represented by the general formula (1) and 70.0 g (0.017 mol) of NK Oligo UA-W2A (trade name, manufactured by Shin-Nakamura Chemical Co., Ltd., molecular weight 4200) as a compound containing two or more (meth)acryloyl groups.

The results are shown in Table 10.

Comparative Example 14

(Reference: Japanese Patent Laid-Open Publication No. H08-325524)

In a similar manner to that of Example 9, a composition was prepared from a mixture of 30.0 g (0.15 mol) of sulfopropyl acrylate (hereinafter abbreviated as SPA) as a com-

TABLE 9

| Example/ Comparative Example | Kind of substrate | Primer | Water-contact angle (average) | Pencil hardness | Cross-cut peel test | Antifouling property | Antifogging property |
|---|---|---|---|---|---|---|---|
| Example 77 | [1)]PC | Not used | 5° | H | Good (100/100) | Good | Good |
| Example 78 | [2)]PMMA | Not used | 5° | 2H | Good (100/100) | Good | Good |
| Example 79 | [3)]PET-1 | Not used | 5° | 3H | Good (100/100) | Good | Good |
| Example 80 | [4)]PET-2 | Not used | 5° | 3H | Good (100/100) | Good | Good |
| Example 81 | [5)]Glass | Used | 5° | 6H | Good (100/100) | Good | Good |

[1)]Polycarbonate sheet (5 mm in thickness)
[2)]Poly(methyl methacrylate) sheet (5 mm in thickness)
[3)]Corona-treated polyethylene terephthalate film on its front side having an adhesive layer and a protection film on its back side (250 μm in thickness)
[4)]Easily adherable polyethylene terephthalate film (100 μm in thickness)
[5)]Glass treated with a silane coupling agent (3 mm in thickness)

pound represented by the general formula (1), 30.0 g (0.10 mol) of trimethylolpropane triacrylate (abbreviated as A-TMPT) as a compound containing two or more (meth)acryloyl groups, 20.0 g (0.023 mol) of spiroglycol hexamethylenediisocyanato diacrylate (abbreviated as SUA), and 20.0 g (0.13 mol) of tetrahydrofurfuryl acrylate (abbreviated as THF-A) as a polymerizable compound having a different chemical structure from those of a compound represented by the general formula (1) and a compound containing two or more (meth)acryloyl groups, and the prepared composition was tested.

The results are shown in Table 10.
(Compounds of Comparative Example 14)

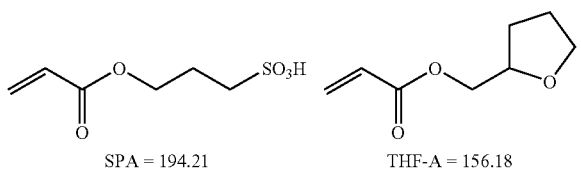

SPA = 194.21    THF-A = 156.18

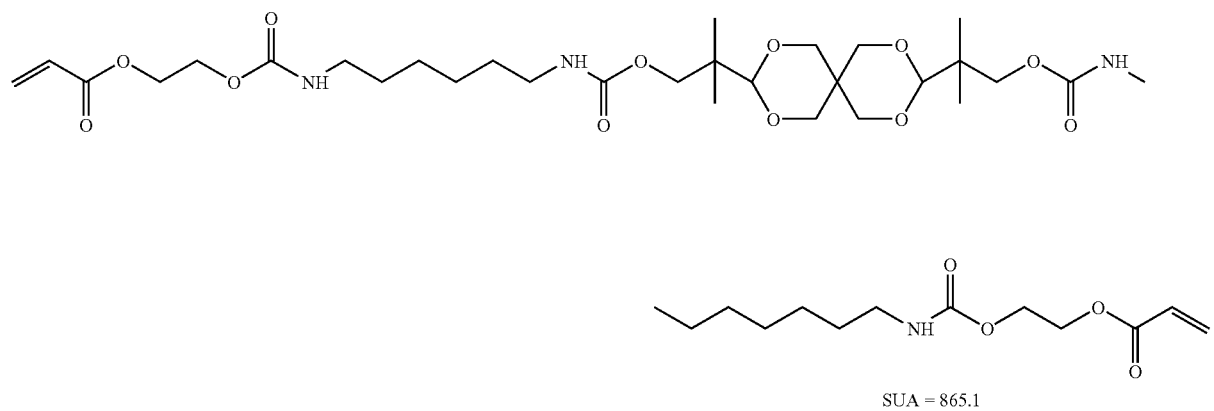

SUA = 865.1

Comparative Example 15

(Reference: Japanese Examined Patent Application Publication No. S53-010636)

A composition was prepared by adding 1.0 g (1 wt %) of copper powder, 0.2 g (0.2 wt %) of t-butylperoxy-3,5,5-trimethylhexoate (trade name Trigonox 42, manufactured by Kayaku Akzo Corp.), and 582.5 g (solid content of 15 wt %) of methoxyethanol as a solvent to a mixture of 21.6 g (0.11 mol) of SPA as a compound represented by the general formula (1), 50.0 g (0.16 mol) of bis(methacryloyloxyethyl) phosphoric acid (abbreviated as P-2M) as a compound containing two or more (meth)acryloyl groups, and 30.0 g (0.03 eq) of Epikote 1004 (trade name, bisphenol A epoxy resin, epoxy equivalent of 902 g/ep, manufactured by Japan Epoxy Resins Co., Ltd.) as a polymerizable compound having a different chemical structure from those of a compound represented by the general formula (1) and a compound containing two or more (meth)acryloyl groups.

The above-mentioned composition was applied with a bar coater directly on a surface of a PC sheet 2 mm in thickness (water-contact angle of 87°, surface pencil hardness of B), and then subjected to the heat treatment at 120° C. for 2 hours to form a coating film.

The results are shown in Table 10.

Comparative Example 16

(Reference: Japanese Examined Patent Application Publication No. S53-010636)

In a similar manner to that of Comparative Example 15, a composition was prepared from a mixture of 27.0 g (0.14 mol) of SPA as a compound represented by the general formula (1) and 75.0 g (0.08 eq) of Epikote 1004 (trade name, bisphenol A epoxy resin, epoxy equivalent of 902 g/ep, manufactured by Japan Epoxy Resins Co., Ltd.) as a polymerizable compound having a different chemical structure from those of a compound represented by the general formula (1) and a compound containing two or more (meth)acryloyl groups, and the prepared composition was tested.

The results are shown in Table 10.

Comparative Example 17

In a similar manner to that of Example 9, a composition was prepared from a mixture of 27.9 g (0.12 mol) of SPA-K as a compound represented by the general formula (1), 78.7 g (0.15 mol) of dipentaerythritol pentaacrylate (abbreviated as A-9530) as a compound containing two or more (meth)acryloyl groups, and 10.6 g (0.03 mol) of 2,2-bis(4-glycidyloxycyclohexyl)propane (abbreviated as EP-4080) as a polymerizable compound having a different chemical structure from those of a compound represented by the general formula (1) and a compound containing two or more (meth)acryloyl groups, and the prepared composition was tested.

The results are shown in Table 10.

TABLE 10

| Example/Comparative Example | A Compound of general formula (1) Code | Mol | B Compound containing two or more (meth)acryloyl groups Code | mol | C Polymerizable compound Code | Mol | Molar ratio A/B/C | Water-contact angle (average) | Cross-cut peel test | Pencil hardness | Antifouling | Antifogging |
|---|---|---|---|---|---|---|---|---|---|---|---|---|
| Comparative Example 13 | SEA-Na | 0.148 | UA-W2A | 0.017 | | | 1/0.1/0 | 35° | Good (100/100) | HB | Poor | Poor |
| Comparative Example 14 | SPA | 0.154 | A-TMPT SUA | 0.101 0.023 | THF-A | 0.128 | 1/0.8/0.8 | 62° | Good (100/100) | HB | Poor | Poor |
| Comparative Example 15 | SPA | 0.110 | P-2M | 0.150 | Epikote 1004 | *0.03 | 1/1.4/*0.03 | 76° | Good (100/100) | HB | Poor | Poor |
| Comparative Example 16 | SPA | 0.140 | | | Epikote 1004 | *0.08 | 1/0/*0.06 | 79° | Good (100/100) | HB | Poor | Poor |
| Comparative Example 17 | SPA-K | 0.120 | A-9530 | 0.150 | EP-4080 | 0.030 | 1/1.3/0.3 | 40° | Good (100/100) | H | Poor | Poor |

*Epoxy equivalent

Examples 82 to 125

A composition was prepared by adding 6.0 g of a monomer shown in Table 11 to a mixture of 0.4 g (0.0017 mol) of SPA-Kasa compound represented by the general formula (1), 4.0 g (0.0066 mol) of 1,2,3-tris{acryloyloxytri(ethyleneoxy)}propane (hereinafter abbreviated as A-GLY-9E) as a compound containing two or more (meth)acryloyl groups, 0.3 g (3%) of Esacure KTO46 as a polymerization initiator, and 20.0 g of methoxyethanol. The obtained composition was applied in a similar manner to that of Example 1 to form a film 3 μm in thickness on the surface of a PC sheet.

It should be noted that, in Examples 111 and 112, the amount of SPA-K was increased to 0.6 g (0.0026 mol) and the tests were performed. The results are shown in Table 11.

(Compound in Examples 82 to 125)

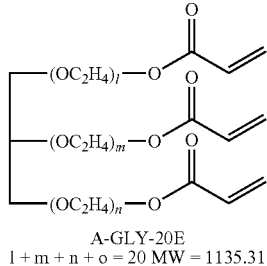

A-GLY-20E
$l + m + n + o = 20$  MW = 1135.31

TABLE 11

| Example/Comparative Example | B Added monomer Code | mol | Molar ratio A/B | Water-contact angle (average) | Cross-cut peel test | Anti-fouling | Anti-fogging |
|---|---|---|---|---|---|---|---|
| Example 82 | A-HD-N | 0.0265 | 1/19 | 5° | Good (100/100) | Good | Good |
| Example 83 | A-IND | 0.0224 | 1/17 | 6° | Good (100/100) | Good | Good |
| Example 84 | A-PTMG-65 | 0.0077 | 1/8 | 18° | Good (100/100) | Good | Poor |
| Example 85 | A-IBD-2E | 0.0219 | 1/17 | 5° | Good (100/100) | Good | Good |
| Example 86 | APG-200 | 0.0200 | 1/16 | 6° | Good (100/100) | Good | Good |
| Example 87 | APG-700 | 0.0073 | 1/8 | 8° | Good (100/100) | Good | Good |
| Example 88 | 1206PE | 0.0054 | 1/7 | 17° | Good (100/100) | Good | Poor |
| Example 89 | A-TMPT | 0.0202 | 1/16 | 5° | Good (100/100) | Good | Good |
| Example 90 | ATM-4P | 0.0202 | 1/10 | 5° | Good (100/100) | Good | Good |
| Example 91 | AD-TMP | 0.0129 | 1/11 | 5° | Good (100/100) | Good | Good |
| Example 92 | A-BPFL-4E | 0.0076 | 1/8 | 5° | Good (100/100) | Good | Good |
| Example 93 | A-BPE-30 | 0.0037 | 1/6 | 10° | Good (100/100) | Good | Good |
| Example 94 | A-B1206PE | 0.0050 | 1/7 | 18° | Good (100/100) | Good | Poor |
| Example 95 | EA-5520 | 0.0173 | 1/14 | 5° | Good (100/100) | Good | Good |

TABLE 11-continued

| Example/Comparative Example | B Added monomer Code | mol | Molar ratio A/B | Water-contact angle (average) | Cross-cut peel test | Anti-fouling | Anti-fogging |
|---|---|---|---|---|---|---|---|
| Example 96 | EA-5521 | 0.0160 | 1/13 | 6° | Good (100/100) | Good | Good |
| Example 97 | EA-5821 | 0.0166 | 1/14 | 6° | Good (100/100) | Good | Good |
| Example 98 | EA-5220 | 0.0163 | 1/13 | 15° | Good (100/100) | Good | Poor |
| Example 99 | EA-5324 | 0.0085 | 1/9 | 10° | Good (100/100) | Good | Good |
| Example 100 | EA-5420 | 0.0121 | 1/11 | 6° | Good (100/100) | Good | Good |
| Example 101 | EA-5720 | 0.0109 | 1/10 | 9° | Good (100/100) | Good | Good |
| Example 102 | A-NPG | 0.0283 | 1/21 | 6° | Good (100/100) | Good | Good |
| Example 103 | BEPG-A | 0.0224 | 1/17 | 14° | Good (100/100) | Good | Good |
| Example 104 | 40-EM | 0.0173 | 1/14 | 5° | Good (100/100) | Good | Good |
| Example 105 | 1G | 0.0303 | 1/22 | 4° | Good (100/100) | Good | Good |
| Example 106 | 23G | 0.0051 | 1/7 | 6° | Good (100/100) | Good | Good |
| Example 107 | 200PA | 0.0134 | 1/12 | 5° | Good (100/100) | Good | Good |
| Example 108 | PTMGA-250 | 0.0175 | 1/14 | 6° | Good (100/100) | Good | Good |
| Example 109 | Cyclomer-P | 0.0005 | 1/4 | 9° | Good (100/100) | Good | Good |
| Example 110 | 3PA | 0.0153 | 1/13 | 8° | Good (100/100) | Good | Good |
| Example 111 | DA-721 | 0.0142 | 1/8 | 19° | Good (100/100) | Good | Poor |
| Example 112 | DA-722 | 0.0140 | 1/8 | 9° | Good (100/100) | Good | Good |
| Example 113 | HX-220 | 0.0111 | 1/10 | 19° | Good (100/100) | Good | Poor |
| Example 114 | HX-620 | 0.0078 | 1/8 | 22° | Good (100/100) | Good | Poor |
| Example 115 | EB2047 | 0.0094 | 1/9 | 7° | Good (100/100) | Good | Good |
| Example 116 | DPCA-30 | 0.0065 | 1/8 | 5° | Good (100/100) | Good | Good |
| Example 117 | 70PA | 0.0181 | 1/15 | 16° | Good (100/100) | Good | Good |
| Example 118 | K-2080 | 0.0118 | 1/11 | 9° | Good (100/100) | Good | Good |
| Example 119 | UA-306H | 0.0078 | 1/8 | 8° | Good (100/100) | Good | Good |
| Example 120 | UA-306I | 0.0073 | 1/8 | 8° | Good (100/100) | Good | Good |
| Example 121 | U-15HA | 0.0029 | 1/6 | 7° | Good (100/100) | Good | Good |
| Example 122 | M-8530 | — | — | 12° | Good (100/100) | Good | Good |
| Example 123 | M-7100 | — | — | 13° | Good (100/100) | Good | Good |
| Example 124 | M-8560 | — | — | 8° | Good (100/100) | Good | Good |
| Example 125 | M-1600 | — | — | 23° | Good (100/100) | Good | Poor |

[Formula 63]
(Compound of Example 82)

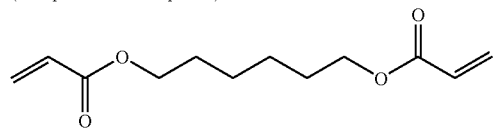

A-HD-N MW = 226.27

TABLE 11-continued

| Example/Comparative Example | B Added monomer | | Molar ratio A/B | Water-contact angle (average) | Cross-cut peel test | Anti-fouling | Anti-fogging |
|---|---|---|---|---|---|---|---|
| | Code | mol | | | | | |

(Compound of Example 83)

A 85%

B 15%

A-IND MW = 268.35

(Compound of Example 84)

A-PTMG-65 MW = 775.07

(Compound of Example 85)

m + n = 2  A-IBD-2E MW = 274.31

(Compound of Examples 86 and 87)

n = 3   APG-200 MW = 300.34
n = 12  APG-700 MW = 823.01

(Compound of Example 88)

l + n = 6, m = 12  1206PE MW = 1115.44

(Compound of Example 89)

l + m + n = 0  A-TMPT MW = 296.32

(Compound of Example 90)

l + m + n + o = 4  ATM-4E MW = 528.56

TABLE 11-continued
| Example/Comparative Example | B Added monomer Code | mol | Molar ratio A/B | Water-contact angle (average) | Cross-cut peel test | Anti-fouling | Anti-fogging |
|---|---|---|---|---|---|---|---|
(Compound of Example 91)
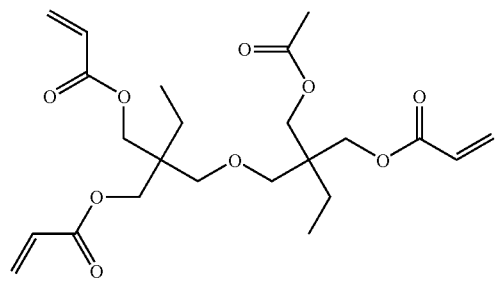
Ad-TMP MW = 466.52
(Compound of Example 92)
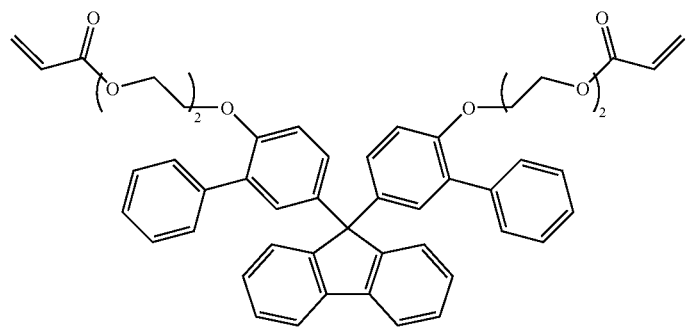
A-BPFL-4E MW = 786.91
(Compound of Example 93)
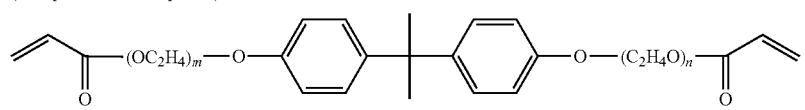
m + n = 30 A-BPE-30 MW = 1609.94
(Compound of Example 94)
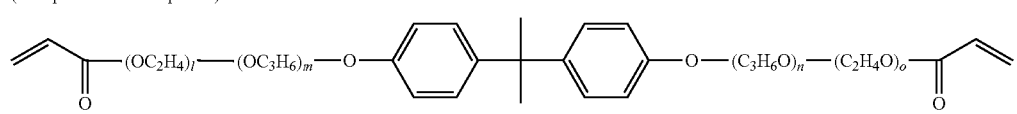
l + n + m + o = 18 A-B1206PE MW = 1207.54
(Compound of Example 95)
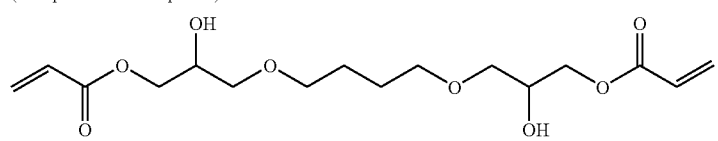
EA-5520 MW = 346.37
(Compound of Example 96)
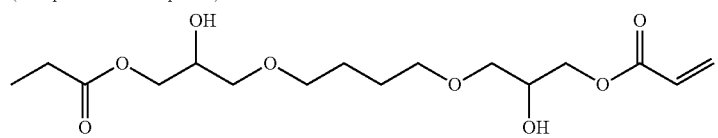
EA-5521 MW = 374.43

TABLE 11-continued
| Example/ Comparative Example | B Added monomer | | Molar ratio A/B | Water-contact angle (average) | Cross-cut peel test | Anti- fouling | Anti- fogging |
|---|---|---|---|---|---|---|---|
| | Code | mol | | | | | |
(Compound of Example 97)
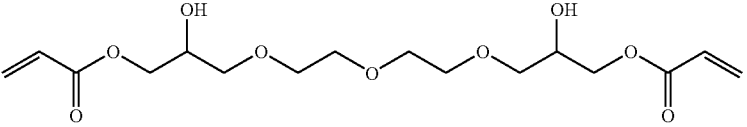
EA-5821 MW = 362.37
(Compound of Example 98)
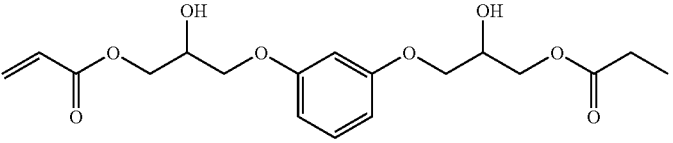
EA-5220 = 368.38
(Compound of Example 99)
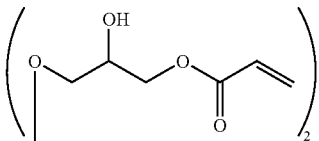
EA-5324 = 708.7
(Compound of Example 100)
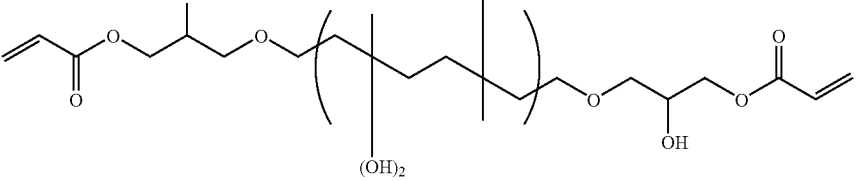
EA-5420 = 496.63
(Compound of Example 101)
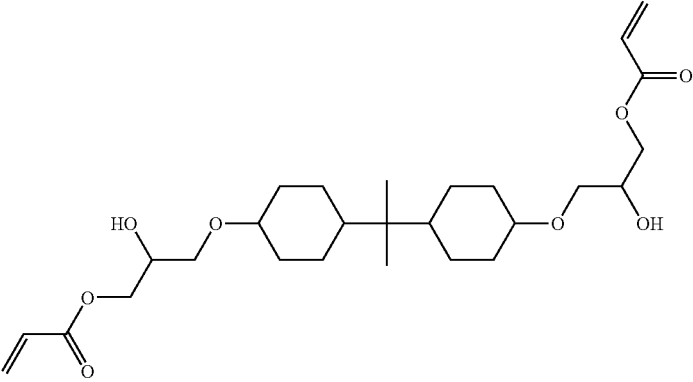
EA-5720 = 550.55

TABLE 11-continued
| Example/ Comparative Example | B Added monomer Code | mol | Molar ratio A/B | Water-contact angle (average) | Cross-cut peel test | Anti-fouling | Anti-fogging |
|---|---|---|---|---|---|---|---|
(Compound of Example 102)
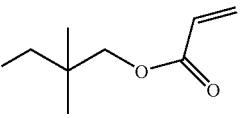
A-NPG MW = 212.24
(Compound of Example 103)
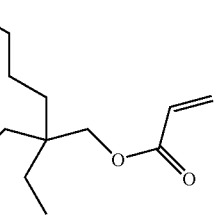
BEPG-A = 268.35
(Compound of Example 104)
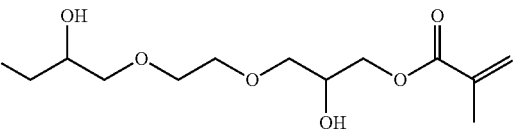
40 EM MW = 346.16
(Compound of Examples 105 and 106)
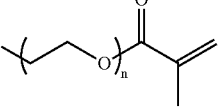
1G MW = 198.22
23G MW = 1167.38
(Compound of Example 107)
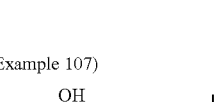
200PA MW = 448.51
(Compound of Example 108)
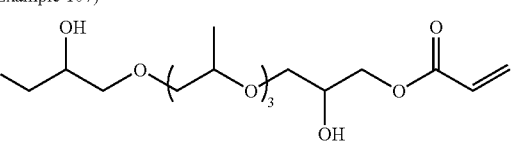
PTMGA-250 MW = 342.43

TABLE 11-continued

| Example/Comparative Example | B Added monomer Code | Molar ratio mol | Molar ratio A/B | Water-contact angle (average) | Cross-cut peel test | Anti-fouling | Anti-fogging |
|---|---|---|---|---|---|---|---|

(Compound of Example 109)

R= alkyl, hydroxyalkyl  
X = H, CH3    MW = 13000  
Cyclomer P (Compound of Example 110)

3PA MW = 392.30

(Compound of Example 111)

DA-721  
$C_{20}H_{22}O_{10}$ = 422.38

(Compound of Example 112)

DA-722  
$C_{20}H_{28}O_{10}$ = 428.43

(Compound of Example 113)

HX-220  
MW = 540.64

TABLE 11-continued
| Example/ Comparative Example | B Added monomer Code | mol | Molar ratio A/B | Water-contact angle (average) | Cross-cut peel test | Anti-fouling | Anti-fogging |
|---|---|---|---|---|---|---|---|
(Compound of Example 114)
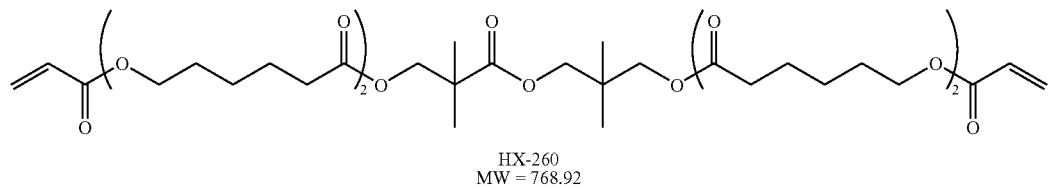
HX-260
MW = 768.92
(Compound of Example 115)
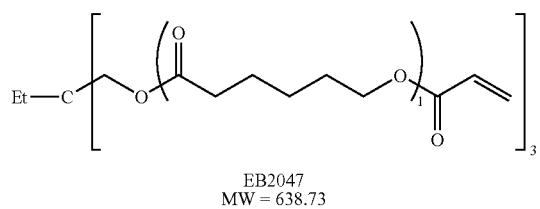
EB2047
MW = 638.73
(Compound of Example 116)
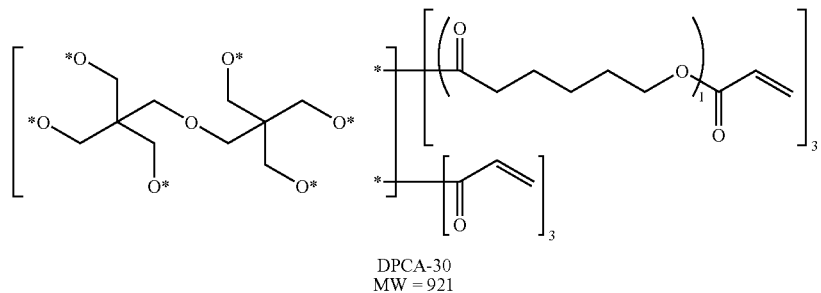
DPCA-30
MW = 921
(Compound of Example 117)
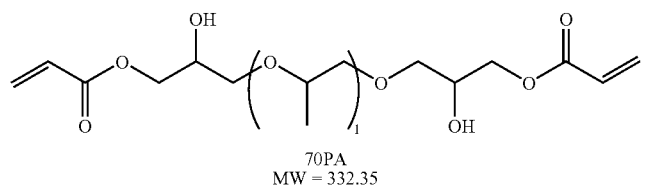
70PA
MW = 332.35
(Compound of Example 118)
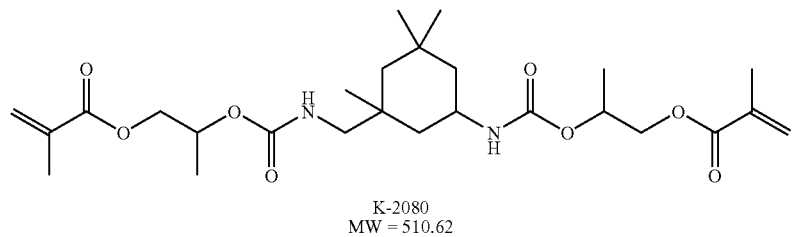 [SMILES: C=C(C)C(=O)OCC(C)OC(=O)NCC1(C)CC(NC(=O)OC(C)COC(=O)C(=C)C)CC(C)(C)C1]
K-2080
MW = 510.62

TABLE 11-continued
| Example/ Comparative Example | B Added monomer | | Molar ratio | Water-contact angle | Cross-cut peel | Anti- | Anti- |
| --- | --- | --- | --- | --- | --- | --- | --- |
| | Code | mol | A/B | (average) | test | fouling | fogging |
(Compound of Example 119)
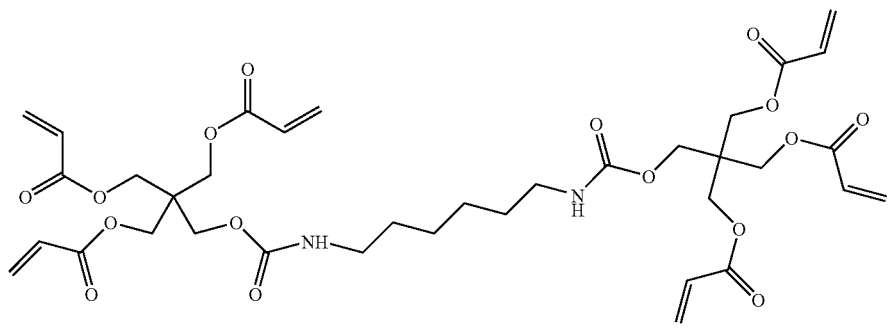
UA-306H
$C_{36}H_{48}N_2O_{16} = 764.77$
(Compound of Example 120)
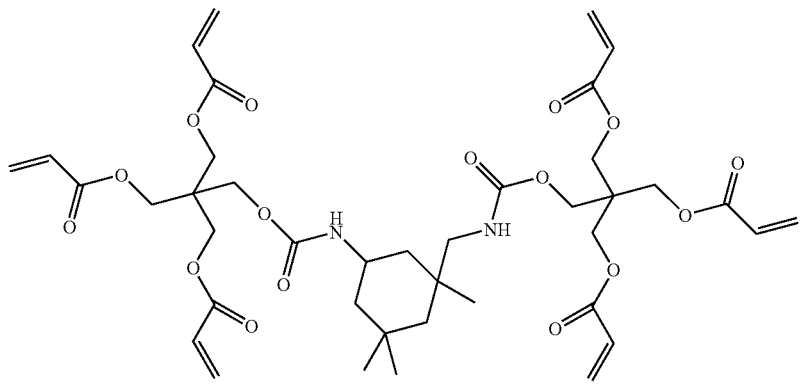
UA-306I
$C_{40}H_{54}N_2O_{16} = 818.86$ TABLE 11-continued

| Example/Comparative Example | B Added monomer | | Molar ratio | Water-contact angle | Cross-cut peel | Anti- | Anti- |
|---|---|---|---|---|---|---|---|
| | Code | mol | A/B | (average) | test | fouling | fogging |

(Compound of Example 121)

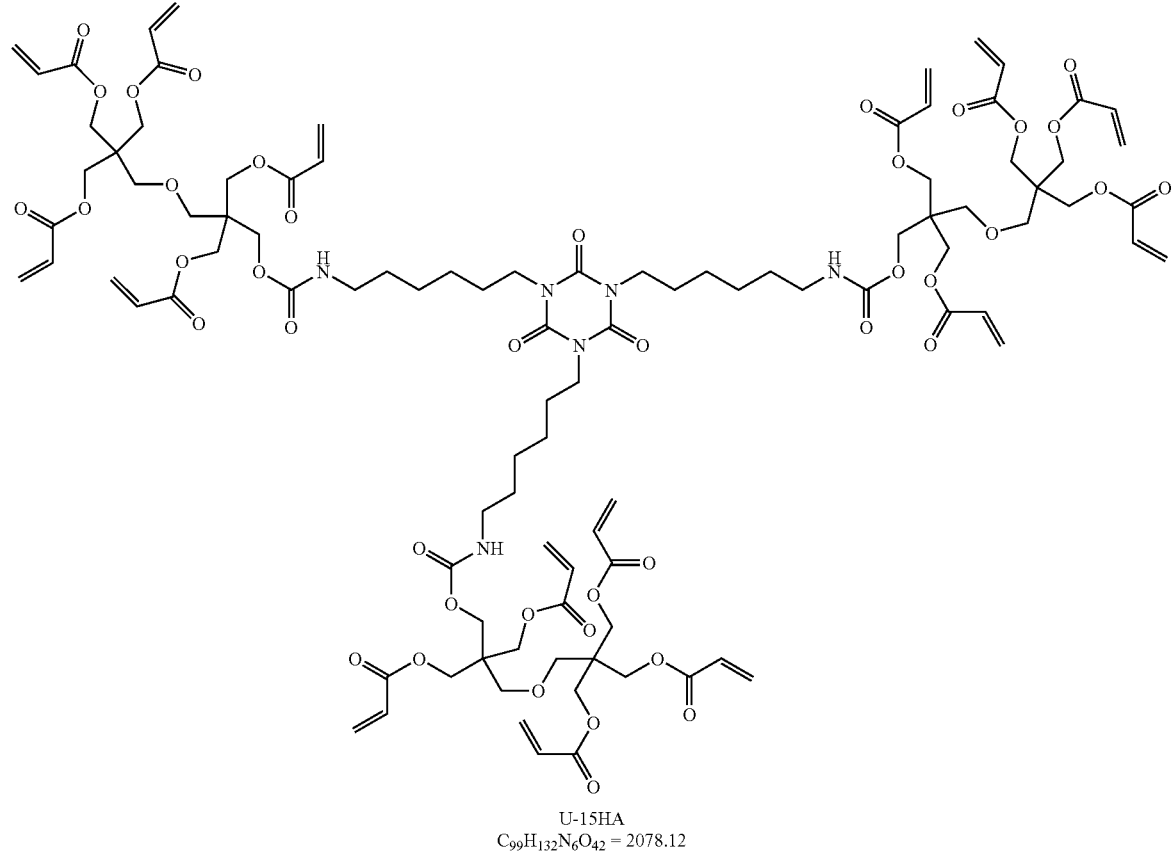 [SMILES: C=CC(=O)OCC(COCC(COC(=O)C=C)(COC(=O)C=C)COC(=O)NCCCCCCn1c(=O)n(CCCCCCNC(=O)OCC(COCC(COC(=O)C=C)(COC(=O)C=C)COC(=O)C=C)(COC(=O)C=C)COC(=O)C=C)c(=O)n(CCCCCCNC(=O)OCC(COCC(COC(=O)C=C)(COC(=O)C=C)COC(=O)C=C)(COC(=O)C=C)COC(=O)C=C)c1=O)(COC(=O)C=C)COC(=O)C=C]

U-15HA
$C_{99}H_{132}N_6O_{42} = 2078.12$ (Compound of Example 122)
Polyester acrylate (tri-functional), trade name M-8530, manufactured by Toagosei Co., Ltd.
(Compound of Example 123)
Polyester acrylate (tri-functional), trade name M-7100, manufactured by Toagosei Co., Ltd.
(Compound of Example 124)
Polyester acrylate (tri-functional), trade name M-8560, manufactured by Toagosei Co., Ltd.
(Compound of Example 125)
Urethane acrylate (bi-functional), trade name M-1600, manufactured by Toagosei Co., Ltd.

Example 126

A composition for coating was prepared by mixing 1.5 g (0.0065 mol) of SPA-K as a compound represented by the general formula (1), 20.0 g (0.0518 mol) of A-GLY-9E as a compound containing two or more (meth)acryloyl groups, 70.0 g (0.133 mol) of A-9530, 10.0 g (0.0373 mol) of 1,5-naphthalene diacrylate (abbreviated as NDA), 3.0 g (3%) of Esacure KTO46 as a polymerization initiator, and 235 g (NV 30%) of methoxyethanol solvent. The obtained composition was applied in a similar manner to that of Example 1 to form a film 5 μm in thickness on the surface of a PC sheet.

Physical properties of the coating film were as follows.
Appearance: transparent
Water-contact angle: 7°
Cross-cut peel test: good (100/100)
Pencil hardness: H
Scratch resistance: good (steel wool #0000, 1 kg load, 10 reciprocal moves)
Antifogging property: good
Antifouling property: good

[Formula 64]

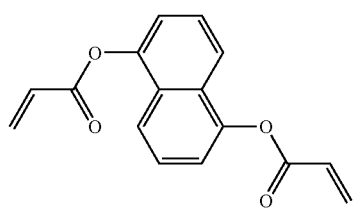

NDA
$C_{16}H_{12}O_4 = 268.26$

<Test of Water Resistance>

Example 127

A mixture of 2.6 g (0.011 mol) of SPA-K as a compound represented by the general formula (1), 20.0 g (0.011 mol) of pentaerythritol tetra(polyethoxylated acrylate) (hereinafter abbreviated as ATM-35E) as a compound containing two or more (meth)acryloyl groups, 80.0 g (0.153 mol) of A-9530, and 50.0 g (0.065 mol) of UA-306H was dissolved in 38.4 g of methanol to prepare a composition with a solid content of 80% (NV).

Into the obtained composition (10.0 g) were charged 0.3 g (3%) of Esacure KTO46 as a polymerization initiator (diluted in n-butanol, a solid content of 80% (NV)) and 17.0 g of methoxyethanol to obtain a composition for coating with a solid content of 30% (NV).

The obtained composition for coating was dried with a hot air drier at 45° C. for 2 minutes, and then coated in a similar manner to that of Example 1 to form a film 10 μm in thickness on the surface of a PC sheet.

Physical properties of the coating film were as follows.
Initial Physical Properties
    Appearance: transparent
    Water-contact angle: 5°
    Cross-cut peel test: good (100/100)
Test in Boiling Water A sample was immersed in boiling water (100° C.) for 1 hour, and an analysis was carried out to determine whether or not there was any change in appearance, hydrophilicity, and adhesiveness. As a result, there was no change observed as shown below.
    Appearance: transparent
    Water-contact angle: 5°
    Cross-cut peel test: good (100/100)

Comparative Example 18

(Japanese Patent Laid-Open Publication No. 2001-98007)
[Explanation of Compounds Used]
    M-114: nonylphenoxypolyethylene glycol (n=8) acrylate ("M-114" is a product manufactured by Toagosei Co., Ltd., HLB value 11.25)
    V-4263: tri-functional urethane acrylate oligomer having an average molecular weight of approximately 2000 ("Unidic V-4263" is a product manufactured by Dainippon Ink and Chemicals, Inc.)
    HDDA: 1,6-hexanediol diacrylate ("New Frontier HDDA" is a product manufactured by Dai-ichi Kogyo Seiyaku Co., Ltd.)
    MR200: 2-methacryloyloxyethylacidphosphate ("MR200" is a product manufactured by Daihachi Chemical Industry Co., Ltd.)
    PMNE10: polyethylene glycol mono-4-nonylphenyl ether (n'=10) ("polyethylene glycol mono-4-nonylphenyl ether (n'=10)" is a product manufactured by Tokyo Chemical Industry Co., Ltd.)
    Irg. 184: 1-hydroxycyclohexyl phenyl ketone ("Irgacure 184" is a product manufactured by Ciba Specialty Chemicals, Inc.)
[Preparation of a Photo-Polymerizable Composition]

A photo-polymerizable composition was prepared by mixing 20 parts of V-4263 and 20 parts of HDDA as polymerizable crosslinking compounds, 60 parts of M114 as a polymerizable compound, and 5 parts of Irg. 184 as a photo-polymerization initiator.

[Preparation of a Material for Forming a Hydrophilic Layer]

A solution containing 5 parts of PMNE10, 5 parts of MR200 as a hydrophilic compound, and 90 parts of water was prepared as a material for forming a hydrophilic layer.

[Preparation of a Double-Layered Coating Film]

The photo-polymerizable composition was applied on a PC board 2 mm in thickness with a bar coater and then irradiated by UV light of 200 mJ/cm$^2$ (accumulated photo quantity) by using a UV light irradiation equipment as mentioned in Example 1 to obtain a half-cured (incompletely cured) coating film.

Then, the half-cured coating film was immersed in the material for forming a hydrophilic layer for 1 minute, pulled out, and again irradiated by the above mentioned UV light of 1500 mJ/cm$^2$ (accumulated photo quantity) to completely cure the film.

The obtained coating film was washed by running water and then dried to complete the coating.

Physical properties of the coating film were as follows.
    Appearance: transparent
    Water-contact angle: 44°
    Cross-cut peel test: poor (0/100)
    Pencil hardness: <6B
    Scratch resistance: poor (steel wool #0000, 1 kg load, 10 reciprocal moves)
    Antifogging property: poor
    Antifouling property: poor
    Others: there was a slight tackiness Examples 128 to 133

Figure 3:
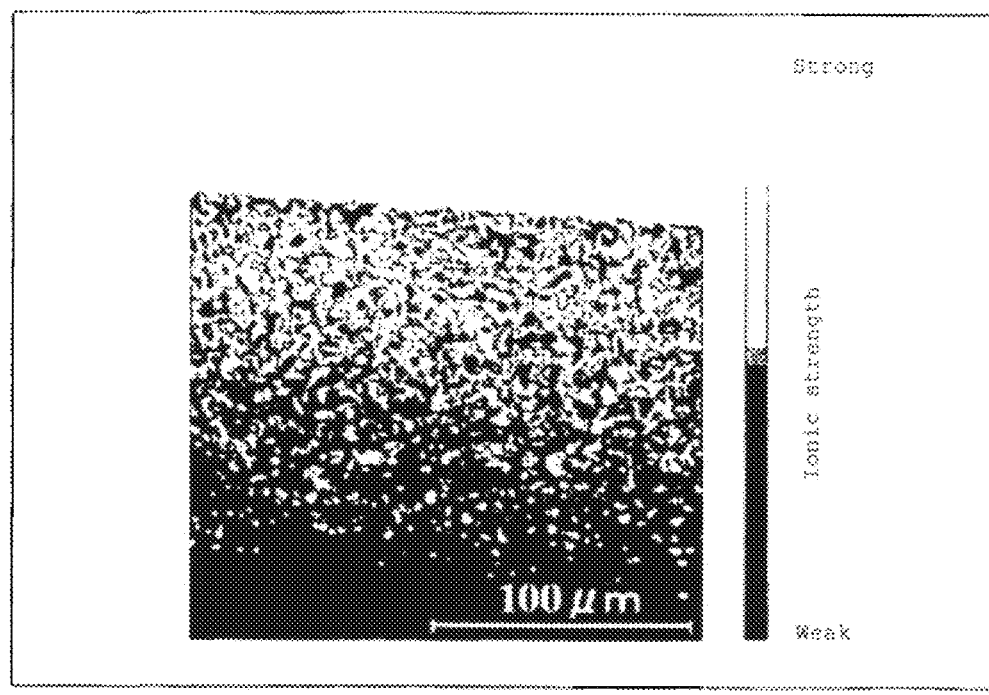
FIG. 3 This figure shows an image of secondary ions of the cutting surface of the coating film in Example 128 (distribution of anion and cation concentrations in a 200 μm square).
Figure 4:
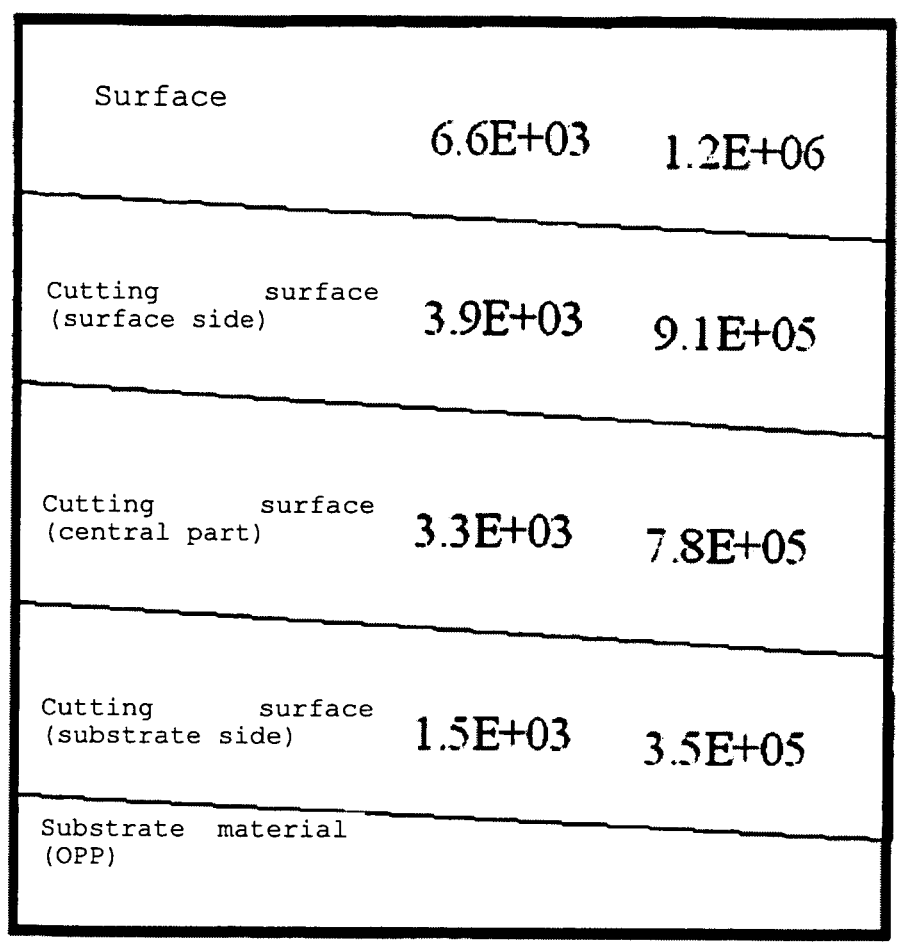
FIG. 4 This is a sketch of the image of secondary ions in FIG. 3.
Figure 5:
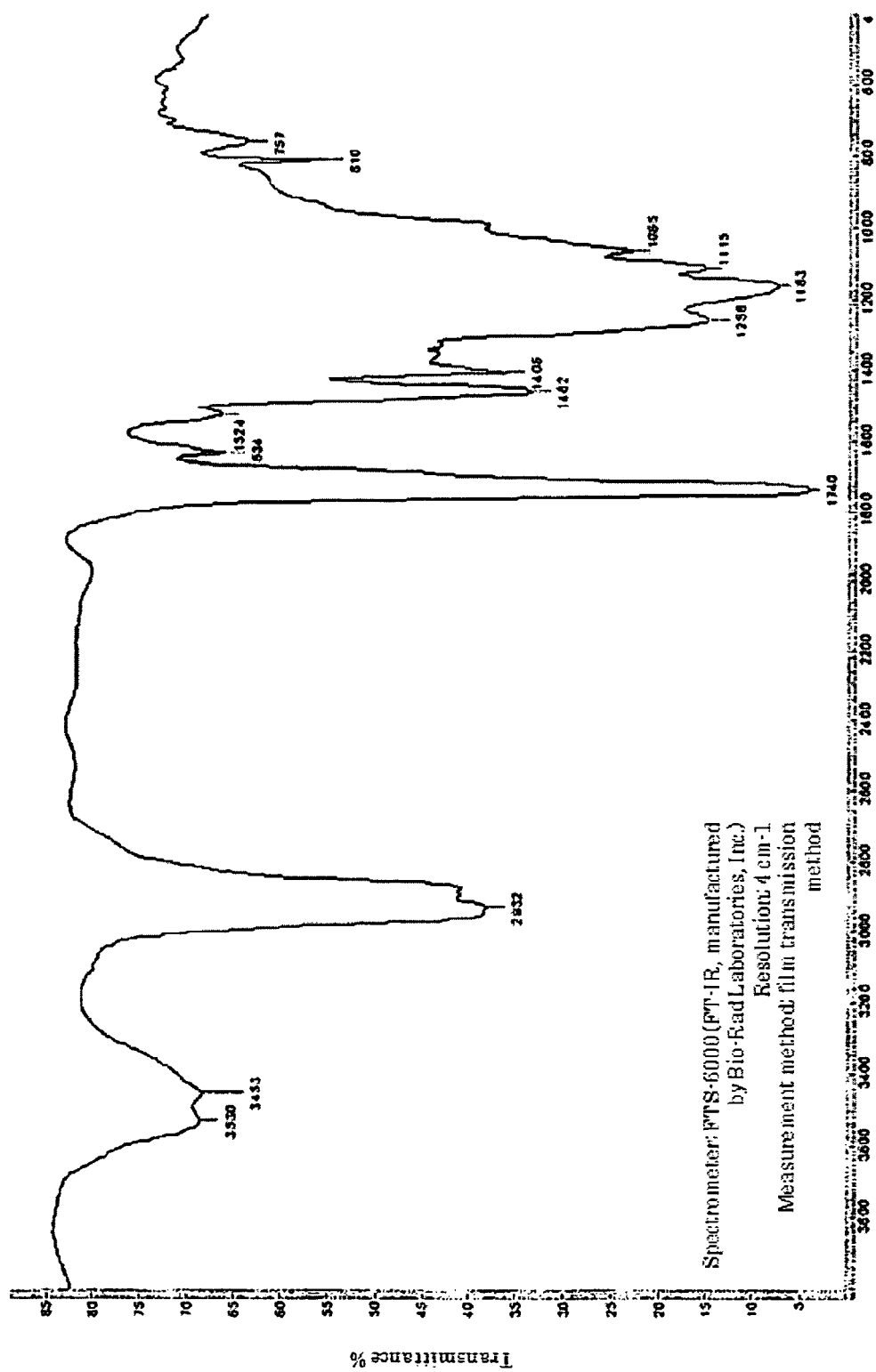
FIG. 5 This is an IR chart of the coating film in Example 128.

A composition was prepared and coated in accordance with the procedure described in Table 12. It should be noted that the similar procedures to those of Example 1 were followed as to the conditions not described in the table. Evaluation results of physical properties are shown in Table 12, and the measured values of the anion and cation concentrations at each part of the film in Examples are shown in Table 12-1. Further, the image of secondary ions (the distribution of anion and cation concentrations) of the cutting surface of the coating film in Example 128 are shown in FIG. 3 and FIG. 4, and the IR chart of the coating film is shown in FIG. 5.

<Steel Wool Scratching Test>

Scratching tests were performed by moving Steel Wool #0000 reciprocally for 10 times at the load of 1 kgf. When no scratches were observed, the composition was rated as "good", otherwise as "poor".

<Measurement of the Anion and the Cation Concentration Ratios>

Figure 2:
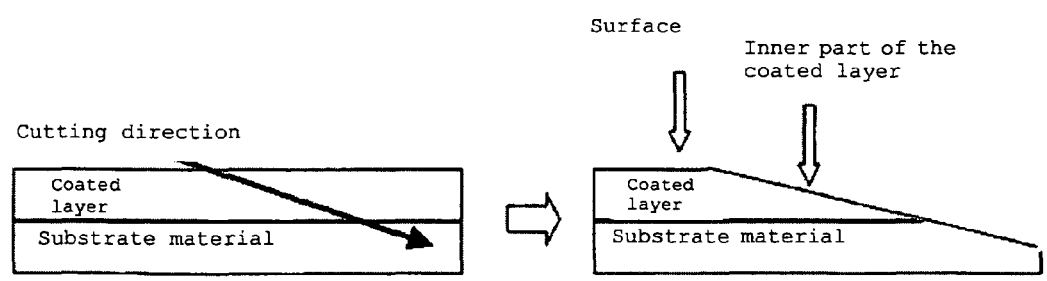
FIG. 2 This is a schematic diagram showing the method for preparing the sample for the measurement of an anion concentration ratio.

The anion concentration ratio at the surface and the deep part of the coated layer-formed on the substrate surface was analyzed by cutting a sample crosswise in accordance with the sample preparation as shown in FIG. 2 and measuring the concentrations at the surface and the inner part (deep part) of the coated layer by using a time-of-flight secondary ion mass spectrometer (TOF-SIMS).

It should be noted that the point of measurement of the inner part (deep part) of the coating film was at a point half as deep as the film thickness.

Analyzing Instrument and Measurement Conditions
    TOF-SIMS; TRIFT2, manufactured by ULVAC-PHI, Inc.
    Primary ion; $^{69}$Ga$^+$ (acceleration voltage of 15 kV)
    Measurement area; 230 μm square
    An electronic gun for static electricity adjustment was used for the measurement.

Sample Preparation and Others

A sample of coating film was precisely cut crosswise and a chip of approximately 10×10 mm² in size was prepared by cutting, which was then covered with a mesh on the measurement surface, immobilized in a holder, and the measurement was conducted.

Evaluation

The evaluation was done in accordance with the following formulae.

Anion concentration ratio=(anion concentration at the surface)/(anion concentration at the inner part (deep part) of the coating film)

Cation concentration ratio=(cation concentration at the surface)/(cation concentration at the inner part (deep part) of the coating film)

Comparative Example 19

(Japanese Patent Laid-Open Publication No. S52-138538)

Charged into a reaction flask were 40 g of methyl methacrylate, 10 g of n-butyl acrylate, and 600 g of toluene, and they were mixed and stirred with nitrogen gas bubbling in the mixture. Then 1 g (2%) of azobisisobutyronitrile was added as a polymerization initiator, the resultant mixture was stirred (polymerized) at 70° C. for 7 hours.

The reaction solution was cooled, and then added dropwise into 1500 g of hexane under stirring at room temperature. The deposited crystals were filtered out and dried under reduced pressure to obtain 37.5 g of a copolymer of methyl methacrylate and n-butyl acrylate (hereinafter abbreviated as PMMB, the weight average molecular weight of 2000) (yield 75%).

To a mixture of 0.1 g (0.0005 mol) of SEA-Na as a compound represented by the general formula (1), 3.0 g (0.010 mol) of trimethylolpropane triacrylate (abbreviated as A-TMPT) as a compound containing two or more (meth) acryloyl groups, and 10.0 g (0.0005 mol) of PMMB obtained above, there were added 0.4 g (3 wt %) Esacure KTO/46 (manufactured by Lamberti S.P.A.) as a polymerization initiator and 30.0 g (solid content of 30 wt %) of methoxyethanol as a solvent and then the resultant mixture was dissolved under sonication. The resultant composition for coating was applied with a bar coater, dried with a hot air dryer at 80° C. for 1 minute, and then irradiated by UV light in a similar manner to that of Example 1 to form a coating film 3 μm in thickness on a PC sheet.

Physical properties of the obtained coating film were as follows.

Appearance: transparent
Water-contact angle: 32°
Cross-cut peel test: good (100/100)
Pencil hardness: 2B
Scratch resistance: poor
Antifogging property: poor
Antifouling property: fair
Anion concentration ratio=0.1
Cation concentration ratio=0.2
Others: no tackiness The results are shown in Tables 12 and 12-1.

TABLE 12

|  |  | Example 128 | Example 129 | Example 130 | Example 131 | Example 132 | Example 133 | Comparative Example 19 |
|---|---|---|---|---|---|---|---|---|
| Composition of coat material | Monomer 1 | SPA-K 1.3 | SPA-K 5.1 | SPA-K 1.1 | P-1M.Na 2.5 | AA.Na 1.3 | HOA-MS.Na 5.6 | SEA-Na 0.1 |
|  | Monomer 2 | ATM-35E 10.2 | 80-MFA 38.2 | A-GLY-9E 15.3 | 80-MFA 30.6 | 80-MFA 31.0 | 80-MFA 31.0 | A-TMPT 3.0 |
|  | Monomer 3 | A-9530 40.7 | A-9530 34.5 | A-9530 61.2 | A-9530 20.4 | A-9530 20.6 | A-9530 20.6 | PMMB 10.0 |
|  | Monomer 4 | U-15HA 25.5 | — | — | — | — | — | — |
|  | Polymerization Initiator | KTO46 2.3 | ← | ← | KTO46 1.5 | KTO46 1.5 | KTO46 1.9 | KTO46 0.4 |
|  | Solvent 1 | Methanol 20.0 | ← | Methanol 100.0 | Water 6.4 | Water 12.9 DMF 6.5 | Water 10.0 DMF 6.5 | — |
|  | Solvent 2 | Methoxy-ethanol 170.0 | ← | — | Methoxy-ethanol 38.2 | Methanol 26.0 Methoxy-ethanol 10.0 | Methoxy-ethanol 10.0 | Methoxy-ethanol 30.0 |
| Substrate material |  | OPP film | PC sheet | 1)Easily adherable PET | ← | ← | PC sheet | ← |
|  | Drying | 80° C. 1 min | 40° C. 2 min | 50° C. 2 min | 70° C. 2 min | 50° C. 2 min | ← | 80° C. 1 min |
|  | Film thickness | 3 μm | 2 μm | 5 μm | ← | ← | 2 μm | 3 μm |
| Physical properties of coating film | Water-contact angle (°) | 5 | 7 | 10 | 16 | 25 | 28 | 32 |
|  | *Surface resistivity | 4.2E+10 | 6.8E+10 | 1.6E+11 |  |  |  |  |
|  | Cross-cut peel test | 100/100 | 100/100 | 100/100 | 100/100 | 100/100 | 100/100 | 100/100 |
|  | Surface tackiness | None | None | None | None | None | None | None |
|  | Antifogging | Good | Good | Good | Good | Poor | Poor | Poor |
|  | Antifouling | Good | Good | Good | Good | Good | Good | Fair |
|  | **Anion concentration ratio **Cation concentration | $SO_3^- = 2.0$ $K^+ = 1.6$ Refer to FIG. 4 | $SO_3^- = 2.2$ $K^+ = 1.4$ | $SO_3^- = 6.4$ $K^+ = 6.8$ | $PO_3^- = 1.2$ $Na^+ = 1.3$ | $O_2^- = 1.4$ $Na^+ = 3.3$ |  | $SO_3^- = 0.1$ $Na^+ = 0.2$ |

TABLE 12-continued

|  |  | Example 128 | Example 129 | Example 130 | Example 131 | Example 132 | Example 133 | Comparative Example 19 |
|---|---|---|---|---|---|---|---|---|
|  | ratio |  |  |  |  |  |  |  |
|  | IR analysis of the film | Refer to FIG. 5 |  |  |  |  |  |  |

*23° C. - 50 ± 5% RH
**Strength ratio between the surface and the inner (deep) part of the coating film
[1]Cosmo Shine [A4300], manufactured by Toyobo Co., Ltd.

TABLE 12-1

|  |  |  | Surface | Film upper part (surface side) | Film center | Film lower part (substrate side) | Concentration ratio | Contact angle |
|---|---|---|---|---|---|---|---|---|
| Example 128 | SPA-K | SO3 – K+ | 6.6E+03 1.2E+06 | 3.9E+03 9.1E+05 | 3.3E+03 7.8E+05 | 1.5E+03 3.5E+05 | 2.0 1.6 | 5 |
| Example 129 | SPA-K | SO3 – K+ | 7.4E+03 4.0E+05 | 2.6E+03 2.2E+05 | 3.4E+03 2.8E+05 | 3.4E+03 2.5E+05 | 2.2 1.4 | 7 |
| Example 130 | SPA-K | SO3 – K+ | 3.8E+03 6.1E+05 | 3.1E+02 5.0E+04 | 5.9E+02 8.9E+04 | 7.1E+02 9.7E+04 | 6.4 6.8 | 10 |
| Example 131 | P-1M•Na | PO3 – Na+ | 6.8E+03 3.8E+05 | 6.3E+03 3.5E+05 | 5.4E+03 3.0E+05 | 1.7E+03 1.4E+05 | 1.2 1.3 | 16 |
| Example 132 | AA•Na | O2 – Na+ | 2.4E+03 4.3E+05 | 2.3E+03 2.3E+05 | 1.7E+03 1.3E+05 | 2.1E+03 1.5E+05 | 1.4 3.3 | 25 |
| Example 133 | HOA-MS•Na |  |  |  |  |  | — | 28 |
| Comparative Example 19 | SEA-Na 52-138538 | SO3 – Na+ | 5.3E+01 4.2E+04 | 9.6E+01 5.8E+04 | 4.7E+02 2.4E+05 | 7.0E+02 3.2E+05 | 0.1 0.2 | 32 |

[Formula 65]
(Compound of Example 131)

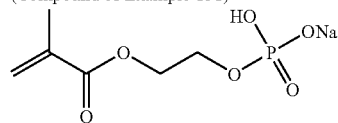

P-1M-Na (Compound of Example 132)

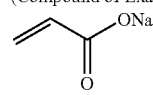

AA-Na
$C_3H_3NaO_2 = 94.04$ (Compound of Example 133)

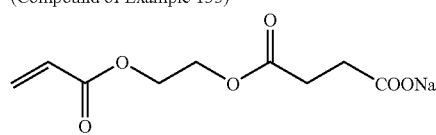

HOA-MS-Na
$C_9H_{11}NaO_6 = 238.17$

Example 134

A composition (solid content (NV) of 80%) was prepared by mixing 3.6 g (0.011 mol) of SDA-K as a compound represented by the general formula (1), 20.0 g (0.011 mol) of pentaerythritol tetra(polyethoxylated acrylate) (hereinafter abbreviated as ATM-35E) as a compound containing two or more (meth)acryloyl groups, 80.0 g (0.153 mol) of A-9530, 50.0 g (0.024 mol) of U-15HA, and 38.4 g of methanol.

A composition for coating with a solid content of 30% (NV) was prepared by adding 0.3 g (3%) of Esacure KTO46 as a polymerization initiator (diluted in n-butanol, solid content of 80% (NV)) and 17.0 g of methoxyethanol to 10 g of the obtained composition.

The prepared composition for coating was applied in a similar manner to that of Example 1 to form a coating film 5 μm in thickness on a PC sheet surface.

Physical properties of the obtained coating film were as follows.

Appearance: transparent
Water-contact angle: 7°
Cross-cut peel test: good (100/100)
Pencil hardness: F
Scratch resistance: good
Antifogging property: good
Antifouling property: good
Others: no tackiness

[Formula 66]

(Compounds of Example 134)

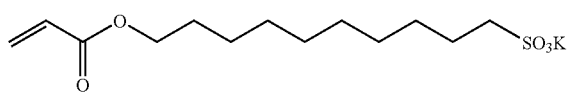

SDA-K
$C_{12}H_{23}KO_5S = 330.48$

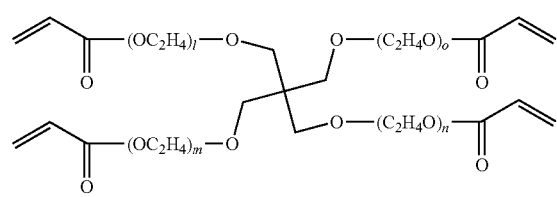

ATM-35E
$l + m + n + o = 35$
$MW = 1894.20$

Example 135

The tests were performed in a similar manner to that of Example 134, except that 3.4 g (0.011 mol) of STA-K was used instead of SDA-K.

Physical properties of the obtained coating film were as follows.

Appearance: transparent

Water-contact angle: 5°

Cross-cut peel test: good (100/100)

Pencil hardness: F

Scratch resistance: good

Antifogging property: good

Antifouling property: good

Others: no tackiness (Compounds of Example 135)

[Formula 67]

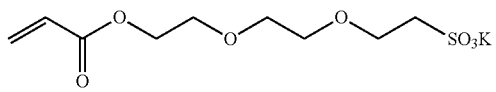

STA-K
$C_9H_{15}KO_7S = 306.37$

<Concerning the Drying Method>

Example 136

A composition (solid content (NV) of 80%) was prepared by mixing 2.2 g (0.0095 mol) of SPA-K as a compound represented by the general formula (1), 20.0 g (0.018 mol) of glycerin tris(polyethoxylated acrylate) (hereinafter abbreviated as A-GLY-20E) as a compound containing two or more (meth)acryloyl groups, 80.0 g (0.153 mol) of A-9530, 50.0 g (0.024 mol) of U-15HA, and 38.0 g of methanol.

A composition for coating with a solid content of 30% (NV) was prepared by adding 0.3 g (3%) of Esacure KTO46 as a polymerization initiator (diluted in n-butanol, solid content of 80% (NV)) and 17.0 g of methoxyethanol to 10 g of the obtained composition.

The prepared composition for coating was applied on a PMMA (poly(methyl methacrylate)) sheet 3 mm in thickness with a bar coater, dried with a hot air dryer by changing temperature and time, and then subjected to the UV light irradiation in a similar manner to that of Example 1 to form a coating film 7 μm in thickness on the PMMA sheet surface. The results are shown in Table 13.

TABLE 13

| Drying temperature | 45° C. | ← | ← | 60° C. | ← | 80° C. |
|---|---|---|---|---|---|---|
| time | 1 minute | 2 minutes | 3 minutes | 1 minute | 2 minutes | 1 minute |
| Appearance | Transparent | Transparent | Transparent | Transparent | Transparent | Transparent |
| Water-contact angle (°) | 6 | 5 | 5 | 6 | 6 | 5 |
| *Scratch resistance | Good | Good | Good | Good | Good | Good |
| Cross-cut peel test | Good (100/100) | Good (100/100) | Good (100/100) | Good (100/100) | Good (100/100) | Good (100/100) |
| Antifogging | Good | Good | Good | Good | Good | Good |
| Antifouling | Good | Good | Good | Good | Good | Good |
| Surface tackiness | None | None | None | None | None | None |

*Steel wool scratching test (Compound of Example 136)

[Formula 68]

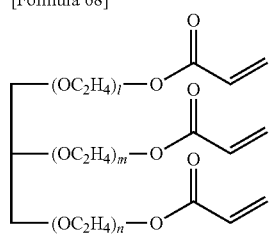

A-GLY-20E
$l + m + n = 20$  $MW = 1135.31$

<Concerning the Residual Solvent>

Example 137

A composition (solid content (NV) of 80%) for coating was prepared by mixing 3.0 g (0.013 mol) of SPA-K as a compound represented by the general formula (1), 20.0 g (0.011 mol) of pentaerythritol tetra(polyethoxylated acrylate) (hereinafter abbreviated as ATM-35E) as a compound containing two or more (meth)acryloyl groups, 80.0 g (0.153 mol) of A-9530, 26.0 g of methanol, and 3.0 g (3%) of Esacure KTO46 as a polymerization initiator.

The obtained composition for coating was applied on an easily adherable high-transparent PET film (trade name; Cosmo Shine A4300, manufactured by Toyobo Co., Ltd., 100 μmin thickness, water-contact angle 70°) with a bar coater, dried at 40° C. in a drying oven (non-convective type), and then irradiated by UV light in a similar manner to that of Example 1 to form a coating film 5 μm in thickness on the PET film surface.

Here, the amount of methanol just before the UV irradiation was quantitatively analyzed by GC (gas chromatography) to investigate its relationship with the hydrophilicity of the film obtained after the UV cure. The results are shown in Table 14.

TABLE 14

| Amount of residual solvent (wt %) | 8.64 | 0.98 | 0.32 | 0.06 |
|---|---|---|---|---|
| Water-contact angle (°) | 10 | 7 | 6 | 6 |

(Compound of Example 137)

[Formula 69]

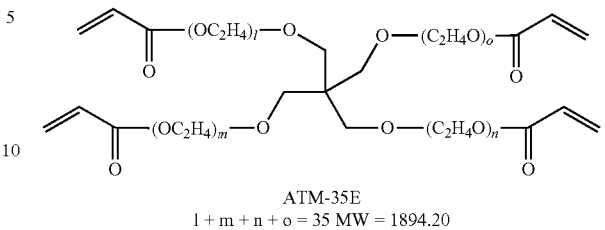

ATM-35E
$l + m + n + o = 35$  MW = 1894.20

<Concerning the Film Thickness>

Example 138

A composition (solid content (NV) of 80%) was prepared by mixing 2.6 g (0.011 mol) of SPA-K as a compound represented by the general formula (1), 20.0 g (0.011 mol) of pentaerythritol tetra(polyethoxylated acrylate) (hereinafter abbreviated as ATM-35E) as a compound containing two or more (meth)acryloyl groups, 80.0 g (0.153 mol) of A-9530, 50.0 g (0.024 mol) of U-15HA, and 38.4 g of methanol.

A composition for coating with solid content of 30% (NV) was prepared by adding 0.3 g (3%) of Esacure KTO46 as a polymerization initiator (diluted in n-butanol, solid content of 80% (NV)) and 17.0 g of methoxyethanol to 10 g of the obtained composition.

The prepared composition for coating was applied on a corona-treated OPP film (biaxially oriented polypropylene film, 50 μm in thickness) with a bar coater, dried at 80° C. with a hot air dryer for 2 minutes, and then irradiated by UV light in a similar manner to that of Example 1 to form a coating film 1 to 10 μm in thickness on the OPP film surface. The results are shown in Table 15.

TABLE 15

| Film thickness | 1 μm | 2 μm | 3 μm | 5 μm | 10 μm |
|---|---|---|---|---|---|
| Appearance | Transparent | Transparent | Transparent | Transparent | Transparent |
| Water contact angle (°) | 5 | 5 | 3 | 3 | 3 |
| *Scratch resistance | Poor | Good | Good | Good | Good |
| Cross-cut peel test | Good (100/100) | Good (100/100) | Good (100/100) | Good (100/100) | Good (100/100) |
| Antifogging | Good | Good | Good | Good | Good |
| Antifouling | Good | Good | Good | Good | Good |
| Surface tackiness | None | None | None | None | None |

*Steel wool scratching test (Compound of Example 138)

[Formula 70]

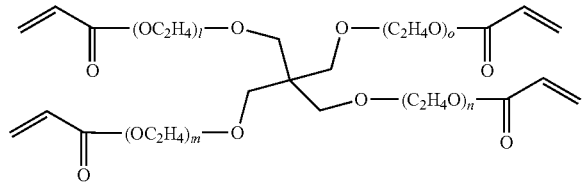

ATM-35E
$l + m + n + o = 35$  MW = 1894.20

<Concerning the Treatment for Weather Resistance>

Example 139

A composition (solid content (NV) of 80%) was prepared by mixing 2.6 g (0.011 mol) of SPA-K as a compound represented by the general formula (1), 20.0 g (0.011 mol) of pentaerythritol tetra(polyethoxylated acrylate) (hereinafter abbreviated as ATM-35E) as a compound containing two or more (meth)acryloyl groups, 80.0 g (0.153 mol) of A-9530, 50.0 g (0.024 mol) of U-15HA, and 38.4 g of methanol.

A composition for coating with solid content of 30% (NV) was prepared by adding to 10 g of the obtained composition 0.80 g (10%) of Tinuvin 405 (trade name, manufactured by Ciba Specialty Chemicals, Inc.) as a UV light absorber, 0.16 g (2%) of Nyrostab S-EED (trade name, manufactured by Clariant (Japan) K.K.) as a HALS, 0.50 g (5%) of Esacure KTO46 (manufactured by Lamberti S.P.A.) as a polymerization initiator (diluted in n-butanol, solid content of 80% (NV)), 18.0 g of methoxyethanol and 2.0 g of DMF (N,N-dimethylformamide) as a diluent.

The prepared composition for coating was applied on a PC sheet 2 mm in thickness with a bar coater, dried at 45° C. with a hot air dryer for 2 minutes, and then irradiated by UV light in a similar manner to that of Example 1 to form a coating film 3 to 10 μm in thickness on the PC sheet surface. The results are shown in Table 16.

TABLE 16

| UV absorber | 10% | ← | ← | ← |
|---|---|---|---|---|
| HALS | 2% | ← | ← | ← |
| Polymerization initiator | 5% | ← | ← | ← |
| Film thickness | 3 μm | 5 μm | 7 μm | 10 μm |
| Appearance | Transparent | Transparent | Transparent | Transparent |
| Water-contact angle (°) | 7 | 6 | 7 | 7 |
| *Scratch resistance | Good | Good | Good | Good |
| Cross-cut peel test | Good (100/100) | Good (100/100) | Good (100/100) | Good (100/100) |
| Antifogging | Good | Good | Good | Good |
| Antifouling | Good | Good | Good | Good |
| Surface tackiness | None | None | None | None |

*Steel wool scratching test

<Concerning the Primer Treatment (Undercoat) and the Like>

Example 140

The similar procedures to that of Example 139 were followed except that the primer treatment (undercoat) was carried out on one side of a CPP (cast polypropylene) film 50 μm in thickness in advance.

It should be noted that the primer treatment (undercoat) was carried out in the following manner.

An undercoat material of a urethane type (Takenate A-3, manufactured by Mitsui Takeda Chemicals, Inc.) (isocyanate compound; solid content 75%) and Takelac A-310 (polyester polyol, solid component 50%) were mixed at 5/1 ratio by weight, and then ethyl acetate was added to adjust the solid content to 5%. The resultant product was applied with a bar coater, and dried at 80° C. for 2 to 3 seconds to give a primer layer (undercoat) whose thickness was 0.2 μm.

Physical properties of the film formed on the primer layer were as follows.

Appearance: transparent
Thickness of the coating film: 3 μm
Water-contact angle: 7°
Cross-cut peel test: good (100/100)
Tackiness: none <Concerning the Diluting Solvent>

Example 141

The similar procedures to those of Example 139 were followed by using different diluents. It should be noted that a PC sheet 2 mm in thickness was used as a substrate material to form a film 3 μm in thickness on a surface of the sheet. The results are shown in Table 17.

It should be noted that a solubility parameter a was calculated according to the following formulae.

(1) Latent heat of evaporation per mol; Hb=21×(273+Tb) (unit:cal/mol), Tb: boiling point (° C.)
(2) Latent heat of evaporation per mol at 25° C.; H25=Hb× [1+0.175×(Tb−25)/100] (unit: cal/mol), Tb: boiling point (° C.)
(3) Bond energy between molecules E=H25−596 (unit: cal/mol)
(4) Bond energy between molecules per ml ($cm^3$) solvent E1=E×D/MW (unit: $cal/cm^3$), D: density ($g/cm^3$), MW: molecular weight
(5) Solubility parameter; σ=(E1)$^{1/2}$ (unit: $cal/cm^3$)

TABLE 17

| Solvent | Butyl acetate | Toluene | Methyl-ethyl ketone | Methoxy-ethanol | DMF |
|---|---|---|---|---|---|
| **Solubility parameter σ (cal/cm3) | 8.4 | 9.0 | 9.1 | 10.8 | 11.6 |
| Water-contact angle (°) | 68 | 68 | 64 | 7 | 10 |
| *Scratch resistance | Good | Good | Good | Good | Good |
| Antifogging | Poor | Poor | Poor | Good | Good |
| Antifouling | Poor | Poor | Poor | Good | Good |
| Surface tackiness | None | None | None | None | None |

*Steel wool scratching test

<Silica Hybrid>

Example 142

A composition (solid content (NV) of 80%) was prepared by mixing 4.0 g (0.017 mol) of SPA-K as a compound represented by the general formula (1), 40.0 g (0.115 mol) of 80-MFA as a compound containing two or more (meth)acryloyl groups, 60.0 g (0.114 mol) of A-9530, 3.0 g (3%) of Esacure KTO46 as a polymerization initiator, and 27 g of solvent methanol.

A composition for organic/inorganic hybrid coating with solid content of NV 10 wt % was prepared, first dissolving 2.5 g of the obtained composition by adding 18.2 g of methoxyethanol as a diluent, and then adding and mixing 0.33 g (5 wt % relative to organic solid content) of methanol/silica gel sol (manufactured by Nissan Chemical Industries, Ltd., particle diameter 15 to 30 nm, solid content NV 30 wt %, methanol solution).

The prepared composition for coating was applied in a similar manner to that of Example 1 to form a coating film 3 μm in thickness on a PC sheet surface.

Physical properties of the obtained coating film were as follows.

Appearance; almost transparent
Water-contact angle: 9°
Cross-cut peel test: good (100/100)
Antifogging: good
Antifouling: good

INDUSTRIAL APPLICABILITY

An organic single layer film obtained by the present invention, having high hydrophilicity and hardness, is useful for obtaining a coating film having good antifogging, antifouling and antistatic properties, and a multilayer body whose substrate surface is covered with the film.

The invention claimed is:

1. A single layer film comprising at least one anionic hydrophilic group selected from a sulfonic acid group, a carboxyl group and a phosphate group, the single layer film having an anion concentration ratio (Sa/Da) of an anion concentration at a surface (Sa) to an anion concentration at a deep part (Da) of 1.1 or more, which is obtained by coating a composition containing a compound (I) represented by the general formula (1) mentioned below, a compound (II) having two or more (meth)acryloyl groups, and a solvent having a solubility parameter of 9.5 $(cal/cm^3)^{1/2}$ or more, drying the composition whereby the amount of the residual solvent in the composition just before polymerizing is 10% or less, and then polymerizing the composition,

[Formula 1]

$$[X]s[M1]1[M2]m \qquad (1)$$

wherein, s represents 1 or 2; l represents 1 or 2; m represents 0 or 1, M1 and M2 may be the same or different, and represent a hydrogen ion, an ammonium ion, an alkali metal ion, or an alkaline earth metal ion, X represents one kind selected from the hydrophilic groups represented by the following general formulae (1-1) to (1-4),

[Formula 2]

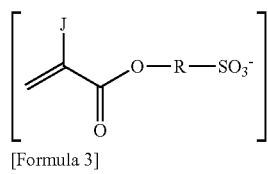
(1-1)

[Formula 3]

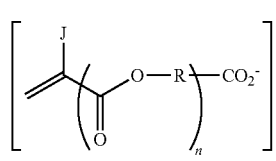
(1-2)

[Formula 4]

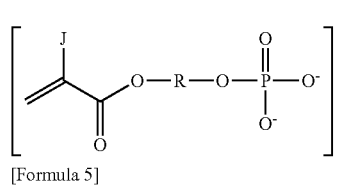
(1-3)

[Formula 5]

-continued

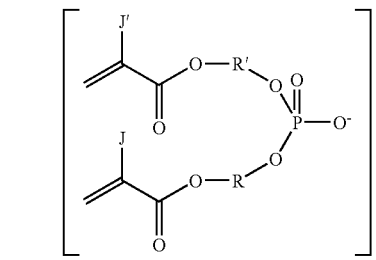
(1-4)

wherein, J and J' may be the same or different and represent H or $CH_3$; n represents 0 or 1; R and R' may be the same or different, represent an aliphatic hydrocarbon group having 1 to 600 carbon atoms and may contain an aromatic ring, an alicyclic group, an ether group or an ester group.

2. The single layer film according to claim 1, wherein the water-contact angle is 30° or less.

3. The single layer film according to claim 1, wherein the thickness is 0.5 to 100 μm.

4. The single layer film according to claim 1, wherein the compound (I) represented by the general formula (1) is represented by the following general formula (1-1-1) or the following general formula (1-1-2),

[Formula 6]

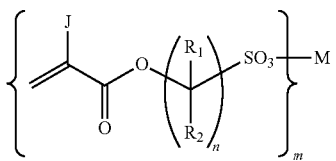
(1-1-1)

[Formula 7]

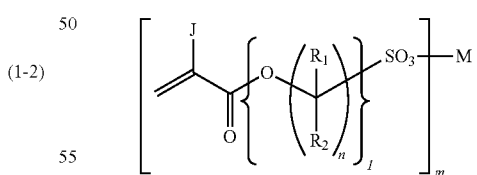
(1-1-2)

wherein, J represents H or $CH_3$; $R_1$ and $R_2$ independently represent H, $CH_3$ and an ethyl group; n represents an integer of 1 to 20; m represents an integer of 1 to 2; l represents an integer of 2 to 10; M represents H, an amine group, an alkali metal, or an alkaline earth metal.

5. The single layer film according to claim 1, wherein the compound (II) having two or more (meth)acryloyl groups in a molecule is represented by the following general formula (2-1) or (2-2),

[Formula 8]
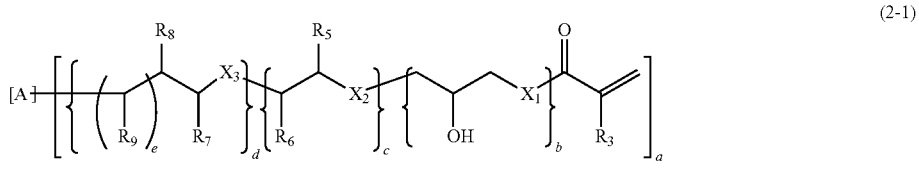
(2-1)
[Formula 9]
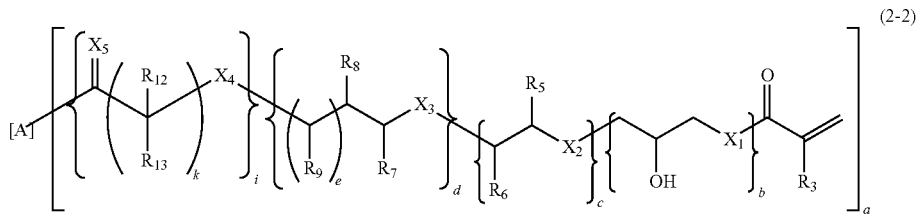
(2-2)
(in the formulae, A represents one kind selected from
[Formula 10]
*O*, *S*
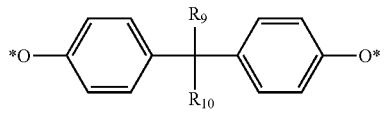
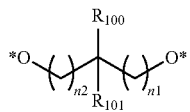
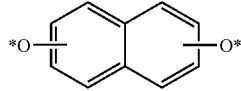
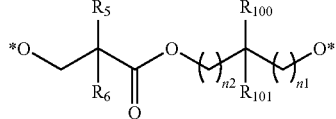
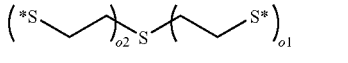
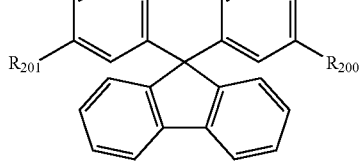
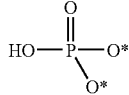
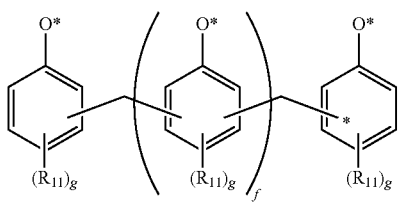
-continued
*O—(CH)_m—⌬—(CH)_m—O*
*O—[adamantane/norbornane]—O*
*O—CH_2—CH(V)—CH_2—O*
[dioxane with R_5, R_6, R_7 substituents]
[pentaerythritol-type with W_1]
[1,3,5-triazine-2,4,6-trione]
[bis-pentaerythritol-type with W_2, W_3]
*O—(CH_2)_m—phenylene—(CH_2)_m—O*
*OOCHN—R—NHCOO* or

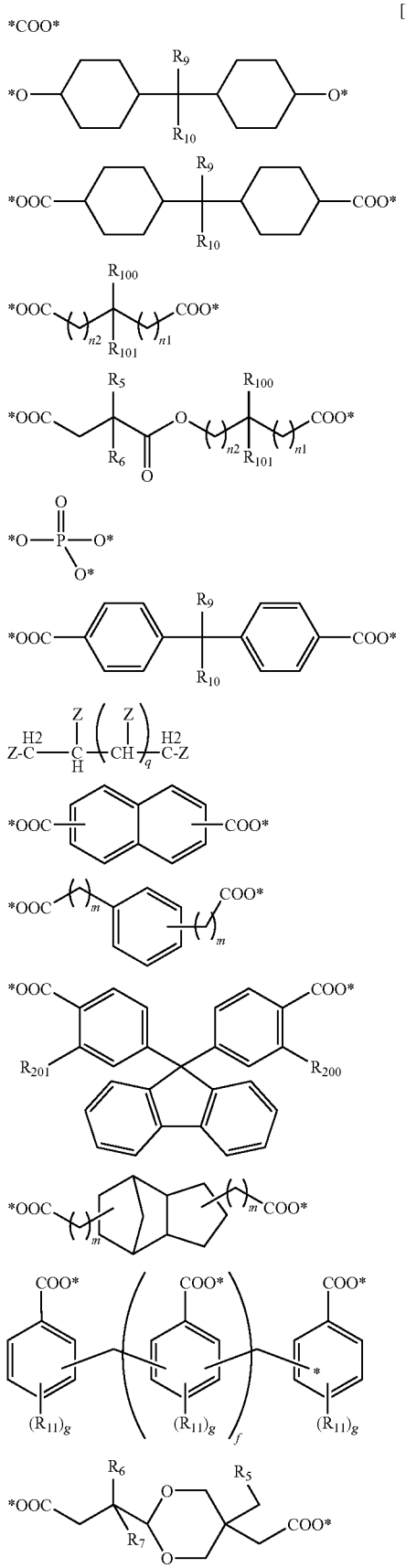
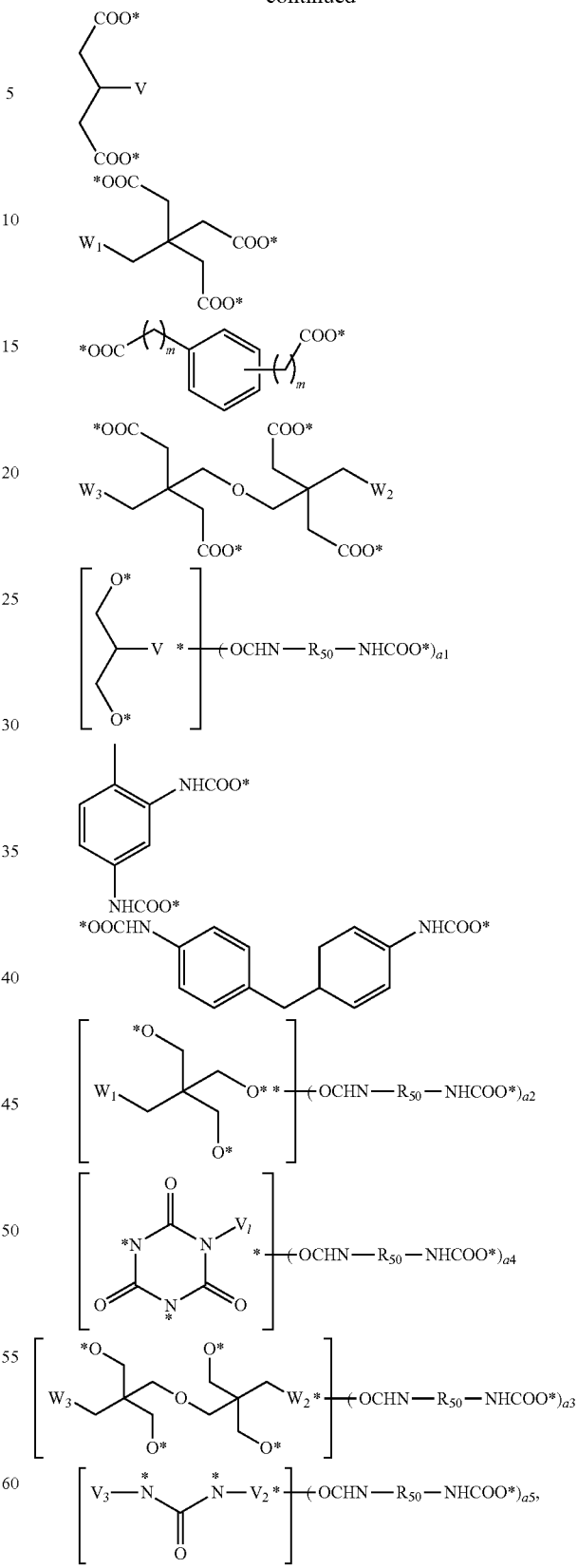
here, * represents a bonding hand,

R represents hexamethylene, isophorone (1-methylene-3-ethylene-3-methyl-5,5-dimethylcyclohexane), norbornanedimethylene, dicyclohexylenemethane, cyclohexanedimethylene, or xylylene, $R_3$ and $R_5$ to $R_9$ represent H or $CH_3$, $X_1$, $X_2$ and $X_3$ represent O or S, here, a represents an integer of 2 to 30; b represents an integer of 0 to 2; c represents an integer of 0 to 30; d represents an integer of 0 to 20; e represents an integer of 0 to 2, $R_{10}$ and $R_{11}$ represent H or $CH_3$; $R_{100}$ and $R_{101}$ represent H or an alkyl group having 1 to 6 carbon atoms; $R_{200}$ and $R_{201}$ represent H, $CH_3$ or a phenyl group;

V represents OH or an oxygen atom (O*) bonded to a carbon atom, $W_1$ to $W_3$ represent H, $CH_3$, OH or an oxygen atom (O*) bonded to a carbon atom, here, n1 and n2 represent an integer of 0 to 8; o1 and o2 represent an integer of 1 to 3; m represents 0 or 1; f represents an integer of 1 to 20; g represents an integer of 0 to 3, $R_{50}$ represents hexamethylene, isophorone (1-methylene-3-ethylene-3-methyl-5,5-dimethylcyclohexane), norbornanedimethylene, dicyclohexylenemethane, cyclohexanedimethylene, toluoylene, diphenylmethane, or xylylene, $R_{12}$ and $R_{13}$ represent H or $CH_3$, Here, a1 represents an integer of 2 to 3; a2 represents an integer of 3 to 4; a3 represents an integer of 4 to 6; a4 represents an integer of 2 to 3; a5 represents an integer of 2 to 4; i represents an integer of 1 to 20; k represents an integer of 1 to 10, $V_1$ to $V_3$ independently represent H or a bonding hand (*), and Z represents OH or an oxygen atom (O*) bonded to a carbon atom, COOH or a carboxyl group (COO*) bonded to a carbon atom, here, q represents an integer of 1 to 7).

6. The single layer film according to claim 1, wherein the compound (II) having two or more (meth)acryloyl groups in a molecule is at least one kind selected from the compounds represented by the following general formulae (3) to (33), General formula (3)

[Formula 12]

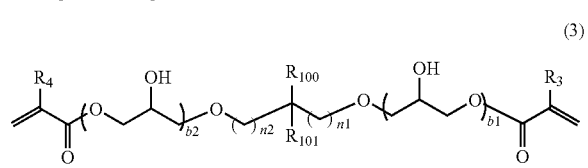

(3)

wherein, $R_3$ and $R_4$ represent H or $CH_3$, $R_{100}$ and $R_{101}$ represent H or an alkyl group having 1 to 6 carbon atoms, b1 and b2 represent an integer of 0 to 2, and n1 and n2 represent an integer of 0 to 8, or the general formula (4),

[Formula 13]

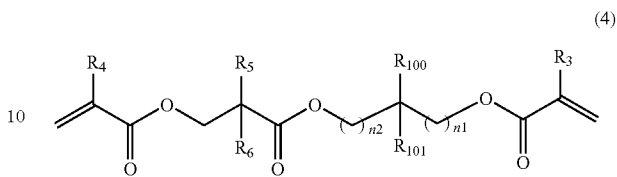

(4)

wherein, $R_3$ to $R_6$ represent H or $CH_3$, $R_{100}$ and $R_{101}$ represent H or an alkyl group having 1 to 6 carbon atoms, and n1 and n2 represent an integer of 0 to 8, or the general formula (5),

[Formula 14]

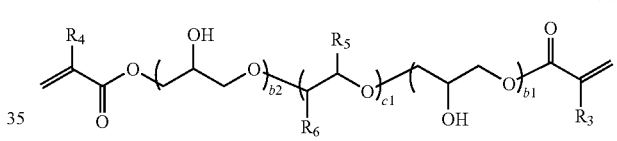

(5)

wherein, $R_3$ to $R_6$ represent H or $CH_3$, b1 and b2 represent an integer of 0 to 2, and c1 represents an integer of 2 to 30, or the general formula (6).

[Formula 15]

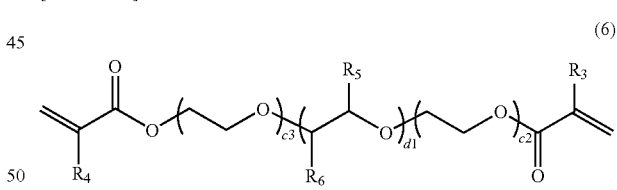

(6)

wherein, $R_3$ to $R_6$ represent H or $CH_3$, c2 and c3 represent an integer of 1 to 5, and d1 represents an integer of 2 to 20, or the general formula (7),

[Formula 16]

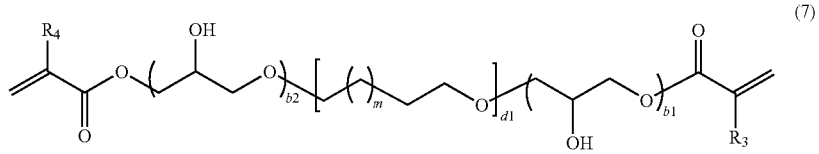

(7)

wherein, $R_3$ and $R_4$ represent H or $CH_3$, b1 and b2 represent an integer of 0 to 2, d1 represents an integer of 2 to 20, and m represents 0 or 1, or the general formula (8),

[Formula 17]

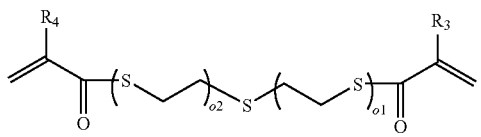

(8)

wherein, $R_3$ and $R_4$ represent H or $CH_3$, and o1 and o2 represent an integer of 1 to 3, or the general formula (9),

[Formula 18]

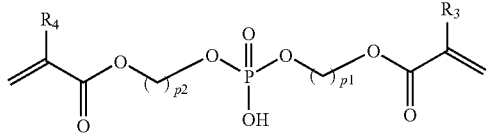

(9)

wherein, $R_3$ and $R_4$ represent H or $CH_3$, and p1 and p2 represent an integer of 1 to 6, or the general formula (10),

[Formula 19]

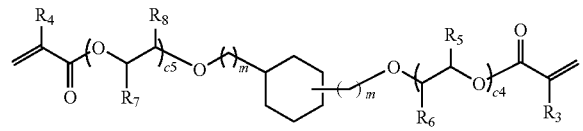

(10)

wherein, $R_3$ to $R_8$ represent H or $CH_3$, c4 and c5 represent an integer of 0 to 5, and m represents 0 or 1, or the general formula (11),

[Formula 20]

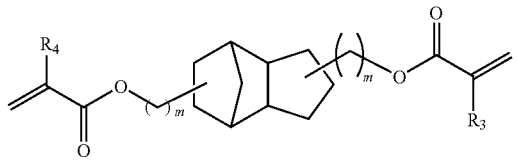

(11)

wherein, $R_3$ and $R_4$ represent H or $CH_3$, and m represents 0 or 1 or the general formula (12),

[Formula 21]

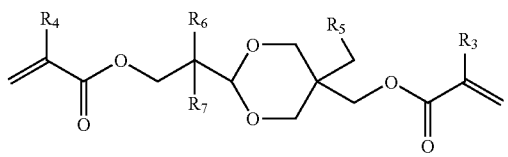

(12)

wherein, $R_3$ to $R_7$ represent H or $CH_3$, or the general formula (13),

[Formula 22]

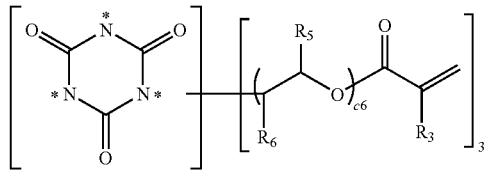

(13)

wherein, * represents a bonding hand, $R_3$, $R_5$ and $R_6$ represent H or $CH_3$, and c6 represents an integer of 0 to 3-, or the general formula (14),

[Formula 23]

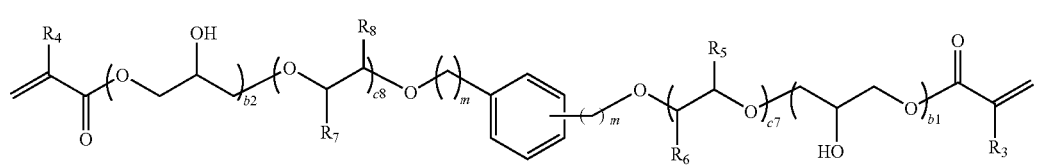

(14)

wherein, $R_3$ to $R_8$ represent H or $CH_3$, b1 and b2 represent an integer of 0 to 2, c7 and c8 represent an integer of 0 to 5, and m represents 0 or 1, or the general formula (15),

[Formula 24]

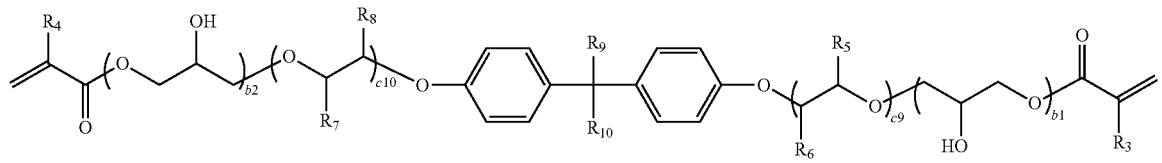

(15)

wherein, $R_3$ to $R_{10}$ represent H or $CH_3$, b1 and b2 represent an integer of 0 to 2, and c9 and c10 represent an integer of 0 to 30, or the general formula (16),

[Formula 25]

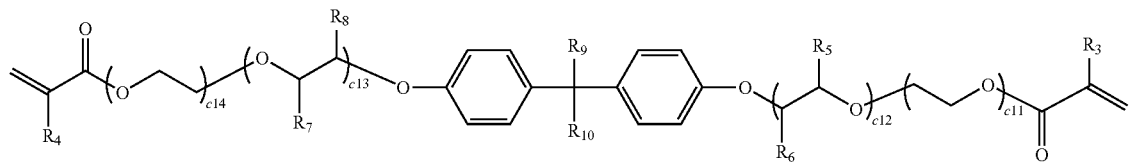

(16)

wherein, $R_3$ to $R_{10}$ represent H or $CH_3$, c11 to c14 represent an integer of 1 or above and satisfy c11+c12+c13+c14=4 to 30, or the general formula (17),

[Formula 26]

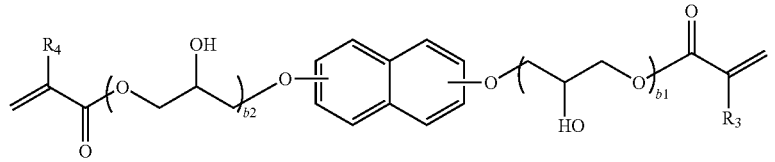

(17)

wherein, $R_3$ to $R_4$ represent H or $CH_3$, and b1 and b2 represent an integer of 0 to 2, or the general formula (18),

[Formula 27]

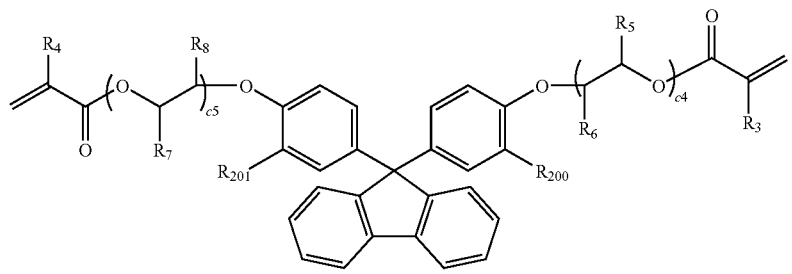

(18)

wherein, $R_3$ to $R_8$ represent H or $CH_3$, $R_{200}$ and $R_{201}$ represent H, $CH_3$, or a phenyl group, and c4 and c5 represent an integer of 0 to 5, or the general formula (19),

[Formula 28]

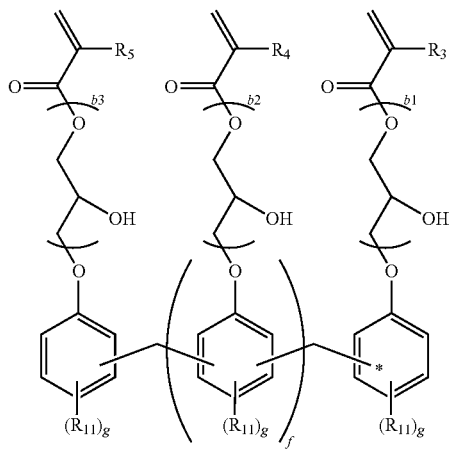

(19)

wherein, $R_3$ to $R_5$ and $R_{11}$ represent H or $CH_3$, b1 to b3 represent an integer of 0 to 2, and f represents an integer of 1 to 20, or the general formula (20),

[Formula 29]

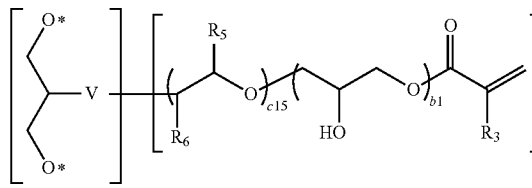

(20)

wherein, * represents a bonding hand, V represents OH or an oxygen atom (O*) bonded to a carbon atom, $R_3$, $R_5$ and $R_6$ represent H or $CH_3$, a1 represents 2 or 3, b1 represents an integer of 0 to 2, and c15 represents an integer of 0 to 20, or the general formula (21),

[Formula 30]

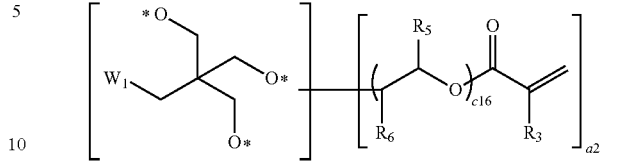

(21)

wherein, * represents a bonding hand, $W_1$ represents H, $CH_3$, OH, or an oxygen atom (O*) bonded to a carbon atom, $R_3$, $R_5$ and $R_6$ represent H or $CH_3$, a2 represents 3 or 4, and c16 represents an integer of 0 to 20, or the general formula (22),

[Formula 31]

(22)

wherein, * represents a bonding hand, W2 and W3 represent H, $CH_3$, OH, or an oxygen atom (O*) bonded to a carbon atom, $R_3$, $R_5$ and $R_6$ represent H or $CH_3$, a3 represents an integer of 4 to 6, and c17 represents an integer of 0 to 3, or the general formula (23),

[Formula 32]

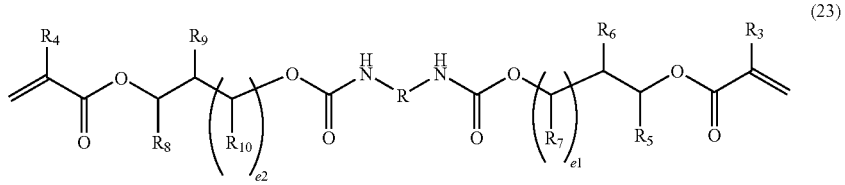

(23)

wherein, R represents hexamethylene, isophorone (1-methylene-3-ethylene-3-methyl-5,5-dimethylcyclohexane), norbornanedimethylene, dicyclohexylenemethane, cyclohexanedimethylene, or xylylene, $R_3$ to $R_{10}$ represent H or $CH_3$, and e1 and e2 represent an integer of 0 to 2, or the general formula (24),

[Formula 33]

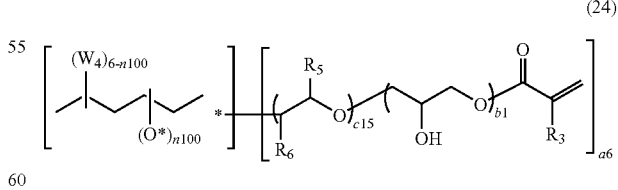

(24)

wherein, $R_3$, $R_5$ and $R_6$ independently represent H or $CH_3$, b1 represents an integer of 0 to 2, c15 represents an integer of 0 to 20, and n100 represents an integer of 1 to 6, or the general formula (25),

[Formula 34]

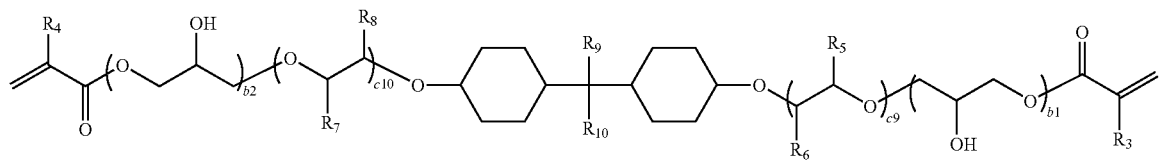
(25)

wherein, $R_3$ to $R_{10}$ represent H or $CH_3$, b1 to b2 represent an integer of 0 to 2, and c9 to c10 represent an integer of 0 to 5, or the general formula (26),

[Formula 35]

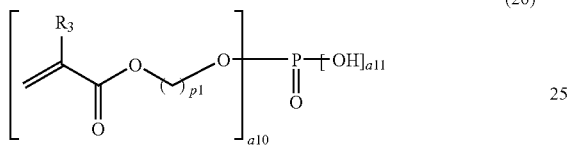
(26)

wherein, $R_3$ represents H or $CH_3$, p1 represents an integer of 1 to 6, a10 represents 1 or 3, and a11 represents an integer of 0 or 2, or the general formula (27),

[Formula 36]

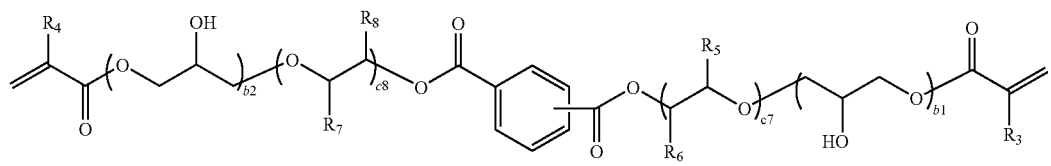
(27)

wherein, $R_3$ to $R_8$ represent H or $CH_3$, b1 to b2 represent an integer of 0 to 2, and c4 to c5 represent an integer of 0 to 5, or the general formula (28).

[Formula 37]

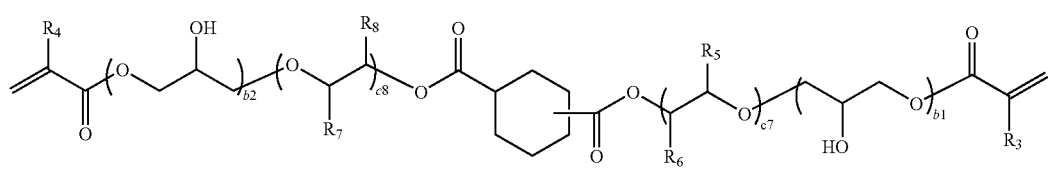
(28)

wherein, $R_3$ to $R_8$ represent H or $CH_3$, b1 to b2 represent an integer of 0 to 2, and c4 to c5 represent an integer of 0 to 5, or the general formula (29),

[Formula 38]

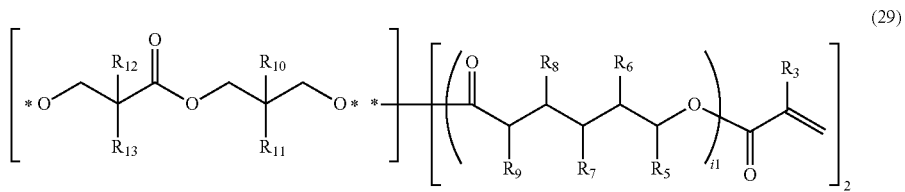

(29)

wherein, $R_3$ and $R_5$ to $R_{13}$ independently represent H or $CH_3$, and i1 represents an integer of 0 to 5, or the general formula (30),

[Formula 39]

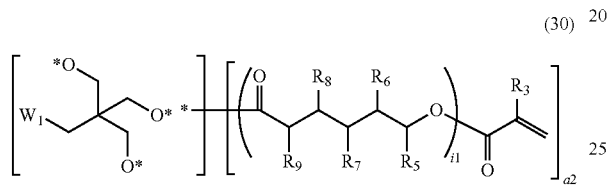

(30)

wherein, $R_3$ and $R_5$ to $R_9$ independently represent H or $CH_3$, $W_1$ represents H, $CH_3$, OH, or an oxygen atom (O*) bonded to a carbon atom, a2 represents 3 or 4, and it represents an integer of 0 to 5, or the general formula (31),

[Formula 40]

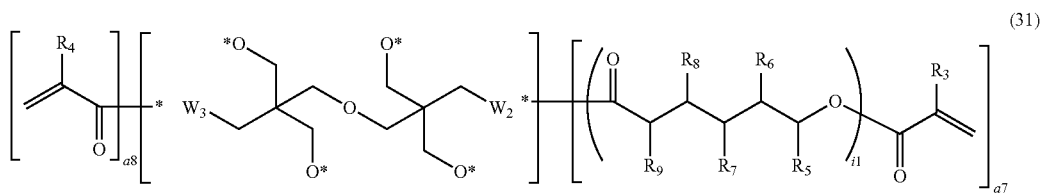

(31)

wherein, $R_3$ to $R_9$ independently represent H or $CH_3$, $W_2$ to W3 independently represent H, $CH_3$, OH, or an oxygen atom (O*) bonded to a carbon atom, a7 represents an integer of 1 to 6, and a8 represents an integer of 0 to 5, and they satisfy a7+a8=2 to 6, or the general formula (32),

[Formula 41]

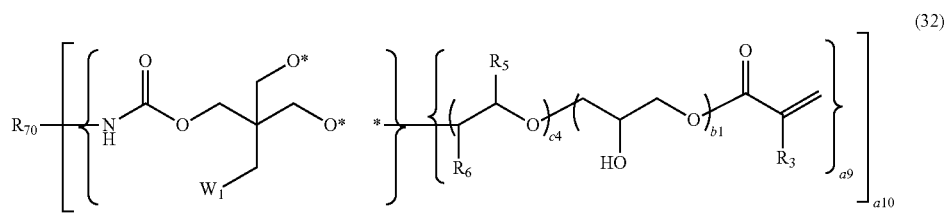

(32)

wherein, $R_{70}$ represents toluoylene, diphenylmethane, hexamethylene, isophorone (1-methylene-3-ethylene-3-methyl-5,5-dimethylcyclohexane), norbornanedimethylene, dicyclohexylenemethane, cyclohexanedimethylene, N,N',N''-tris(hexamethylene)isocyanurate, N,N,N'-tris(hexamethylene)urea, N,N,N',N'-tetrakis(hexamethylene)urea, or xylylene, $R_3$ and $R_5$ to $R_6$ independently represent H or $CH_3$, $W_1$ represents H, $CH_3$, OH, or an oxygen atom (O*) bonded to a carbon atom, a9 represents an integer of 1 to 4, a10 represents an integer of 2 to 4, b1 represents an integer of 0 to 2, and c4 represents an integer of 0 to 5, or the general formula (33),

[Formula 42]

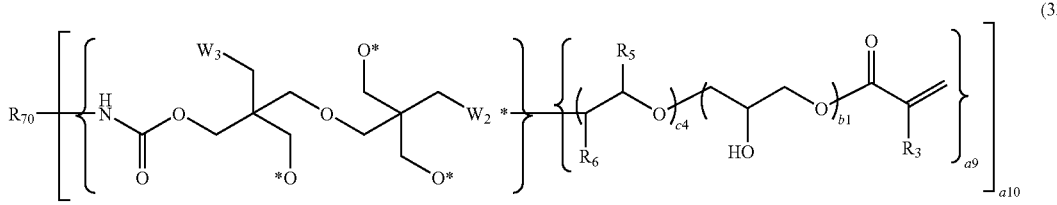

wherein, $R_{70}$ represents toluoylene, diphenylmethane, hexamethylene, isophorone (1-methylene-3-ethylene-3-methyl-5,5-dimethylcyclohexane), norbornanedimethylene, dicyclohexylenemethane, cyclohexanedimethylene, N,N',N''-tris(hexamethylene)-isocyanurate, N,N,N'-tris(hexamethylene)-urea, N,N,N',N'-tetrakis(hexamethylene)-urea, or xylylene, and $R_3$ and $R_5$ to $R_6$ independently represent H or $CH_3$, $W_1$ represents H, $CH_3$, OH, or an oxygen atom (O*) bonded to a carbon atom, a9 represents an integer of 1 to 4, a10 represents an integer of 2 to 4, b1 represents an integer of 0 to 2, and c4 represents an integer of 0 to 5.

7. The single layer film according to claim 1, wherein the composition further contains a polymerizable compound (III) having a different chemical structure from those of the compound (I) represented by the general formula (1) and the compound (II) having two or more (meth)acryloyl groups in a molecule.

8. An antifogging material, comprising the single layer film according to claim 1.

9. An antifouling material, comprising the single layer film according to claim 1.

10. An antistatic material, comprising the single layer film according to claim 1.

11. A multilayer body comprising the single layer film according to claim 1 and a substrate layer, the single layer film being formed on at least one side of the substrate layer.

12. The multilayer body according to claim 11, wherein an adhesive layer is formed on a side of the substrate layer on which the single layer film is not formed.

13. The multilayer body according to claim 12, wherein a releasing film is formed on the surface of the adhesive layer provided on the substrate layer.

14. The multilayer body according to claim 11, wherein a peelable covering material layer is formed on the surface of the single layer film.

15. A method for producing a multilayer body, wherein the multilayer body comprises a single layer film formed on at least one side of a substrate layer, the method comprising:
    forming on at least one side of a substrate layer a coating layer comprising
        a composition containing a compound (I) represented by the general formula (1) mentioned below,
        a compound (II) having two or more (meth)acryloyl groups in a molecule at a molar ratio of 15:1 to 1:30, and
        a solvent having a solubility parameter of 9.5 (cal/cm3) 1/2 or more, drying the composition whereby the amount of residual solvent is 10% or less, and polymerizing the coating layer to form the single layer film formed on at least one side of a substrate layer,
    the single layer film of the obtained polymer having at least one anionic hydrophilic group selected from a sulfonic acid group, a carboxyl group and a phosphate group distributed in such a manner that an anion concentration ratio (Sa/Da) of an anion concentration at a surface (Sa) to an anion concentration at a deep part (Da) is 1.1 or more,
    General formula (1)

[Formula 43]

$$[X]s[M1]l[M2]m \quad (1)$$

wherein, s represents 1 or 2, l represents 1 or 2, and m represents 0 or 1, M1 and M2 may be the same or different and represent a hydrogen ion, an ammonium ion, an alkali metal ion, or an alkaline earth metal ion, X represents one kind selected from the hydrophilic groups represented by the following general formulae (1-1) to (1-4),

[Formula 44]

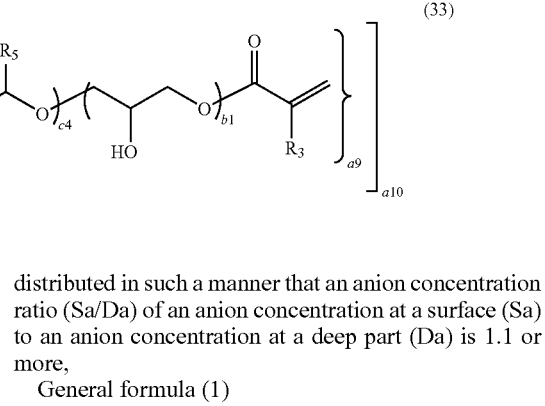

[Formula 45]

[Formula 46]

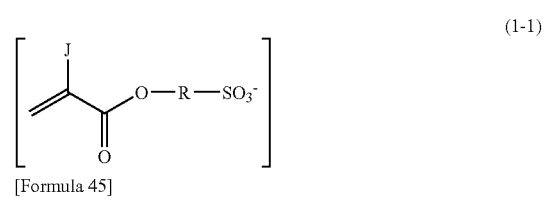

[Formula 47]

-continued

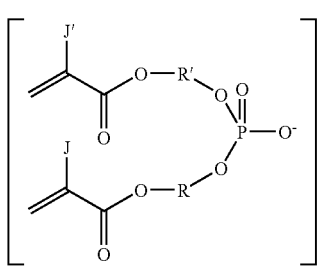

(1-4)

(in the formulae, J and J' may be the same or different and represent H or $CH_3$; n represents 0 or 1; R and R' may be the same or different, represent an aliphatic hydrocarbon group having 1 to 600 carbon atoms and may contain an aromatic ring, an alicyclic group, an ether group or an ester group).

16. The method for producing a multilayer body according to claim 15, wherein the water-contact angle of the single layer film is 30° or less.

* * * * *

UNITED STATES PATENT AND TRADEMARK OFFICE
CERTIFICATE OF CORRECTION

| | | |
|---|---|---|
| PATENT NO. | : 8,617,711 B2 | Page 1 of 1 |
| APPLICATION NO. | : 12/085832 | |
| DATED | : December 31, 2013 | |
| INVENTOR(S) | : Koju Okazaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this
Twenty-first Day of July, 2015

Michelle K. Lee
*Director of the United States Patent and Trademark Office*